ADDER – (A+B=S)
TRUTH TABLE

I.

An=addend, (n)th bit
Bn=augend, (n)th bit
Sn=sum, (n)th bit
(Cn-1)=carry, (n-1) bit
Cn=carry, (n)th bit

| An | 0 | | 1 | | |
|---|---|---|---|---|---|
| Bn | 0 | 1 | 0 | 1 | Cn-1 |
| 0 | 0 | 1 | 1 | 0 | Sn |
| 1 | 1 | 0 | 0 | 1 | Sn |
| 0 | 0 | 0 | 0 | 1 | Cn |
| 1 | 0 | 1 | 1 | 1 | Cn |

CIRCUITS

II.

III. Fig. 3

INTERCONNECTIONS

COMPARISON CIRCUIT A=B

I.

Inventor:
John W. Bremer,
by Charles W. Helzer
His Attorney.

SUBTRACTOR (A-B=S)
I. TRUTH TABLE
Fig. 4
| An | 0 | | 1 | | |
|---|---|---|---|---|---|
| Bn | 0 | 1 | 0 | 1 | Cn-1 |
| 0 | 0 | 1 | 1 | 0 | Sn |
| 1 | 1 | 0 | 0 | 1 | |
| 0 | 0 | 1 | 0 | 0 | Cn |
| 1 | 1 | 1 | 0 | 1 | |
II. CIRCUITS
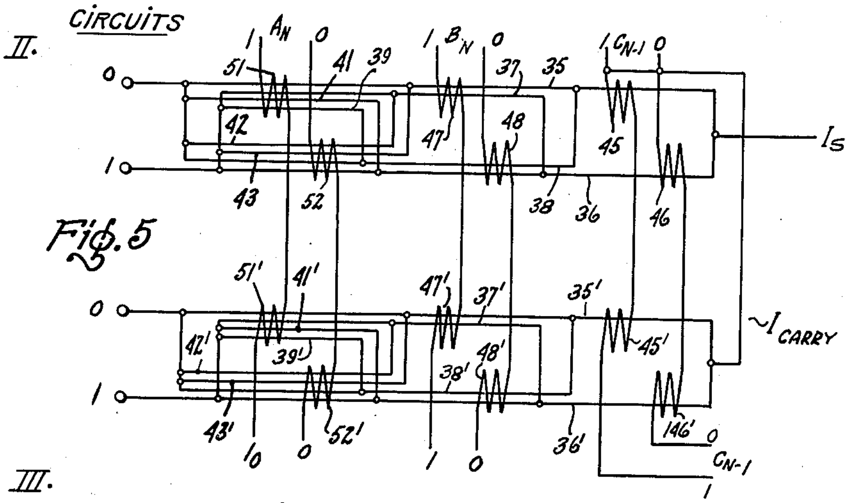
Fig. 5
III. INTERCONNECTIONS
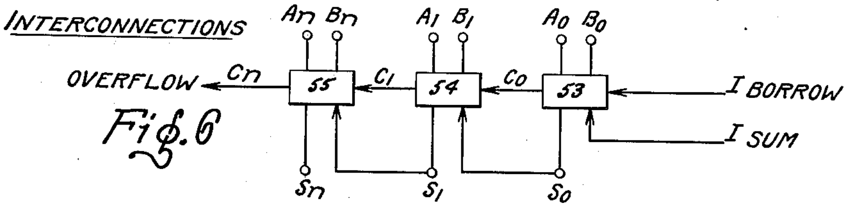
Fig. 6
COMPARISON CIRCUIT A>B
II.
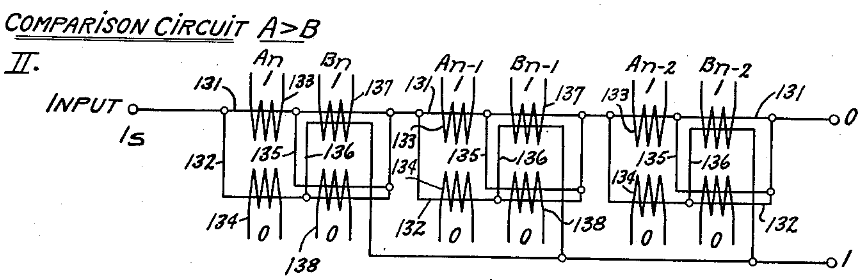
Fig. 13
Inventor:
John W. Bremer,
by Charles W. Helzer
His Attorney.

MULTIPLIER (A×B=S)

I. BLOCK

III. CIRCUITS

Inventor:
John W. Bremer,
by Charles W. Helzer
His Attorney.

MULTIPLIER CIRCUITS α-TYPE

Inventor
John W. Bremer
by Charles W. Helzer
His Attorney

MULTIPLIER

II. TRUTH TABLES

Fig. 11

β-TYPE (a)

| B \ A | 0 | 1 |
|---|---|---|
| 0 | 0 | 0 |
| 1 | 0 | 1 |

γ-TYPE (b)

| A | 0 | | 1 | |
|---|---|---|---|---|
| B \ S | 0 | 1 | 0 | 1 |
| 0 | 0 / 0 | 1 / 0 | 0 / 0 | 1 / 0 |
| 1 | 0 / 0 | 1 / 0 | 1 / 0 | 0 / 1 |

α-TYPE (c)

| B | A | 0 | | 1 | |
|---|---|---|---|---|---|
| | C \ S | 0 | 1 | 0 | 1 |
| 0 | 0 | 0 / 0 | 1 / 0 | 0 / 0 | 1 / 0 |
| | 1 | 1 / 0 | 0 / 1 | 1 / 0 | 0 / 1 |
| 1 | 0 | 0 / 0 | 1 / 0 | 1 / 0 | 0 / 1 |
| | 1 | 1 / 0 | 0 / 1 | 0 / 1 | 1 / 1 |

Inventor:
John W. Bremer,
by Charles W. Helzer
His Attorney.

THREE-BIT ARITHMETIC UNIT BLOCK DIAGRAM

Inventor:
John W. Bremer,
by Charles W. Helzer
His Attorney.

Oct. 17, 1961 J. W. BREMER 3,004,705

SUPERCONDUCTIVE COMPUTER AND COMPONENTS THEREFOR

Filed Dec. 31, 1958 17 Sheets-Sheet 7

FIG. 15a READ OUT, FIG. 15

Inventor:
John W. Bremer,
by Charles W. Helzer
His Attorney.

Inventor:
John W. Bremer,
by Charles W. Helzer
His Attorney.

DIVISION CIRCUITS

Δ-TYPE

θ-TYPE

λ-TYPE

Inventor:
John W. Bremer,
by Charles W. Helzer
His Attorney.

Inventor:
John W. Bremer,
by Charles W. Helzer
His Attorney.

Inventor:
John W. Bremer,
by Charles W. Helzer
His Attorney.

Oct. 17, 1961 J. W. BREMER 3,004,705

SUPERCONDUCTIVE COMPUTER AND COMPONENTS THEREFOR

Filed Dec. 31, 1958 17 Sheets-Sheet 12

DIVISION TRUTH TABLES

Fig. 24

II

β (a.)

| | $A_2$ | 0 | 1 | |
|---|---|---|---|---|
| $B_0$ | 0 | 0 | 1 | $R_2$ |
| | 1 | 1 | 0 | |
| | 0 | 0 | 0 | C |
| | 1 | 1 | 0 | |

γ (b.)

| | C | 0 | 1 | |
|---|---|---|---|---|
| B | 0 | 0 | 1 | R |
| | 1 | 1 | 0 | |
| | 0 | 0 | 1 | C |
| | 1 | 1 | 1 | |

Δ (c)

| R | Q | ± |
|---|---|---|
| 0 | 1 | − |
| 1 | 0 | + |

($c_2$)

| | | R: 0 | R: 1 | |
|---|---|---|---|---|
| C | 0 | 0 | 1 | R′ |
| | 1 | 1 | 0 | |

ε (d)

| | | R: 0 | R: 1 | |
|---|---|---|---|---|
| C | 0 | 0/0 | 1/1 | R′ |
| | 1 | 1/1 | 0/0 | |
| | 0 | 0/0 | 0/0 | C′ |
| | 1 | 0/1 | 1/0 | |

UPPER +
LOWER −

η (e)

| | R | 0 | | 1 | |
|---|---|---|---|---|---|
| | B | 0 | 1 | 0 | 1 |
| +C | 0 | 0/0 | 1/0 | 1/0 | 0/1 |
| | 1 | 1/0 | 0/1 | 0/1 | 1/1 |
| −C | 0 | 0/0 | 1/1 | 1/0 | 0/0 |
| | 1 | 1/1 | 0/1 | 0/0 | 1/1 |

UPPER is R′
LOWER is C′

θ (f)

| | B: 0 | B: 1 |
|---|---|---|
| + | 0/0 | 1/0 |
| − | 0/0 | 1/1 |

UPPER is R′
LOWER is C′

λ (g)

| R | E |
|---|---|
| 0 | 0 |
| 1 | 1 |

Inventor:
John W. Bremer,
by Charles W. Helzer
His Attorney.

Inventor
John W. Bremer
by Charles W. Helzer
His Attorney

Inventor:
John W. Bremer,
by Charles W. Helzer
His Attorney.

Oct. 17, 1961 J. W. BREMER 3,004,705

SUPERCONDUCTIVE COMPUTER AND COMPONENTS THEREFOR

Filed Dec. 31, 1958 17 Sheets-Sheet 15

Inventor:
John W. Bremer,
by Charles W. Helzer
His Attorney.

Inventor:
John W. Bremer,
by Charles W. Helzer
His Attorney.

Oct. 17, 1961 J. W. BREMER 3,004,705

SUPERCONDUCTIVE COMPUTER AND COMPONENTS THEREFOR

Filed Dec. 31, 1958 17 Sheets-Sheet 17

Inventor:
John W. Bremer,
by Charles W. Helzer
His Attorney.

United States Patent Office 3,004,705

Patented Oct. 17, 1961

3,004,705
SUPERCONDUCTIVE COMPUTER AND COMPONENTS THEREFOR

John Wood Bremer, Schenectady, N.Y., assignor to General Electric Company, a corporation of New York Filed Dec. 31, 1958, Ser. No. 784,285
35 Claims. (Cl. 235—164)

The present invention relates to cryogenic computers. More specifically the invention relates to cryogenic computers, and to cryogenic arithmetic modules which can be used in assembling a cryogenic computer.

Recently, a new innovation has been introduced into the computer field which is known as the cryotron. The cryotron comprises a small length of superconductor, termed the gate, which is maintained below its critical temperature so that it exhibits superconductive characteristics. The gate is in turn surrounded by a winding which is likewise constructed from a superconducting material, but the material out of which the winding is formed has a higher critical magnetic field strength than the material out of which the gate is formed. As a consequence of this arrangement, electric current flowing through the winding can be used to render the gate alternately normally resistive or superconducting in an off-on manner. Hence, a cryotron can be used as a logic element, and is particularly well suited to binary arithmetic. It is the purpose of this disclosure to describe a cryogenic computer which utilizes such cryotrons as the logic elements thereof.

It is therefore a primary object of the present invention to provide a new and improved cryogenic computer utilizing cryotrons as logic elements.

Another object of the invention is to provide a number of different arithmetic modules fabricated from cryotrons for performing different arithmetic operations such as addition, subtraction, multiplication and division, and which may be used in constructing a cryogenic computer.

In practicing this invention a cryogenic digital arithmetic unit is provided which comprises a plurality of superconducting gate elements, there being at least two gate elements for each digit to be resolved by the unit with the pair of superconducting gate elements for one of the digits to be resolved being connected to the input end in parallel circuit relationship to a source of electric summation current, and having the remaining ends thereof connected to respective output terminals representing a binary one or a binary zero. A coil pair for the first digit to be resolved is arranged on the gate elements with the winding thereof representing a binary one connected to the zero output terminal. A second pair of single gate elements are connected to the first gate elements at a point intermediate the first digit coil pair and the output terminals, and a second digit coil pair is arranged on at least the second gate elements with the winding thereof representing a binary one surrounding the second gate element connected to the one output. The coil pairs are of course constructed from a superconducting material which has a critical magnitude field strength higher than the gate elements. In a preferred embodiment of the invention the arithmetic unit is connected to a carry unit to form an arithmetic module. The carry unit is generally similar in construction to the arithmetic unit and the binary one windings of corresponding coil pairs on the arithemtic unit and the carry unit are interconnected with the binary zero windings of corresponding coil pairs also being interconnected. In utilizing modules of the type set forth above, a plurality of such combination arithmetic and carry units are interconnected with the output of the preceding carry units being connected to a coil pair of the next succeeding carry unit which is adapted to receive the carry sum.

Other objects, features and many of the attendant advantages of this invention will be appreciated more readily as the same becomes better understood by reference to the following detailed description, when considered in connection with the accompanying drawings, wherein like parts in each of the several figures are identified by the same reference characters, and wherein:

FIGURE 3 is a functional block diagram showing the manner in which adder modules such as shown in FIGURE 2 are interconnected;

FIGURE 4 is a truth table for a subtractor module shown in FIGURE 5;

FIGURE 5 shows the circuit details of construction of a cryogenic subtractor module constructed in accordance with the present invention;

FIGURE 6 is a functional block diagram showing the manner in which subtractor modules such as shown in FIGURE 5 are interconnected;

FIGURE 11 shows the three truth tables for the beta type multiplier network shown in FIGURE 8, the gamma type multiplier module shown in FIGURE 9, and the alpha type multiplier module shown in FIGURE 10;

FIGURE 13 shows the circuit details of construction of a comparison circuit for performing the comparison $A>B$ constructed in accordance with the present invention;

Figure 14:
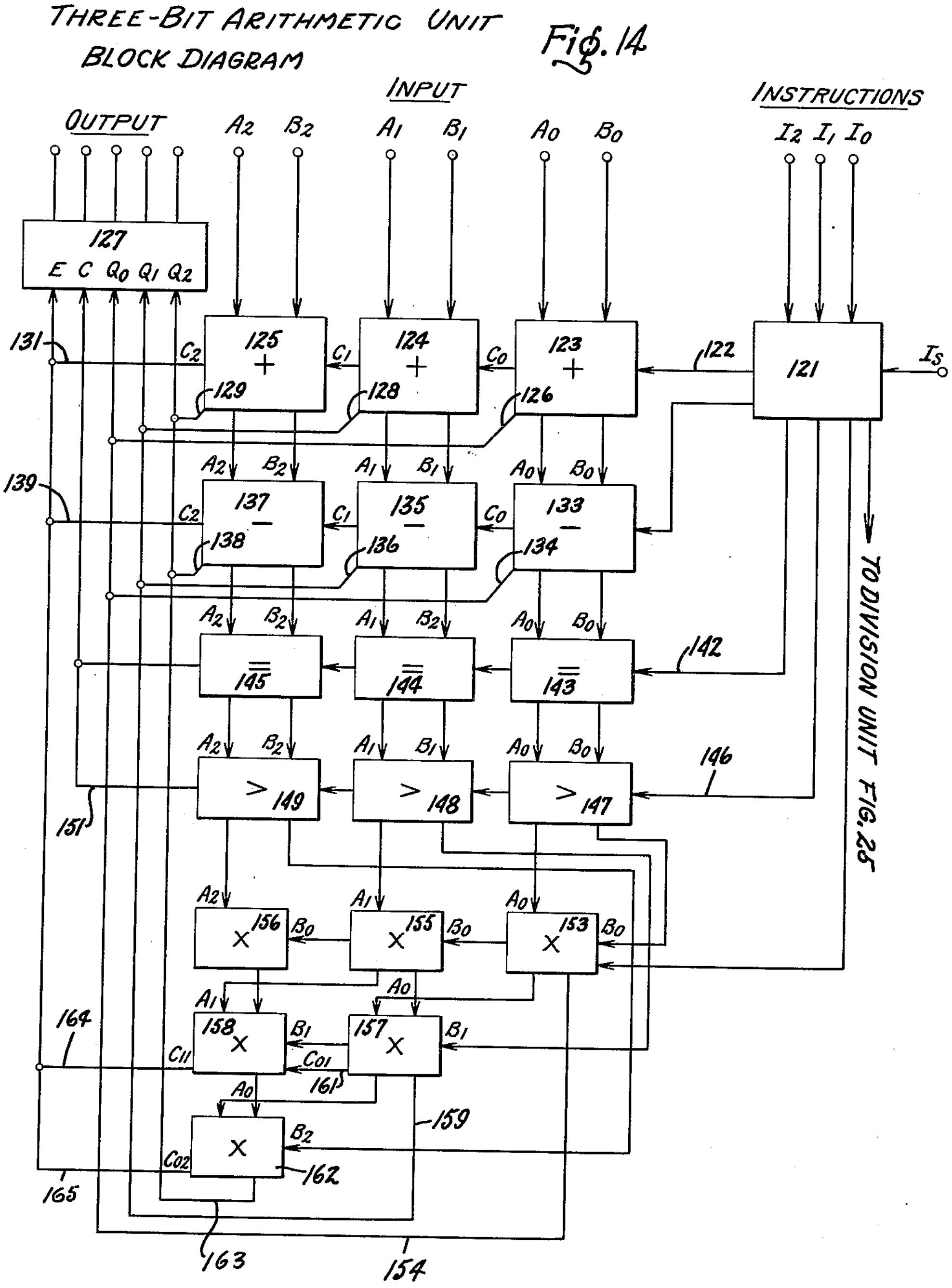
FIGURE 14 is a functional block diagram of a portion of a three-place cryogenic digital computer constructed in accordance with the present invention which performs the operation of binary addition, subtraction, comparison $A=B$, comparison $A>B$, and multiplication.
Figure 15:
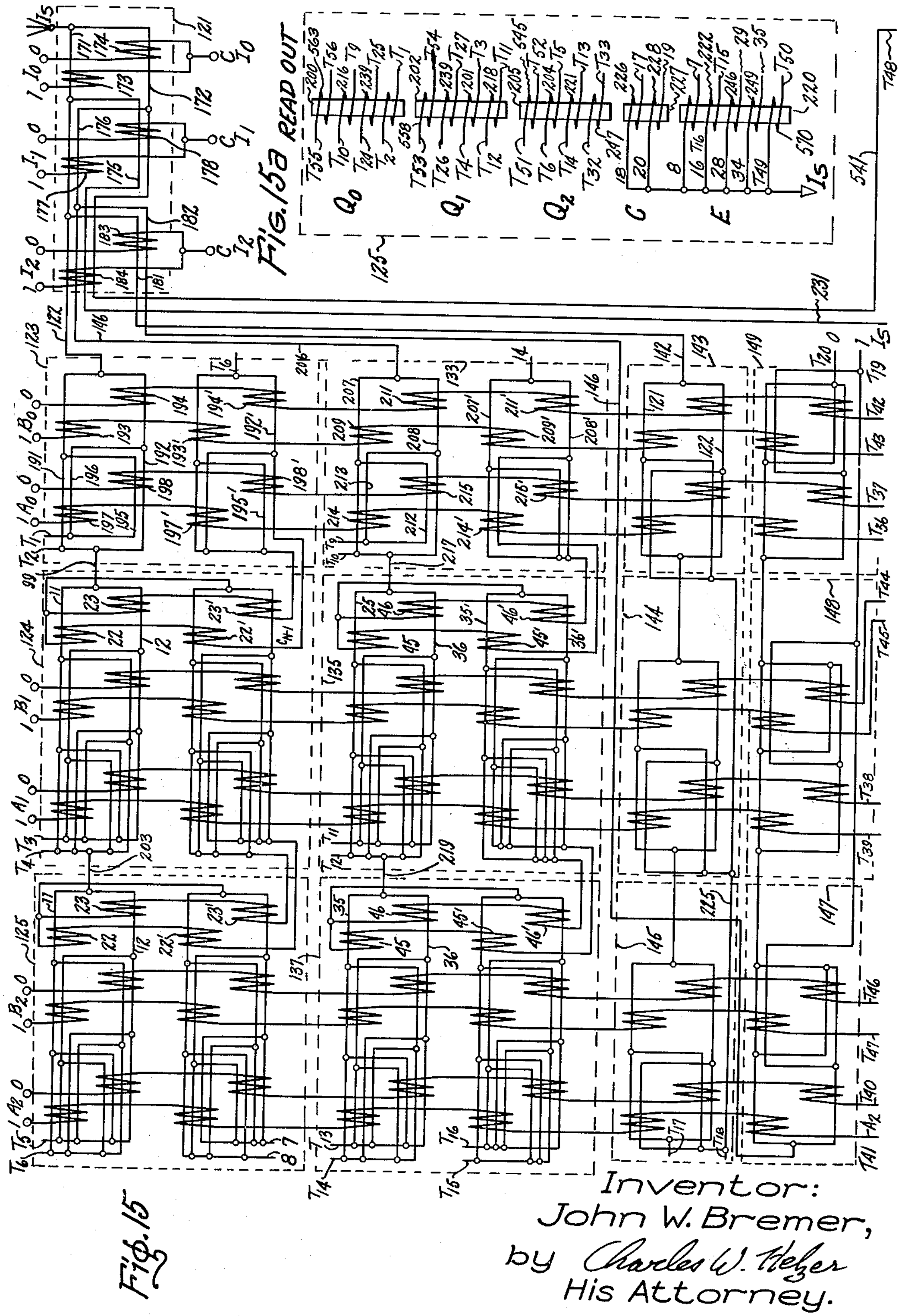
FIGURE 15 shows the circuit details of construction of the addition, subtraction and two comparison stages of the cryogenic computer shown in FIGURE 14, together with the control panel therefor.
Figure 16:
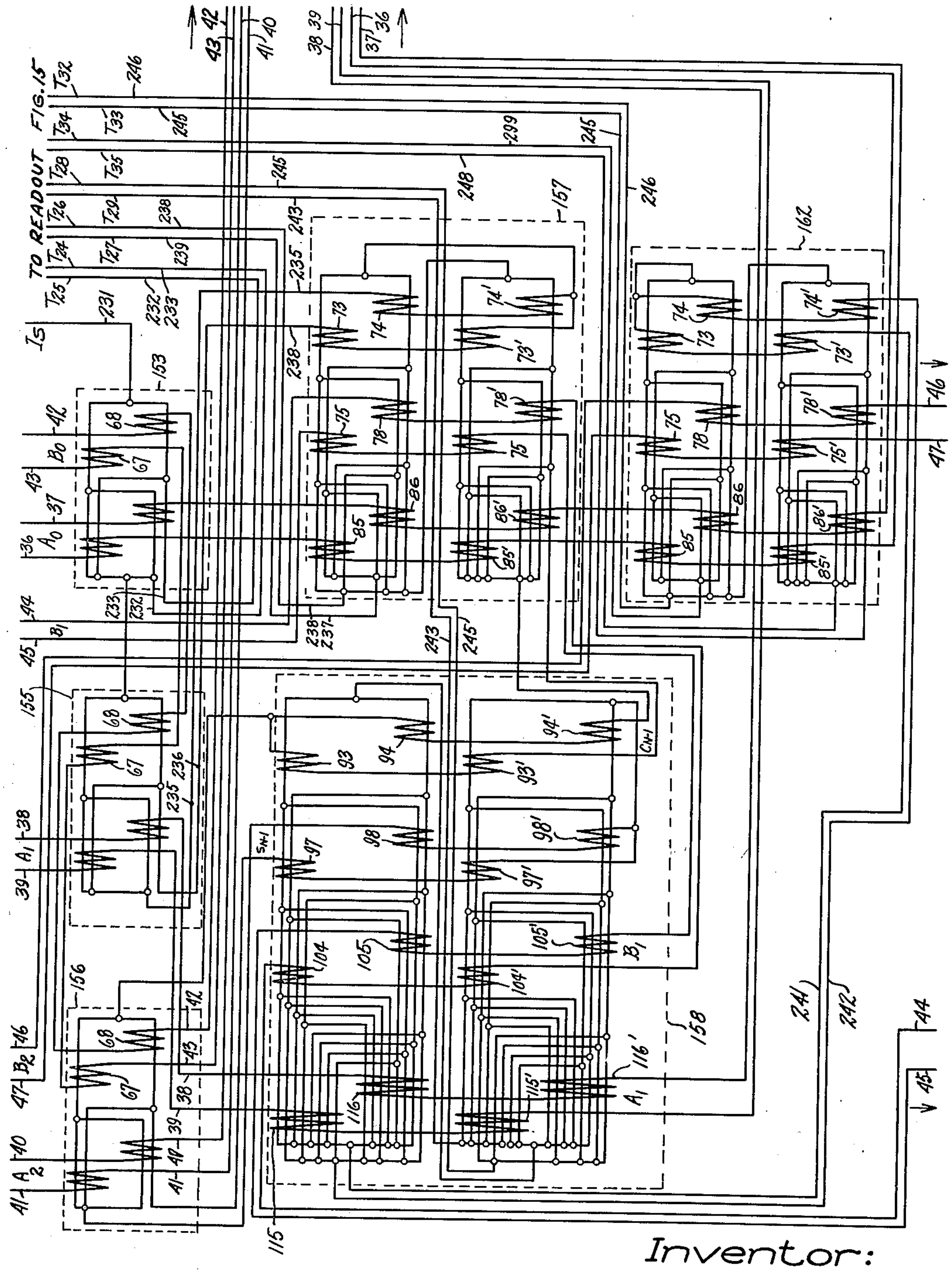
Figure 17:
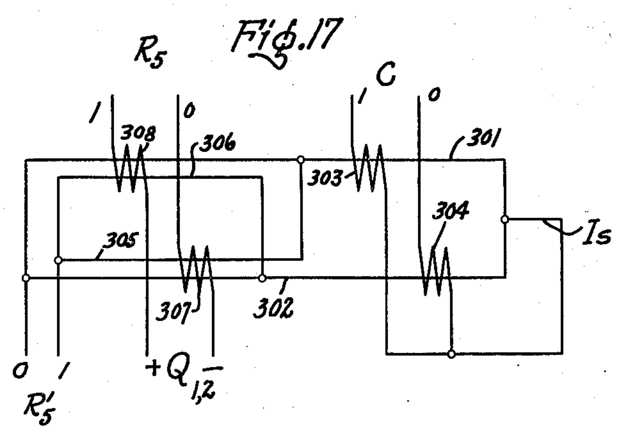
Figure 18:
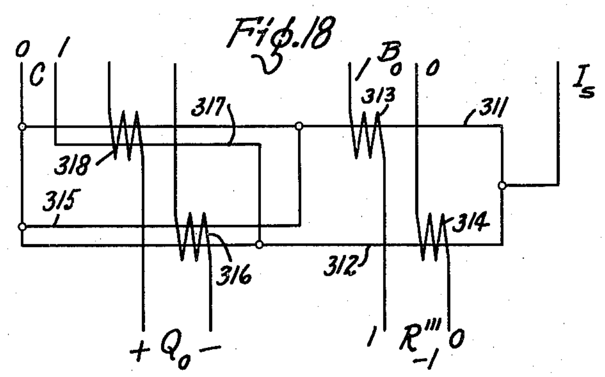
Figure 19:
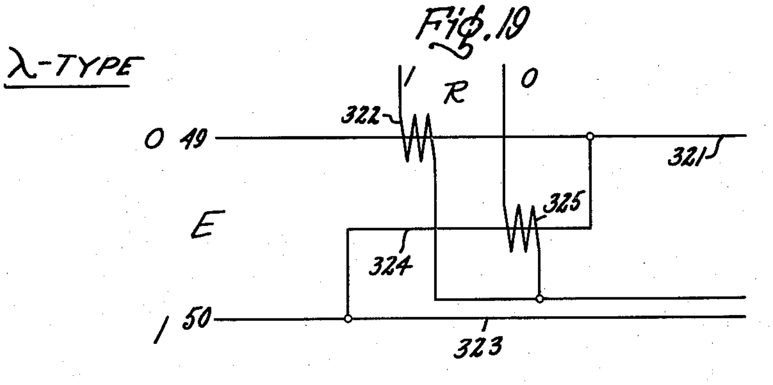
Figure 20:
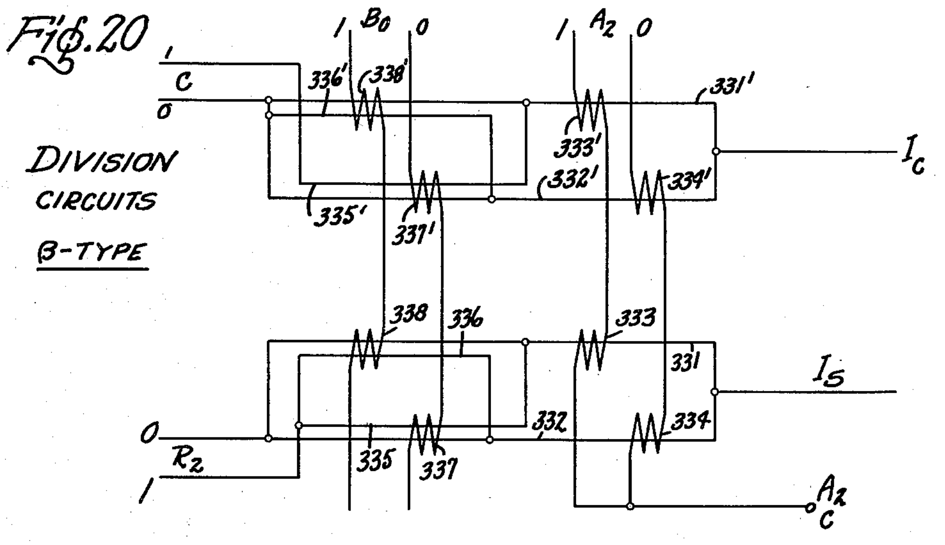
Figure 21:
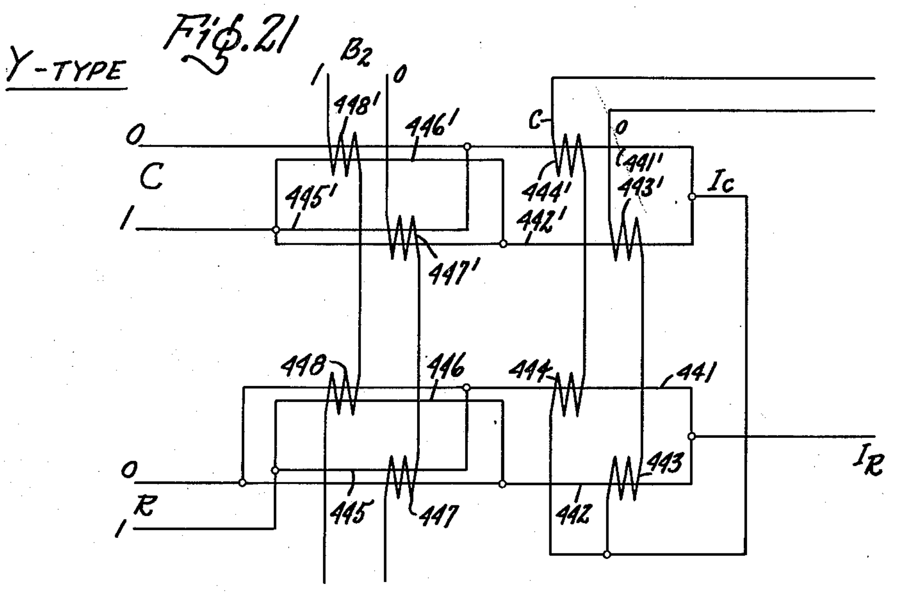
Figure 22:
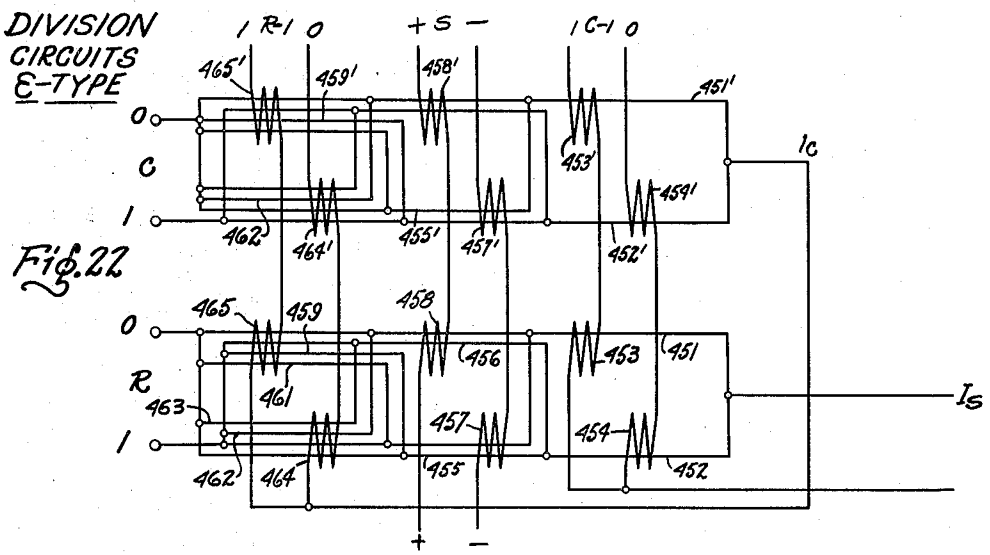
Figure 23:
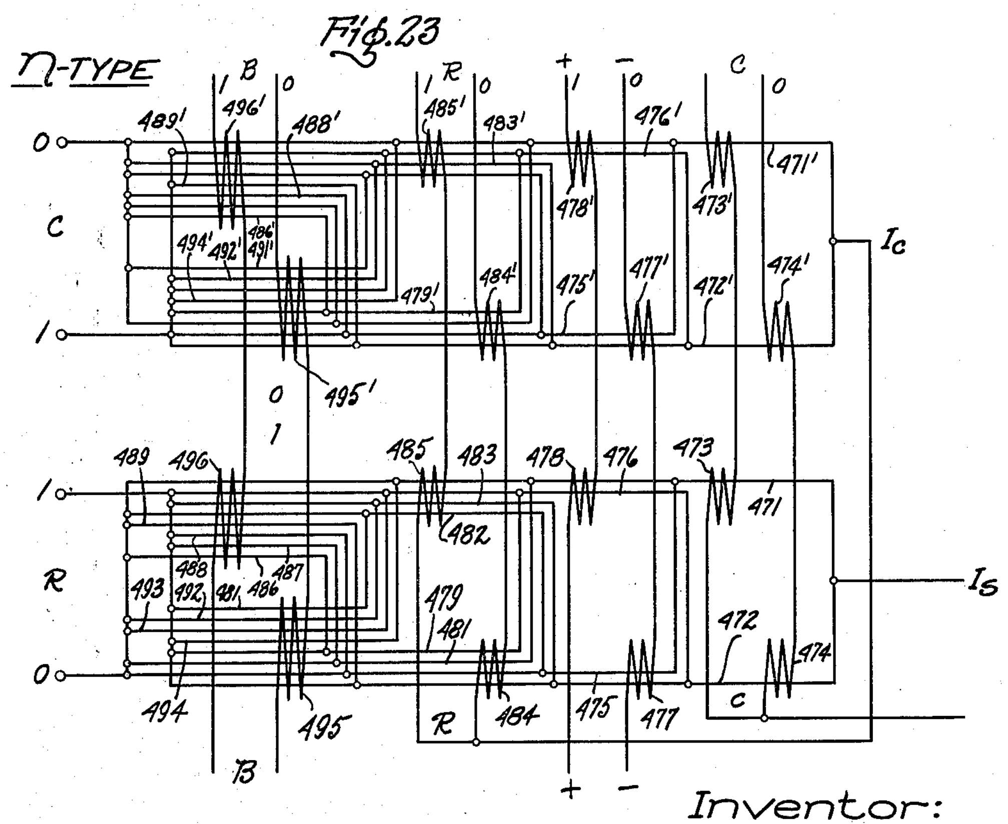
Figure 25:
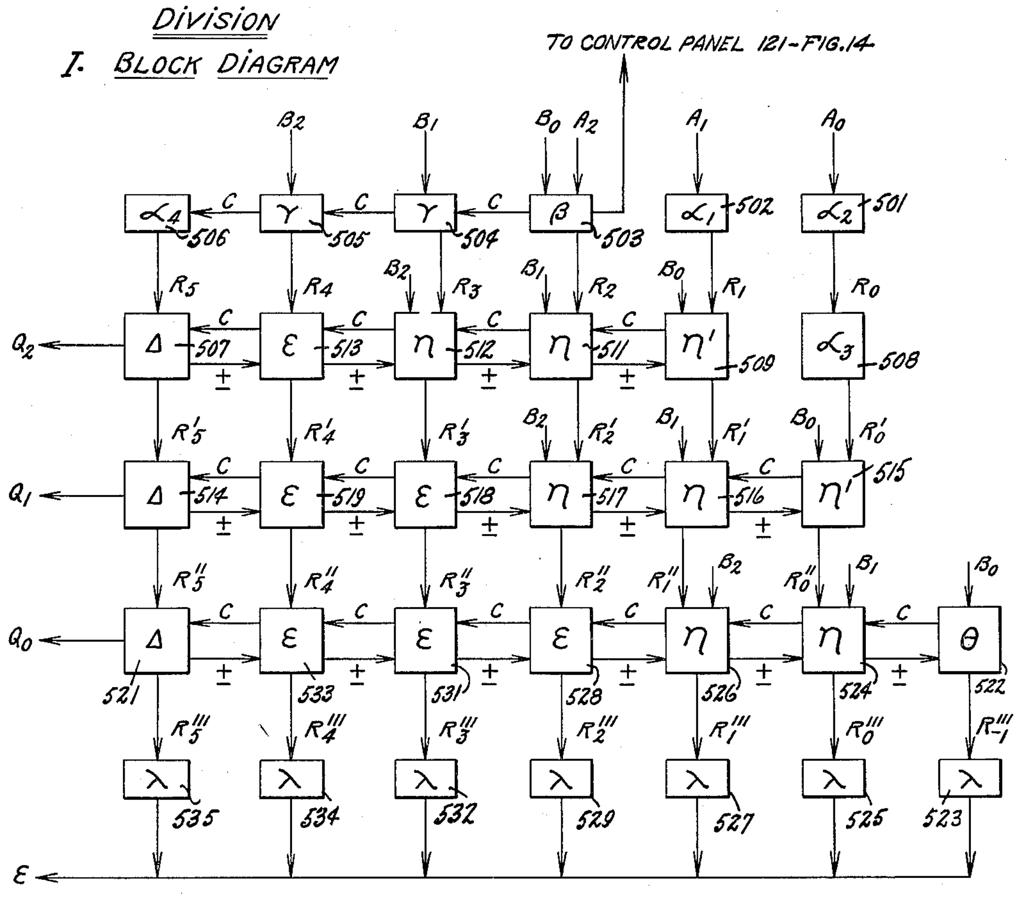

FIGURE 15*a* shows the circuit details of construction of the readout panel for the cryogenic computer of FIGURE 15;

FIGURE 16 shows the circuit details of construction of the multiplication stage of the cryogenic computer shown in FIGURE 14;

FIGURE 17 shows the circuit details of construction of a cryogenic delta divider module constructed in accordance with the present invention;

FIGURE 18 is a circuit diagrams of a cryogenic theta divider module constructed in accordance with the present invention;

FIGURE 19 shows the circuit details of construction of a cryogenic lambda divider module constructed in accordance with the present invention;

FIGURE 20 is a circuit diagram of a cryogenic beta divider module constructed in accordance with the present invention;

FIGURE 21 shows the circuit diagram of a cryogenic gamma divider module constructed in accordance with the teachings of the present invention;

FIGURE 22 is a schematic circuit diagram of a cryogenic epsilon divider module formed in accordance with the teachings of the present invention;

FIGURE 23 is a schematic circuit diagram of a cryogenic eta divider module constructed in accordance with the present invention;

FIGURE 24 shows the truth tables for the beta, gamma, delta, epislon, eta, theta, and lambda divider modules illustrated in FIGURES 17–23;

FIGURE 25 is a functional block diagram of a division network utilizing the divider modules shown in FIGURES 17–23;

FIGURES 26–29 form the schematic circuit diagram of the division network shown in FIGURE 25 of the drawings.

Figure 2:
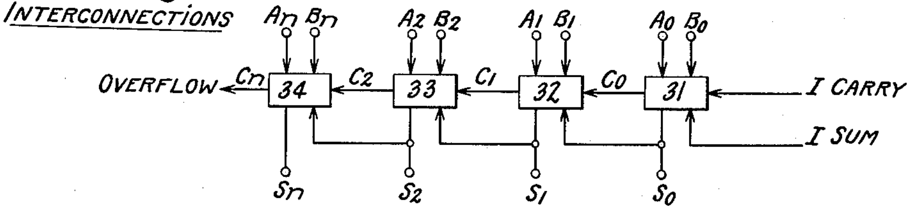
FIGURE 2 shows the circuit details of construction of a cryogenic adder module constructed in accordance with the present invention.

One embodiment of an arithmetic module constructed in accordance with the invention is illustrated in FIGURE 2 of the drawings. In this embodiment of the invention an arithmetic module is formed from a plurality of superconducting gate elements known as cryotrons which are constructed from a suitable superconducting material. For a more complete description of the construction and operation of the cryotrons, reference is made to an article entitled "Cryogenic Devices in Logical Circuitry and Storage," by J. W. Bremer, printed in the Electrical Manufacturing magazine, February 1958 issue, published by the Gage Publishing Company, and to United States Patent 2,832,897, issued April 29, 1958, "Magnetically Controlled Gating Element," Dudley A. Buck, inventor. The arithmetic module illustrated in FIGURE 2 of the drawings comprises a first pair of superconducting gate elements 11 and 12 having one end thereof connected in parallel to a source of electric summation current $I_s$ supplied to the terminal 13 from any low voltage direct current electric generator. The remaining ends of the first gate elements 11 and 12 are connected to a pair of output terminals 14 and 15 representing a binary zero and a binary one, respectively. The first gate element 11 is surrounded by a superconductivity modifying means comprising a field winding 16 that represents a binary one and first gate element 12 is surrounded by a superconductivity modifying means comprising a field winding 17 that represents a binary zero. The two superconducting field windings 16 and 17 form a first digit coil pair for reading a first digit to be resolved by the unit into the arithmetic module, and are fabricated from a superconducting material which has a higher critical magnetic field strength than the material out of which the gate elements 11 and 12 are fabricated in the manner described more fully in the above referenced article and patent. Because all of the arithmetic modules to be described hereinafter will utilize superconducting field windings possessing this same characteristic relative to the gate elements which they surround, it is to be undertsood that by definition, the term superconductivity modifying means, or superconductivity modifier, or superconducting field winding, means a winding or similar means possessing this characteristic. Further, the terms coil and winding mean any arrangement of superconductors whereby the gate resistance is controlled by magnetic fields produced by the coil or winding member, and may be wound in the form of a helix, or it may be a single cross wire or strip or other similar means possessing this characteristic. Connected to the first gate elements 11 and 12 are a second pair of superconducting gate elements 18 and 19 with one end of the superconducting gate element 18 being connected to the first gate element 12 at the output side of the binary zero winding 17 and the other end is connected to the binary one output terminal. The superconducting gate element 17 has one end connected to the first superconducting gate element 11 at the output side of the binary one winding 16 and has its remaining end connected to the binary zero output terminal. The second gate element 18 is surrounded by a superconducting field winding 21 which represents a binary one, and the second gate element 19 is surrounded by a superconducting field winding 22 which represents a binary zero. A third set of superconducting gate elements 23–26 are connected to the first two mentioned gate elements, and there are exactly double the number of gate elements in the third set of gate elements as there were in the preceding sets. The third gate elements 23 and 24 are connected to the first and second gate elements 11 and 18 on the output side of the binary one winding with the third gate element 24 being connected to the binary one output terminal and the third gate element 23 being connected to the binary zero output terminal. Disposed about the third set of gate elements 23–26 is a coil pair comprised by a first superconducting field winding which surrounds the two gate elements 23 and 24 and represents a binary one, and a second superconducting field winding 28 which represents a binary zero and surrounds gate elements 25 and 26. While the embodiment of the invention discloses that the superconducting field windings surround all of the preceding gate elements, plus the particular gate elements associated with any one winding, this is not an essential feature of construction of an arithmetic module constructed in accordance with the present invention for it would suffice that a coil pair surround only the particular gate elements with which it is associated. However, for convenience, the arithmetic module has been constructed in the manner disclosed.

Figure 1:
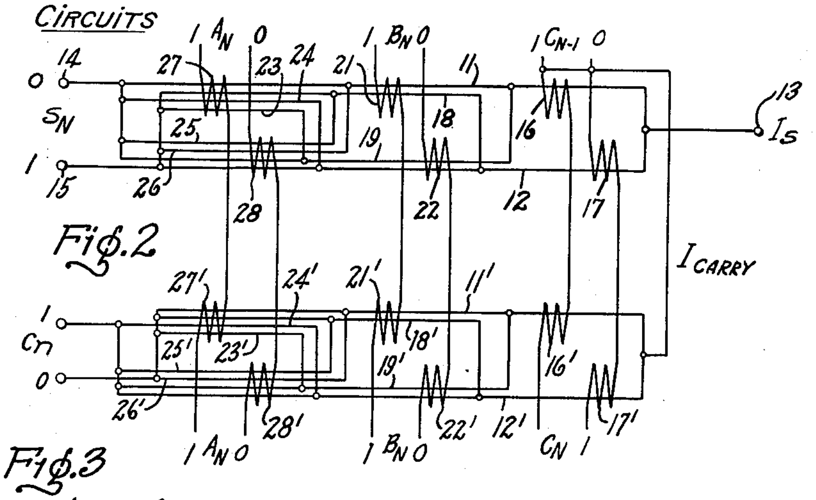
FIGURE 1 is a truth table for the adder module shown in FIGURE 2.

In operation, an arithmetic module constructed in the above described manner has electric current supplied to the terminal 13 which flows through a selected superconducting path to one of the output terminals representing either the binary zero or the binary one as determined by the energization of the windings of the coil pairs surrounding the various gate elements. The particular arithmetic module disclosed in FIGURE 2 comprises an adder designed to add together three binary digits, and to provide an output signal at the output terminal which represents the sum of the three digits. The digits to be added are supplied to the superconducting field windings of coil pairs of the module with the coil pair formed by windings 16 and 17 representing a carry sum to be added, the coil pair formed by the windings 21 and 22 representing a second sum which shall be identified as $B_n$, and the coil pair 27 and 28 representing a third sum which shall be identified as $A_n$. The truth table for the arithmetic module illustrated in FIGURE 2 of the drawings is shown in FIGURE 1 of the drawings wherein it can be seen that if $A_n$ represents the addend, $B_n$ the augend, $S_n$ shall be the sum, $C_{n-1}$ shall be the carry sum supplied to the coil pair 16 and 17. In using the truth table of FIGURE 1 the value $A_n$ to be added is listed in the two vertical columns to the right of the character $A_n$. The value $B_n$ to be added is listed in the single vertical column below the character $B_n$, and the values for $C_{n-1}$ are listed in the four vertical columns to the left of the identification character $C_{n-1}$. This truth table was worked out by actually adding the binary numerals illustrated $A_n$ and $B_n$ and $C_{n-1}$ to be added, and provide the answer for all of the possible combinations of values for $A_n$, $B_n$ and $C_{n-1}$. For an example in the use of the truth table, assume that it is desired to determine the sum of $A_n=0$, $B_n=1$, and $C_{n-1}=1$. It is necessary to select the $A_n=0$ column, the $B_n=1$ line and $C_{n-1}=1$ column in the output sum heading identified by the numeral $S_n$. By reading down the $A_n=0$ and $C_{n-1}=1$ column, and across the $B_n=1$ line, it is seen that the output sum is equal to zero. Similar readings can be made for any other combination of the three factors $A_n$, $B_n$ and $C_{n-1}$. The following listed figures shows the output sum as well as the carry sum, to be discussed hereinafter, obtained from the output of the arithmetic unit for each of the eight various combinations of values that are possible with the three stage arithmetic unit illustrated in FIGURE 2.

| $S_n$ | $A_n$ | $B_n$ | $C_{n-1}$ | $C_n$ |
|---|---|---|---|---|
| 0 | 0 | 0 | 0 | 0 |
| 1 | 0 | 0 | 1 | 0 |
| 1 | 0 | 1 | 0 | 0 |
| 0 | 0 | 1 | 1 | 1 |
| 1 | 3 | 0 | 0 | 0 |
| 0 | 1 | 0 | 1 | 1 |
| 0 | 1 | 1 | 0 | 1 |
| 1 | 1 | 1 | 1 | 1 |

In tracing through the operation of the arithemetic unit shown in FIGURE 2, from an examination of the above table, the operation of the arithmetic module shown in FIGURE 2 will become apparent. For example, assume that $A_n=0$, $B_n=1$ and $C_{n-1}=0$. It can be seen that the output sum will equal one from the above table and the truth table shown in FIGURE 1. From a simple arithmetic process it is also apparent that this is the answer. In tracing through the operation of the arithmetic module now, assume that for the values of $A_n$, $B_n$ and $C_{n-1}$ selected, that electric current will flow through the binary zero winding 17 representing $A_n=0$, through the binary one winding 21 representing $B_n=1$, and through the binary zero winding 28 representing $C_{n-1}=0$. Electric current flow through each of the windings 17, 21 and 28 causes an electromagnetic field to build up which cuts the gate elements which these windings surround and results in raising the resistivity of the gate elements above the superconducting state. Accordingly, the gate elements surrounded by these windings will exhibit a normal conductivity, and hence will possess some resistivity, while the superconducting gate elements which are not surrounded by such an electromagnetic field will continue to be superconducting, and in effect will exhibit zero resistivity. As a consequence, it is possible to trace out one superconducting path extending between the source of summation current $I_s$ and either one of the two output terminals. In the specific example in mind, this path will constitute the part of superconducting gate element 11 surrounded by the binary one winding 16 of the $C_{n-1}$ numeral coil pair since this winding is unenergized, the part of superconducting gate element 19 surrounded by the binary zero winding 22 of the $B_n$ numeral coil pair, and superconducting gate element 23 which is surrounded by the binary one winding of the $A_n$ numeral coil pair. It can be appreciated that this superconducing path is connected to the one output terminal, and hence, the answer shown by the truth table to be the correct answer is obtained through the operation of arithmetic module. For all other eight combinations of input factors set forth in the preceding table, one such superconducting path will result providing the correct answer at the output terminals of the arithmetic module.

From examination of the above table, it can be appreciated that for certain combinations of numerals there will be a carry sum due to the nature of binary addition. These carry sums are listed to the right of the above table. For example $A_n=1$ plus $B_n=1$ provides an output sum of zero, but a carry sum of one. In order to develp these carry sums and supply them to the next succeeding stage in an addition operation being carried out, a carry unit is provided. A carry unit for the arithmetic unit shown in FIGURE 2 is illustrated just below the arithmetic unit. To all intents and purposes the carry unit is identical in construction to the arithmetic unit with the exception that certain of the gate elements are connected to different output terminals representing either a binary zero or a binary one. For example, in the carry unit the superconducting gate element 18' of the carry unit is connected to the binary zero output terminal as opposed to its corresponding gate element 18 in the arithmetic unit which is connected to the binary one output terminal, and the gate element 19' is connected to the one output terminal as opposed to its corresponding gate element 19 in the arithmetic unit which is connected to the zero output terminal. Other structural differences include the superconducting gate element 23' which is connected to the zero output terminal, the gate element 24' connected to the one output terminal, the gate element 25' is connected to the one output terminal, and the gate element 26' is connected to the binary zero output terminal. The coil pairs for the different digits to be resolved are connected surrounding the corresponding superconducting gate elements, and are similar in construction to the coil pairs formed on the adder unit. In fact, the coil pairs on the carry unit are connected directly to each of the coil pairs on the arithmetic module for convenience, and to assure that the carry unit is supplied with the same problem as supplied to the arithmetic module. Accordingly, the binary zero windings 17 and 17' for the $C_{n-1}$ digit are interconnected, as are the binary one windings 16 and 16', and similarly for each of the other two digits $A_n$ and $B_n$ to be resolved by the module. From an examination of the truth table shown in FIGURE 1, the carry sum obtained at the output terminals of the carry unit can be derived. For example, assuming $A_n=1$, $B_n=1$ and $C_{n-1}=1$, the answer will be one for the output signal $C_n$ for the carry unit. Now examining the carry unit it can be seen that for the example cited, current will flow in the binary one winding 16' of the $C_{n-1}$ digit, the binary one winding 21' of the $B_n$ digit, and the binary one winding 27' of the $A_n$ digit. Accordingly, one of the conductors which is not surrounded by each of these three windings will provide the superconducting path between the source of summation current $I_c$ and the output terminals. Only the superconducting gate element 12' will provide such a superconducting path, and it is connected to the one output terminal. Similar combination of inputs listed in the above table will provide only one superconducting path between the input side of the carry unit and the output terminals so that output current is provided selectively at either the binary one or the binary zero output terminal of the unit.

In utilizing the arithmetic module with other such modules to perform an arithmetic network, the modules are interconnected in the manner shown in the schematic block diagram of FIGURE 3. In this arrangement, the first set of digits to be resolved $A_0$ and $B_0$ are supplied to the second and third coil pairs in the adder unit and the first digit coil pair has the $C_{n-1}$ or I carry current supplied with the summation current $I_s$ being supplied to the first unit. This first unit will then perform the binary addition operation with respect to $A_0$, $B_0$ and $I_{carry}$, and provide at its two output terminals the carry output current and a sum output current. A part of the sum output current may be connected to the next successive stage as a source of summation current $I_s$ together with the carry sum $C_{n-1}=C_0$. This next stage will then perform the binary addition of $A_1$, $B_1$ and $C_0$, and so on down the line until $A_2$, $B_2$ and $C_1$, and $A_n$, $B_n$ and $C_1$ are added to provide at the output terminals output signals respresentative of the sums $S_0$, $S_1$, $S_2$, and $S_n$ resulting from the four different binary addition operations. The manner in which these modules are interconnected in a computer to form a more involved addition network will be described more fully hereinafter with respect to the embodiment of the invention disclosed in block diagram form in FIGURE 22 of the drawings.

An arithmetic module for use as a subtractor is illustrated in FIGURE 5 of the drawings. This subtractor module comprises a first pair of superconducting gate elements 35 and 36 connected in parallel circuit relationship to a source of summation current $I_s$, with the superconducting gate element 35 being connected directly to the zero output terminal, and the superconducting gate element 36 being connected directly to the binary one output terminal. A second pair of superconducting gate elements 37 and 38 are connected to the first gate elements at a point intermediate the output terminals thereof and the source of summation current $I_s$. The second gate element 37 is connected to the first gate element 36 and to the one output terminal, and the second superconducting gate element 38 is connected to the first gate element 35 at the output side of a binary one coil winding to be described more fully hereinafter, and to the zero output terminal. Connected to both the first and second superconducting gate elements 37 and 38 at the output side thereof from the second digit coil pair surrounding the same, is a third set of double superconducting gate elements. The third set of gate elements is comprised by a third gate element 39 connected to the second gate element at the output side of the second digit coil pair binary zero winding and to the one output terminal, and a third gate element 41 connected to the first gate element 36 at the output side of the second digit coil pair binary zero winding and to the zero output terminal. A third digit superconducting gate element 42 is connected to the first gate element 35 at the output side of the binary one winding of the second digit coil pair, and to the zero output terminal and the third superconducting gate element 43 is connected. A first digit coil pair is provided by a superconducting field winding 45 which represents a binary one and surrounds the first superconducting gate element 35, and by a superconducting field winding 46 which surrounds the first superconducting gate element 36 and represents a binary zero. The coil pair formed by the winding 45 and 46 represents the first digit coil pair for the first digit to be resolved by the unit. A second digit coil pair is provided by a superconducting field winding 47 which surrounds the second superconducting gate element 37 and represents a binary one, and a superconducting field winding 48 which surrounds the second superconducting gate element 38 and represents a binary zero. The coil pair formed by the winding 47 and 48 serves to read into the arithmetic module the digit represented by $B_n$. A third digit coil pair is provided by a superconducting field winding 51 which surrounds the third gate elements 39 and 41 and represents a binary one, and a superconducting field winding 52 which surrounds the third gate elements 42 and 43 and represents a binary zero. The third digit coil pair formed by the windings 51 and 52 serves to introduce a third digit $A_n$ to be resolved into the arithmetic module.

In operation, the subtractor unit shown in FIGURE 5 of the drawings is very similar to the addition unit; however, it produces a difference output signal representative of the difference of the various digits supplied thereto as opposed to the summation of these digits. The truth table for the subtractor unit is shown in FIGURE 4 of the drawings wherein the factor $A_n$ is listed in the two broad vertical columns to the right of the letter $A_n$, the factor $B_n$ is listed in the two broad horizontal lines below the letter $B_n$, and the factor $C_{n-1}$ which is the carry from the preceding stage represented by the four vertical columns to the left of $C_{n-1}$. As an example, it can be seen that if $A_n=1$, $B_n=1$ and $C_n=1$, the output sum will equal one. The following is a table of answers for the various combination of values which may be supplied to the three stage subtractor shown in FIGURE 5.

| $S_n$ | $A_n$ | $B_n$ | $C_{n-1}$ | $C_n$ |
|---|---|---|---|---|
| 0 | 0 | 0 | 0 | 0 |
| 1 | 0 | 0 | 1 | 1 |
| 1 | 0 | 1 | 0 | 1 |
| 0 | 0 | 1 | 1 | 1 |
| 1 | 1 | 0 | 0 | 0 |
| 0 | 1 | 0 | 1 | 0 |
| 0 | 1 | 1 | 0 | 0 |
| 1 | 1 | 1 | 1 | 1 |

The above table listed all the possible combination of factors which may be supplied to the three stage subtractor shown in FIGURE 5 of the drawings. From a consideration of the above table, it can be appreciated that for the combination of factors $A_n=1$, $B_n=1$ and $C_{n-1}=1$ the output difference signal $S_n$ will be one. In tracing through the operation of the subtractor unit, if the binary one windings of all the coil pairs are energized with current, it can be appreciated that there will be no superconducting path along the upper portion of the subtracting unit, and that only the first superconducting gate element 36 will provide a superconducting path between the input source of summation current $I_s$ to the output terminals, and that this superconducting gate element is connected to the one output terminal.

Because in many of its operations the subtractor unit shown in FIGURE 5 of the drawings develops, in addition to an output difference value, a carry value, it is necessary to have a borrow unit interconnected with the subtractor unit proper to provide a borrow signal resulting from the subtraction carried out by the subtractor unit. For this purpose, a borrow unit is provided which to all intents and purposes is similar in construction to the subtractor unit, and includes the first gate elements 35′, 36′, second gate elements 37′, 38′ and third gate elements 39′ and 41′, 42′ and 43′. The only difference in construction between the borrow unit and the subtractor unit is that the superconducting gate element 41′ of the borrow unit is connected to the one output terminal, and the superconducting gate element 43′ is connected to the zero output terminal. The first, second and third digit coil pairs of the borrow unit all have the binary one winding thereof interconnected with the binary one winding of a corresponding coil pair on the subtractor unit, and likewise the binary zero windings of each of the coil pairs is interconnected with corresponding binary zero windings on the subtractor unit. By this construction, it is assured that the factors read into the subtractor unit will also be automaticaly inserted into the borrow unit.

The truth table for the borrow unit is illustrated in FIGURE 4 of the drawings wherein it can be seen for the example cited above, namely $A_n=1$, $B_n=1$ and $C_{n-1}=1$, the output carry signal equals one. This answer may be confirmed by carrying out the subtraction involved, as well as by observation of the table set forth above where it can be seen that for the combination of the three factors cited the borrow output signal equals one. In tracing out the operation of the borrow unit, it can be seen that upon the binary one windings of all the digit coil pairs being energized, the only remaining superconducting path between the source of carry current $I_c$ (which for purposes of convenience is derived from the $B_{n-1}$ digit coil pair of the arithmetic unit) is the superconducting gate element 36′ which is connected to the one output terminal. For any other combination of digits, there will be one superconducting path extending between the input end of the borrow unit and the output terminals which will provide an output indication of any borrow value resulting from the subtraction operation carried out by the subtractor module of FIGURE 5.

The manner in which the subtractor modules illustrated in FIGURE 5 of the drawings are interconnected to perform an arithmetic operation is illustratd in FIGURE 6. In FIGURE 6, each of the boxes 53, 54 and 55 represents a subtractor module such as that shown in FIGURE 5. It can be appreciated that the first combination unit 53 will have supplied to its input the three digits to be resolved $A_0$, $B_0$ and any borrow value $C_{n-1}$ from a preceding stage of arithmetic, not shown, as well as the summation current $I_s$. Depending upon the value of these factors, an output signal $S_0$ will be provided in one of the output terminals representing the difference of the signals supplied to the unit, as well as a borrow signal $C_0$ which is supplied to the next succeeding unit 54 together with the next two factors $A_1$ and $B_1$ to be subtracted. For convenience, the current which supplies the difference signal to the output terminal is also tapped off and is supplied to the next succeeding subtractor stage as a source of difference current $I_s$. The third unit 55 is similarly connected so that the output terminals of the three units provide an output signal representative of the three values $S_0$, $S_1$ and $S_n$, which are the difference values obtained from the three stages of subtraction performed in these interconnected units.

Figure 7:
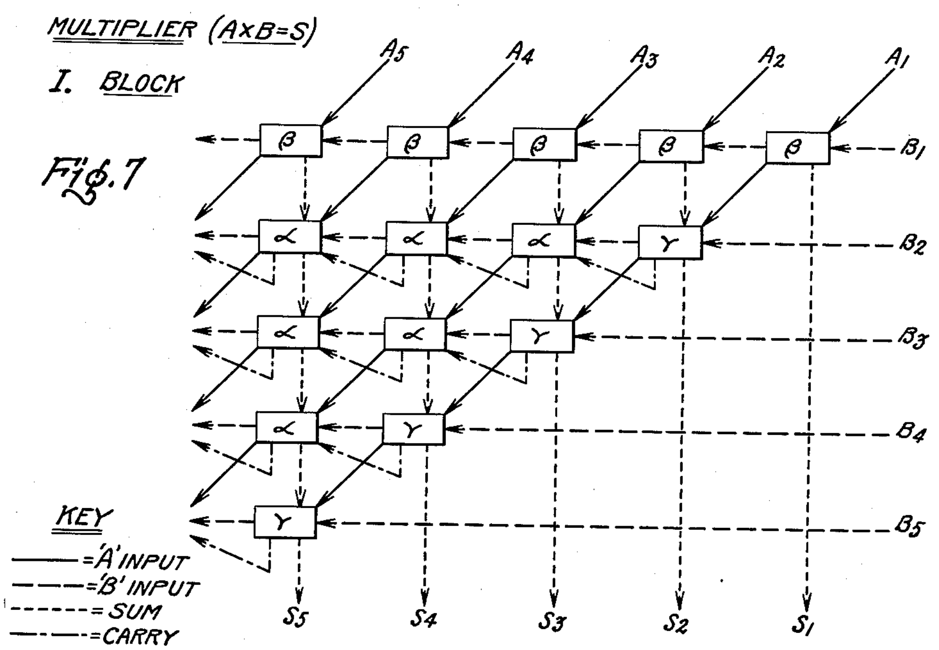
FIGURE 7 is a functional block diagram of a cryogenic multiplication network constructed in accordance with the present invention.
Figure 9:
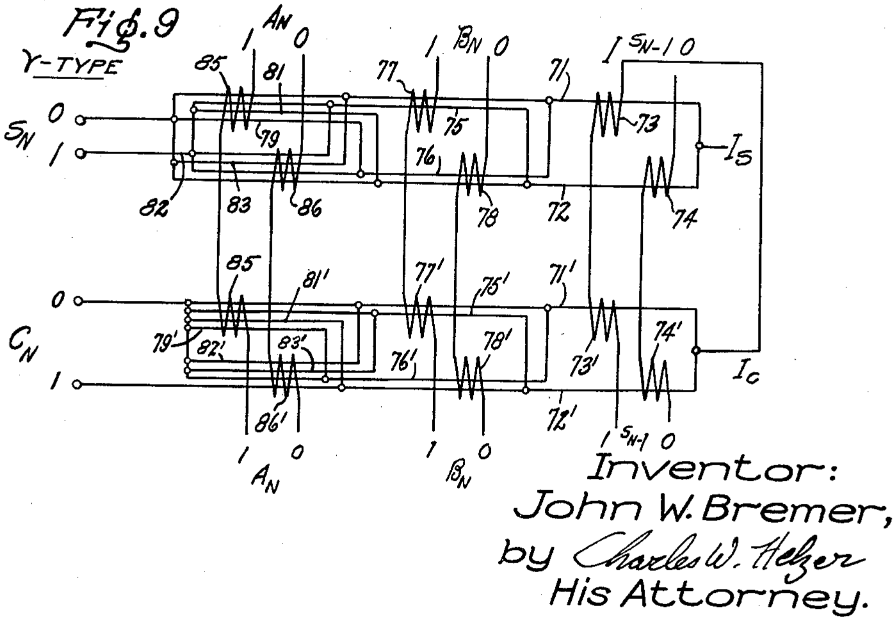
FIGURE 9 shows the circuit details of construction of a cryogenic gamma type multiplier module used in the multiplication network of FIGURE 7.
Figure 10:
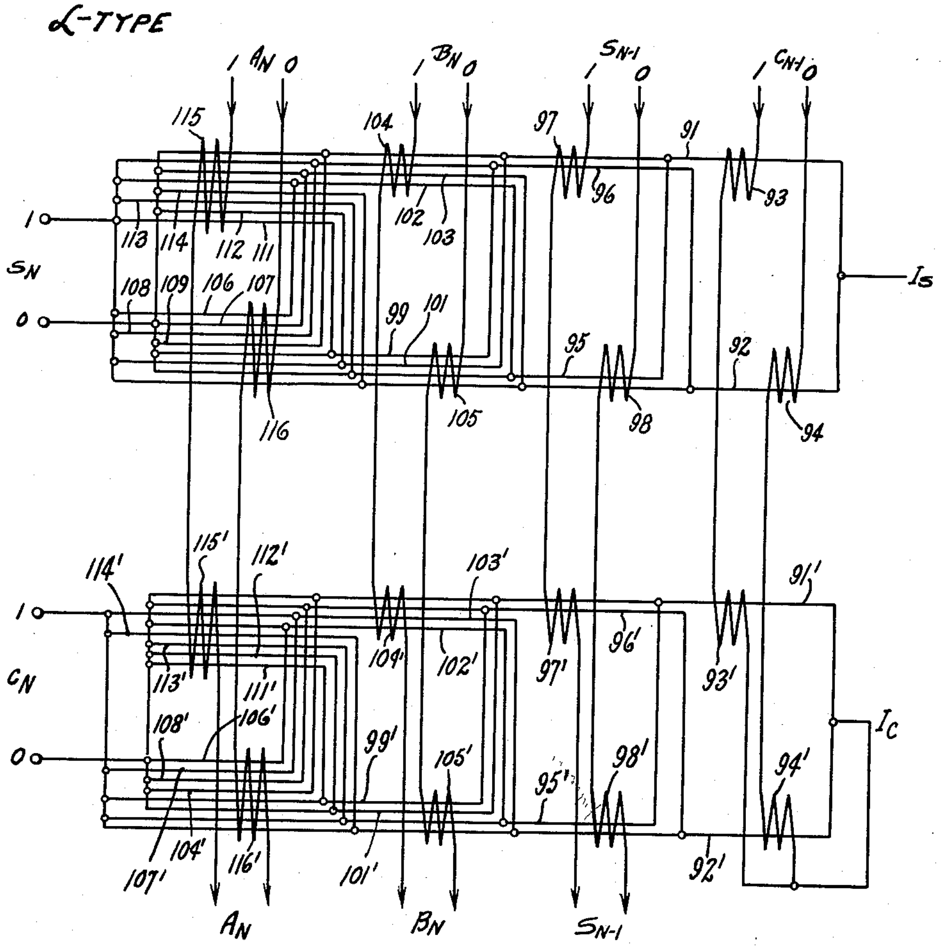
FIGURE 10 shows the circuit details of construction of a cryogenic alpha type multiplier module constructed in accordance with the present invention and used in the multiplication network of FIGURE 7.

FIGURE 7 of the drawings is a functional block diagram of a multiplier unit made up of different types of multiplier and multiplier-adder modules constructed in accordance with the present invention. Each of these modules differs from the other and has a distinctive identifying characteristic in that it is adapted to receive certain factors to produce an output signal representative of the product of these factors. For example, the multiplier module labelled beta ($\beta$) is adapted to receive two input signals $A_1$ and $B_1$ and multiply these two factors together and produce an output signal $S_1$ representative of the product thereof. The multiplier-adder module labelled gamma ($\gamma$) is adapted to receive three input signals, for example $A_1$, $B_2$ and a value $S_{n-1}$ representing the partial product of a previous multiplier, and to produce an output signal $S_n$ representative of their sum as well as a partial product carry signal $C_n$. The multiplier-adder module alpha ($\alpha$) is designed to receive three input signals, for example $B_2$, $A_2$ and a partial product $S_3$, and to multiply two of these factors $A_2$, $B_2$, and to add the resulting partial product to the partial product $S_3$, and a partial carry factor $C_{n-1}$ from a previous unit, and to produce a summation output signal representative of a new partial product $S_n$ as well as a new partial carry value $C_n$. The specific multiplier-adder network shown in FIGURE 7 is adapted to multiply five digits $A_1$ to $A_5$ by a second set of five digits $B_1$ to $B_5$. To accomplish this, each of the three different types of multiplier modules illustrated in FIGURES 8, 9, and 10 are required.

Figure 8:
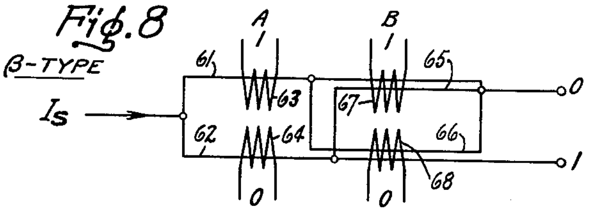
FIGURE 8 shows the circuit details of construction of a cryogenic beta type multipler unit employed in the multiplication network of FIGURE 7.

FIGURE 8 of the drawings illustrates a beta ($\beta$) type multiplier unit which is capable of two stage multiplication, and requires no carry unit. The beta type multiplier comprises a first set of superconducting gate elements 61 and 62 which are interconnected to a source of electric summation current $I_s$. The superconducting gate elements 61 and 62 are surrounded by a first digit coil pair formed by a superconducting field winding 63 which represents a binary one, and by a superconducting field winding 64 which represents a binary zero. The binary one winding 63 surrounds the first superconducting gate element 61, and the binary zero winding 64 surrounds the second superconducting gate element 62. A pair of second superconducting gate elements 65 and 66 are connected to the first gate element 61 and 62 with the second superconducting gate element 65 being connected to the first gate element 64 at the output side of the binary zero winding 64 of the first digital coil pair, and is connected to the zero output terminal. The second superconducting gate element 66 is connected to the first gate element 63 at the output side of the binary one winding 63 of the first digit coil pair, and is likewise connected to the zero output terminal. Both of the second superconducting gate elements 65 and 66 are surrounded by a coil pair formed by a superconducting field winding 67 which represents a binary one, and a superconducting field winding 68 which represents a binary zero.

The truth table for the beta type multiplier shown in FIGURE 8 is illustrated in FIGURE 11*a* of the drawings wherein the answers are shown for the four possible combinations of values of the two factors A and B to be multiplied.

| $S_n$ | $A_n$ | $B_n$ |
|---|---|---|
| 0 | 0 | 0 |
| 0 | 0 | 1 |
| 0 | 1 | 0 |
| 1 | 1 | 1 |

The above table shows the various answers that may be obtained with the beta type multiplier. By inspection of the beta type multiplier of FIGURE 8, it can be appreciated for any three combinations of the values of digits A and B where either one of the two digits include a zero, the superconducting path can only be connected to the zero output terminal. However, where both digits equal one the superconducting path will exist between the input of the summation curent $I_s$, and the one output terminal. This arrangement coincides with the answers provided in the truth table shown in FIGURE 11*a*, and listed in the table above.

A gamma ($\gamma$) type multiplier-adder is illustrated in FIGURE 9 of the drawings together with its interconnected carry unit. The gamma multiplier comprises a pair of first superconducting gate elements 71 and 72 connected in parallel to a source of summation current $I_s$, and to a single output terminal representing a binary zero. The first superconducting gate elements 71 and 72 are surrounded by a coil pair formed by a superconducting field winding 73 which represents a binary one, and a superconducting field winding 74 which represents a binary zero. The coil pairs 73 and 74 serve to read in one of the digits to be resolved $S_{n-1}$ which is an output sum representing a partial product produced by the preceding beta ($\beta$) multiplier stage as illustrated in block diagram of FIGURE 7. A pair of second superconducting gate elements 75 and 76 are connected to the first superconducting gate elements 71 and 72 on the output side of the second digit coil pair, and are both connected to an additional output terminal representing a binary one. The second superconducting gate elements 75 and 76 are surrounded by a second digit coil pair comprised by a superconducting field winding 77 that represents a binary one, and a superconducting field winding 78 that represents a binary zero. The windings 77 and 78 form the second digit coil pair for reading into the gamma ($\gamma$) multiplier the digit $B_n$ to be multiplied. A third set of superconducting gate elements is provided by superconducting gate elements 79, 81, 82 and 83. The third superconducting gate element 79 is connected to the second gate element 76 at the output side of the binary zero winding 78 of the second digit coil pair, and to the zero output terminal. The third superconducting gate element 81 is connected to the second superconducting gate element 72 at the output side of the binary zero winding 78 of the second digit coil pair, and is connected to the one output terminal. The third superconducting gate element 82 is connected to the second superconducting gate element 75 at the output side of the binary one winding 77 of the second digit coil pair, and is connected to the one output terminal, and the third gate element 83 is connected to the first gate 71 at the ouput side of the binary one winding 77 of the second digit coil pair, and is connected to the zero output terminal. By connecting the gamma multiplier in this manner, it is possible to obtain an output signal at the output terminals which is the sum of the partial product of the two digits $A_n$, $B_n$ and the partial product $S_{n-1}$ supplied to the coil pairs 73, 74 of the multiplier.

The truth table for the gamma type multiplier-adder is shown in FIGURE 11*b* of the drawings, and if desired, values can be checked by multiplication of the two factors $A_n$, $B_n$ and adding their partial product to the partial product $S_{n-1}$. The values for $A_n$ are listed in the two larger vertical columns to the right of A, the values for $B_n$ are listed in the single vertical column below B, and the values for $S_{n-1}$ are listed in the four vertical columns to the right of the character S which is separated from B by the diagonal line. In reading the gamma type multiplier-adder truth table, the values for the output current representative of the new partial product of the factors supplied to the multiplier are shown in the upper left hand side of the diagonal line separating each box into two parts and the carry values are listed in the lower right hand side of the box. The following table lists the various values obtained at the output terminals of the gamma type multiplier-adder for the multiplicity of input digits that may be supplied to the separate coil pairs thereof.

| $S_n$ | $A_n$ | $B_n$ | $S_{n-1}$ | $C_n$ |
|---|---|---|---|---|
| 0 | 0 | 0 | 0 | 0 |
| 1 | 0 | 0 | 1 | 0 |
| 0 | 0 | 1 | 0 | 0 |
| 1 | 0 | 1 | 1 | 0 |
| 0 | 1 | 0 | 0 | 0 |
| 1 | 1 | 0 | 1 | 0 |
| 1 | 1 | 1 | 0 | 0 |
| 0 | 1 | 1 | 1 | 1 |

From a consideration of the above table it can be appreciated that for any combination of values supplied to the coil pairs wound on the gamma multiplier unit an output current will be reproduced at the output terminal which is representative of the product of these values. For example, assume that $A_n=1$, $B_n=0$ and $S_{n-1}=1$, then a superconducting current path will be formed and may be traced through the gate element 72, the gate element 75, and the gate element 82 to the one output terminal thus providing a proper answer of a new partial product produced by the multiplication of the two digits $A_n$, $B_n$ and adding their partial product to the partial product $S_{n-1}$ as may be confirmed from the above table.

It can be appreciated that certain combinations of factors supplied to the gamma type multiplier-adder unit will result in a partial carry output value which for accuracy should be supplied to the next stage of multiplication in any arithmetic unit that might be built up using such modules. For this purpose, a carry unit is provided which for all intents and purposes is similar in construction to the gamma type multiplier and hence corresponding elements in the carry unit have been given the same reference numeral primed as the corresponding parts in the multiplier. It should be noted, however, that in the carry unit for the gamma type multiplier, the first gate element 72' is connected to the one output terminal with all of the remaining gate elements including the first gate element 71' being connected to the zero output terminal. In operation, the carry unit functions in the same manner as the multiplier-adder itself, and the previous carry units described. In the example cited, for instance, where the input digits have the values $A_n=1$, $B_n=0$ and $S_{n-1}=1$, the windings 85', 78' and 73' of the coil pairs will each be selectively energized. Under such conditions, a superconducting path will exist only through the gate element 72', 75' and 83' which is connected to the zero output terminal. Hence, for the particular combination of digits cited, the partial carry output will be zero. From a quick check of the truth table shown in FIGURE 11*b*, and from the table cited above, it can be appreciated that this is the correct value. Similarly, for any other combination of digits supplied to the gamma type multiplier-adder and its carry unit, output currents will be produced at the output terminals representative of the new partial product of the digits supplied to the multiplier-adder and any carry value produced.

A second type multiplier-adder, known as an alpha ($\alpha$) multiplier, required in the arithmetic unit of FIGURE 7 is illustrated in FIGURE 10 of the drawings, and utilizes four input values. The alpha multiplier-adder shown in FIGURE 10 comprises a first superconducting gate element 91 connected between a source of electric summation current $I_s$, and an output terminal representing a binary zero, and a first superconducting gate element 92 connected in parallel with gate 91 to the source of summation current $I_s$, and a second output terminal representing a binary one. The first gate elements 91 and 92 are surrounded by a first digit coil pair formed by a superconducting field winding 93 which represents a binary one and a superconducting field winding 94 which represents a binary zero. The winding 93 surrounds the gate element 91, and the winding 94 surrounds the gate element 92. The digit representing the partial carry $C_{n-1}$ of a previous stage is applied to the first digit coil pair formed by the windings 93 and 94. A second gate element 95 is connected to the first gate element 91 at the output side of the binary one winding 93 of the first digit coil pair, and is also connected to the zero output terminal. A second superconducting gate element 96 is connected to the first gate element 92 at the output side of the binary zero winding 94 of the first digit coil pair, and is also connected to the one output terminal. The second superconducting gate elements 95 and 96 are both surrounded by a second digit coil pair formed by a winding 97 which represents a binary one and surrounds the second superconducting gate element 96. The second superconducting gate element 95 is surrounded by a winding 98 which represents a binary zero. The second digit coil pair made up of windings 97 and 98 have the second digit $S_{n-1}$ which represent the partial product of the previous stage supplied thereto. A third set of double superconducting gate elements are connected to the first gate elements for a third digit to be resolved by the unit. The third set of double superconducting gate elements comprises a gate element 99 which is connected to the second superconducting gate element 96 at the output side of the binary one winding 97 of the second digit coil pair, and is also connected to the zero output terminal. A third superconducting gate element 101 is connected to the first gate element 91 at the output side of the binary one winding 97 of the second digit coil pair, and is connected to the one output terminal. A third superconducting gate element 102 is connected to the second superconducting gate element 95 at the output side of the binary zero winding 98 of the second digit coil pair, and is also connected to the binary one output terminal. A third superconducting gate element 103 is connected to the first gate element 92 at the output side of the binary zero winding 98 of the second digit coil pair, and is connected to zero output terminal. The third superconducting gate elements 99–103 are surrounded by a third digit coil pair formed by a winding 104 representing a binary one, and a winding 105 which represents a binary zero. It should be noted that the number of third superconducting gate elements are exactly double the number of the preceding first and second gate elements 91, 92, 95 and 96. Accordingly, for each digit to be resolved the successive stages provide double the number of superconducting paths provided for the preceding stages. A fourth set of superconducting gate elements are provided for a fourth digit to be resolved which are exactly double in number, the number of the preceding gate elements for the first three digits to be resolved by the alpha type multiplier-adder. The fourth set of superconducting gate elements include a fourth gate element 106 connected to the third gate element 102 at the output side of the binary one winding 104 of the third digit coil pair, and is connected also to the one output terminal. A fourth gate element 107 is connected to the third gate element 103 at the output side of the binary one winding 104 of the third digit coil pair, and to the zero output terminal. A fourth gate element 108 is connected to the second gate element 96 at the output side of the binary one winding 104 of the third digit coil pair, and to the one output terminal. And a fourth gate element 109 is connected to the first gate element 91 at the output side of the binary one winding 104 of the third digit coil pair, and to the zero output terminal. The set of fourth gate elements also includes a fourth gate element 111 connected to the third gate element 99 at the output side of the binary zero winding 105 of the third digit coil pair, and to the one output terminal. A fourth gate element 112 is connected to the third gate element 101 at the output side of the binary zero winding 105 of the third digit coil pair and to the zero output terminal. A fourth gate element 113 is connected to the second gate 95 at the output side of winding 105, and to the zero output terminal. A fourth gate element 114 is connected to gate 92 at the output side of winding 105, and to the zero output terminal. The fourth gate elements 106–114 are surrounded by a fourth digit coil pair formed by a winding 155 which represents a binary one, and a winding 116 which represents a binary zero. In operation, the digit $A_n$ to be multiplied by the alpha multiplier-adder is supplied to the fourth digit coil pair, and is multiplied by the digit $B_n$ supplied to the third digit coil pair. The partial product of a previous stage $S_{n-1}$ is supplied to the second digit coil pair, and is added to the partial product of $A_n \times B_n$, and to the value $C_{n-1}$ which represents a carry value from a preceding stage supplied to the first coil pair.

The truth table for the alpha type multiplier-adder is shown in FIGURE 11*c* of the drawings wherein the digit $A_n$ is listed in the two wide columns to the right of the letter A, the digit $B_n$ is listed in the two wide lines below the letter B, the digit $S_{n-1}$ is listed in the four narrow columns to the right of the letter S which is separated by a diagonal line from the letter C, and the digit $C_{n-1}$ is listed in the four narrow lines bellow the letter C. The following table lists all of the possible combinations of input digits that may be supplied to the alpha type multiplier and indicates the value of the output current that can be provided at the output terminal for such combinations.

| $S_n$ | $A_n$ | $B_n$ | $S_{n-1}$ | $C_{n-1}$ | $C_n$ |
|---|---|---|---|---|---|
| 0 | 0 | 0 | 0 | 0 | 0 |
| 1 | 0 | 0 | 0 | 1 | 0 |
| 1 | 0 | 0 | 1 | 0 | 0 |
| 0 | 0 | 0 | 1 | 1 | 1 |
| 0 | 0 | 1 | 0 | 0 | 0 |
| 1 | 0 | 1 | 0 | 1 | 0 |
| 1 | 0 | 1 | 1 | 0 | 0 |
| 0 | 0 | 1 | 1 | 1 | 1 |
| 0 | 1 | 0 | 0 | 0 | 0 |
| 1 | 1 | 0 | 0 | 1 | 0 |
| 1 | 1 | 0 | 1 | 0 | 0 |
| 0 | 1 | 0 | 1 | 1 | 1 |
| 1 | 1 | 1 | 0 | 0 | 1 |
| 0 | 1 | 1 | 0 | 1 | 1 |
| 0 | 1 | 1 | 1 | 0 | 1 |
| 1 | 1 | 1 | 1 | 1 | 1 |

To illustrate how the alpha multiplier-adder works, assume that $A_n=1$, $B_n=0$, $S_{n-1}=1$ and $C_{n-1}=0$. In this example, current would be supplied to the binary zero winding 94 of the first digit coil pair, the binary one winding 97 of the second digit coil pair, the binary zero winding 105 of the third digit coil pair, and the binary one winding 115 of the fourth digit coil pair. With this combination of values supplied to the multiplier-adder there will be only one superconducting path extending between the source of summation current $I_s$ and the output terminals, and this path is formed by the first gate element 91, the second gate element 95, the third gate element 102, and the fourth gate element 106 which is connected to the one output terminal. Hence the answer provided by the multiplier-adder will be one, and from an inspection of the truth table shown in FIGURE 11*c*, and the above chart, it can be appreciated that the currect answer to be provided to the output terminal is one.

As may be determined from the truth table shown in FIGURE 11*c* or from the above chart, there will be certain combinations of digits which will provide a partial carry value. Accordingly, it is essential to supply a carry unit to the alpha type multiplier-adder unit shown in FIGURE 10, and this unit is substantially similar to the multiplier-adder unit with the following exceptions. The first superconducting gate element 95′ corresponding to the first gate element 95 of the multiplier-adder is connected to the one output terminal as distinguished from its corresponding element 95 in the multiplier-adder which is connected to the zero terminal. The second gate element 96′ is connected to the zero terminal. The third gate element 99′ is connected to the one terminal, and the third gate element 101′ is connected to the zero output terminal. The third gate element 102′ is connected to the zero output terminal, and the third gate element 103′ is connected to the one output terminal. The fourth gate element 106′ is connected to the zero output terminal, the fourth gate element 107′ is connected to the one output terminal, and the fourth gate element 108′ is connected to the zero output terminal. The fourth gate element 111′ is connected to the zero output terminal, the fourth gate element 113′ is connected to the zero output terminal, and the fourth gate element 114′ is connected to the one output terminal. The first gate elements 91′ and 92′ are surrounded by a superconducting field winding 93′ and a superconducting field winding 94′ respectively, or a first digit coil pair with the binary one winding 93′ being connected directly to corresponding binary one winding 93 of the first digit coil pair of the alpha type multiplier-adder unit, and the binary zero winding 94′ of the carry unit being connected to its corresponding winding 94 of the multiplier-adder unit. The second gate elements 96′ is surrounded by a superconducting field winding 97′ which represents a binary one and is connected directly to its corresponding binary one winding 97 of the multiplier-adder unit. The second gate element 95 is surrounded by a superconducting field winding 98′ that represents a binary zero and is connected directly to the binary zero winding 98 of the multiplier-adder unit. The two windings 97′ and 98′ form a coil pair for the second digit $S_{n-1}$ which represents the partial product of the preceding multiplication stage. The third gate elements 99′ and 101′ are surrounded by a superconducting field winding 105′ that represents a binary zero and is connected directly to binary zero winding 105. The third gate elements 102′ and 103′ is surrounded by a superconducting field winding 104′ which represents a binary one, and is connected directly to the binary one winding 104 of the multiplier-adder unit. The winding 104′ and 105′ form a third digit coil pair for the carry unit which corresponds to the third digit coil pair of the multiplier unit, and hence has the digit $B_n$ to be resolved by the units supplied thereto. A superconducting field winding 115′ surrounds the superconducting gate elements 111′ to 114′ and represents a binary one. The binary one winding 115′ of the carry unit is connected to the binary one winding 115 of the alpha multiplier-adder unit so that the signal or current supplied to the binary one winding 115 of the multiplier-adder is also supplied to the winding 115′ of the carry unit. Superconducting gate elements 106–109 are surrounded by a winding 116′ which represents a binary zero, and is connected directly to the binary zero winding 116 of the alpha multiplier unit. Two windings 115′ and 116′ form the fourth digit coil pair and are adapted to receive the $A_n$ digit simultaneously with that digit being read into an alpha multiplier-adder unit.

The partial carry unit operates similar to the alpha type multiplier-adder unit and its truth table is shown in FIGURE 11*c* of the drawings where for any value of input digits supplied to the multiplier module, the values of the carry are shown in the lower right hand boxes of the truth table. The values of the partial carry output current for any given combination of input factors is also shown in the above table. In the example cited where $A_n=1$, $B_n=0$, $S_{n-1}=1$ and $C_{n-1}=0$, it can be determined from the truth table and from the above chart that the output partial carry value should equal zero. In tracing the carry operation through from the input source of carry current to the output terminals, there is one superconducting path for the values of the factors supplied to the unit set forth above. This path is made up of first gate element 91′, second gate element 95′, third gate element 102′ and fourth gate element 106′ which is connected to the zero output terminal thereby providing the correct answer.

Figure 12:
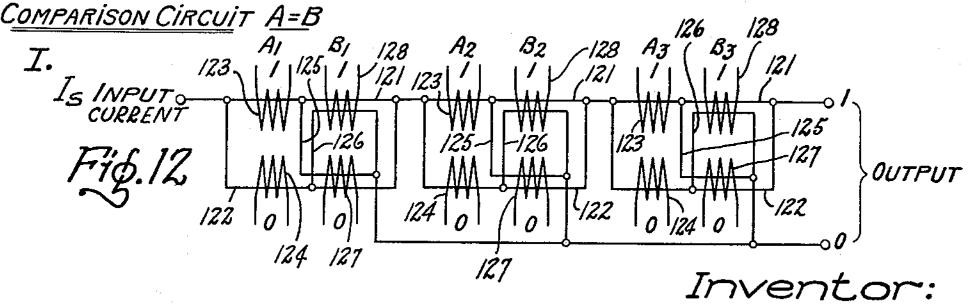
FIGURE 12 is a schematic circuit diagram of a cryogenic comparison circuit for comparing $A=B$, in accordance with the present invention.

FIGURE 12 of the drawings shows the details of construction of a comparison circuit for deriving an output indication of whether a series of signals supplied to the circuit are all equal in value. The circuit shown in FIGURE 12 of the drawings is designed to compare two digits A and B to determine whether or not they are equal. For this purpose the comparison circuit shown in FIGURE 12 includes a pair of first superconducting gate elements 121 and 122 connected in parallel between a source of summation currents $I_s$ and an output terminal representing a binary one. The first gate elements 121 and 122 are connected in a closed loop circuit thereby, and there are as many such circuits connected serially together as there are pairs of digits to be compared. In the specific comparison circuit shown in FIGURE 12 there are three sets of digits to be compared, and accordingly there are three such circuits. The first gate element 121 is surrounded by a superconducting field winding 123 of superconducting material which represents a binary one, and the gate element 122 is surrounded by a superconducting field winding 124 which represents a binary zero. The windings 123 and 124 form a coil pair for the first digit $A_1$ to be compared. The additional sets of closed loop circuits for additional sets of digits to be compared have similar coil pairs 123 and 124 surrounding the first gate elements thereof for supplying the first digits $A_1$, $A_2$, and $A_3$ to be compared to the circuit. Connected to the first superconducting gate element 121 is a second superconducting gate element 125 which is connected to the first gate element 121 at the output side of the binary one winding and which is connected to an additional output terminal representing a binary zero. Connected to the first gate element 122 is a second superconducting gate element 126 which is connected to the first gate element 122 at the output side of the binary zero winding 124 of the first digit $A_1$ to be resolved by the circuit, and is also connected to the additional output terminal representing a binary zero. The additional closed loop circuits for the additional digits to be compared has similar second gate elements 125 and 126 connected to the first gate elements thereof and to the additional output terminals representing binary zero. The second gate element 125 is surrounded by a superconducting field winding 127 which represents a binary zero, and second gate element 126 is surrounded by a superconducting field winding 128 which represents a binary one. The windings 127 and 128 form a second digit coil pair for reading the second digit $B_1$ into the comparison circuit. The additional closed loop circuits of the additional digits $A_2$, $B_2$ and $A_3$, $B_3$ which are to be compared also have the second digit coil pairs formed by the windings 127 and 128 surrounding the second gate elements thereof.

In operation, it can be appreciated that in the event that $A_1=B_1$ in all three sets of digits being compared, that an output summation current will appear at the binary one output terminal of the circuit irrespective of whether $A=B=1$ or $A=B=0$. This can be seen by tracing through the circuit assuming $A_1=B_1=1$, $A_2=B_2=0$ and $A_n=B_n=1$. In the example cited, a superconducting path will extend from the source of input summation current through superconductor first gate element 122 of the first set of digits to be resolved to the first gate element 121 of the second set of digits to be resolved, and through the first gate element 122 of the third set of digits to be resolved. In the event that with any of the three sets of digits it is not true that $A=B$, then of course this closed circuit superconducting path will not exist due to current flowing in one of the windings of the coil pairs which will destroy the closed superconducting path between the source of input summation current and the binary one output terminal. For example, assume that in the second set of digits $A_2=1$ and $B_2=0$. In this latter example, there would be no superconducting path which would connect the source of input summation current to the binary one output terminal since the current flowing in the binary one winding of the first digit coil pair $A_2$ would render the path through the first gate element 121 normally resistive, and the current flowing through the binary zero winding 127 of the second digit coil pair $B_2$ would render the superconducting gate element 122 normally resistive. In this example, assuming $A_1=B_1$, then a closed superconducting path would exist through the first gate element 122 of the second digit pair, and through the second gate element 126 out to the zero output terminal which thereby would provide an indication that in the sets of digits being considered, one set of digits did not satisfy the equation $A=B$.

FIGURE 13 of the drawings illustrates a comparison circuit for performing the function of determining whether one digit A is greater than another digit B to which it is compared. For this purpose the comparison circuit shown in FIGURE 13 comprises a pair of gate elements formed by a first superconducting gate element 131 connected in parallel with a superconducting gate element 132 in closed loop fashion to a single output terminal representing a binary zero. In the particular comparison circuit shown in FIGURE 13, there are three sets of digits that are to be compared so that there are three such circuits connected in series circuit relationship between an input source of summation current $I_s$, and the binary zero output terminal. Connected to the first superconducting gate element 131 is a second superconducting gate element 133 which is connected to the first gate element 131 on the output side of a superconducting field winding 133 which surrounds the superconducting gate element 131, and represents a binary one. A superconducting field winding 134 surrounds the gate element 132 and represents a binary zero so that the windings 133 and 134 form a coil pair for the first digit to be resolved. A second superconducting gate element 135 is connected to the first gate element 131 at the output side of the binary one winding 133 of the first digit coil pair, and to the zero output terminal. A second superconducting gate element 136 is connected to the first gate element 132 at the output side of the binary zero winding 134 of the first digit coil pair, and to an additional output terminal representing a binary one. The second superconducting gate element 136 is surrounded by a superconducting field winding 137 which represents a binary one, and the second superconducting gate element 135 is surrounded by a superconducting field winding 138 which represents a binary zero. The windings 137 and 138 form a coil pair for the second digit to be resolved by the unit. Additional closed loop circuits for the additional sets of digits to be resolved which are provided are similarly constructed to include second gate elements 135 and 136 and the second digit coil pair formed by the windings 137 and 138.

In operation, the comparison circuit shown in FIGURE 13 is designed to provide an output current at the binary one output terminal in the event that A is greater than B, and an output current will appear at the binary zero output terminal if A is less than B or equal to B. In considering the operation of the circuit, it can be appreciated that for this set of conditions to be met A must equal one and B must equal zero. Under such conditions, a superconducting path can be traced from the source of summation current $I_s$ through the first gate element 132 through the second gate element 136 to the one output terminal thereby indicating that A is greater than B. In the event that $A=1$ and $B=1$, the current path through the conductor 136 will no longer be superconducting, and a superconducting path will exist only through the first gate element 132 to the zero output terminal, assuming that the same condition is met by all three sets of digits to be resolved. In the event that $A=1$ and $B=0$, the superconducting path will exist only through the first gate element 131. In the event that $A=0$ and $B=1$, then the superconducting path will exist partially through first gate element 131, and partially through first gate element 135, and will again provide an output current at the zero output terminal assuming that all three sets of digits to be resolved satisfy this condition. In all eventualities, it can be appreciated that in order for the comparison circuit to provide an output signal at the one output terminal, it is necessary that one of the sets of digits to be resolved satisfy the condition A is greater than B.

The block diagram of part of a cryogenic computer utilizing as building blocks thereof the modules described in FIGURES 1–13, is illustrated in FIGURE 14 of the drawings, and is capable of three bit arithmetic. The partial cryogenic computer illustrated in FIGURE 14 includes an instruction panel, one stage of addition, one stage of subtraction, two comparison stages, and one stage of multiplication together with an output terminal board. The instruction panel of the computer is shown at 121 and receives a summation current from a source of summation current $I_s$ as well as command signals $I_o$, $I_1$, and $I_2$ which are coded to direct the instruction panel to perform a desired operation identified by the code. The code is in binary form, so that each of the succeeding operations to be described hereinafter may be controlled by the instruction panel in accordance with the coded command signal. For example, the coded signal may be in the form of a binary numeral such as 101 which will connect the source of summation current $I_s$ to the adder stage to be described hereinafter, so that addition may be carried out by the stage of the various digits supplied to the stage. The instruction panel 121 has an output conductor 122 connected to the input of a three stage adder comprised of a first addition module 123, a second addition module 124, and a third addition module 125. The first addition module 123 is designed to add two sets of digits $A_0$ and $B_0$ supplied thereto, and provide an output signal indicative of the sum thereof over the conductor 126 to an output terminal panel 127, and in particular to the $Q_0$ terminal thereof. The first stage adder 123 also provides a carry signal to the input of the second stage adder 124 which receives two input digits $A_1$ and $B_1$ to be added, and provides an output signal representative of their sum over conductor 127 to the $Q_1$ terminal of the output panel 127. Any carry signal resulting from the addition of the two digits $A_1$ and $B_1$ is supplied to the input of the third stage adder 125 which adds this carry sum to the digits $A_2$ and $B_2$, and supplies an output signal representative of their sum over the conductor 129 to the terminal panel $Q_2$. Any carry sum overflow resulting in the third stage addition is supplied over the conductor 131 to an error terminal E of the terminal panel 127 to provide an indication in the answer of the computer that there is a leftover carry sum resulting from the addition of the three sets of digits which is not indicated in the answer, and the sum of the three sets of digits is provided at the output terminal posts $Q_0$, $Q_1$ and $Q_2$.

In the event that the instructions provided to the instruction panel 121 directs the computer to subtract the digits supplied to the input terminals of the computer $A_0$—$B_2$, the instruction panel will connect the source of summation current $I_s$ to the input of a first stage subtractor 133 which receives the summation current together with the first two digits $A_0$, and $B_0$ to be subtracted. An output current is provided from the output of the first stage subractor 133 over a conductor 134 to the terminal $Q_0$ of the output terminal panel 127 which output current is indicative of the difference of the two digits supplied to the input of the first stage subtractor 133. The borrow signal indicative of any borrow sum resulting in the first stage subtraction operation is supplied to the input of the second stage subtrator 135 which also has supplied thereto digits $A_1$ and $B_1$ of the second set of digits to be subtracted. The second stage adder 135 subtracts the borrow signal $C_0$ and the two digits $A_1$ and $B_1$, and provides an output signal over the conductor 136 to the panel $Q_1$ which is indicative of the difference of the digits supplied thereto. In addition, the second stage subtractor 135 supplies a borrow signal resulting from any borrow that might be involved in the subtraction of the second set of digits $A_1$ and $B_1$ to the input of the third stage subtractor 137. The third stage subtractor 137 subtracts borrow value $C_1$ and the third set of digits to be resolved $A_2$ and $B_2$, and provides an output signal over the conductor 138 to the terminal post $Q_2$ of the output terminal panel 127 which is indicative of the difference value obtained from the subtraction process carried out thereby. Additionally, if there is any borrow value involved in the third stage subtraction operation, a borrow signal will be supplied through conductor 139 to the error or E terminal of the terminal board 127 thereby providing an indication that there is an overflow value involved in the subtraction of the three sets of digits supplied to the cryogenic computer.

Should it be desired to perform a comparison operation, the instruction supplied to the instruction panel 121 will connect the source of summation current $I_s$ to the conductor 142 to the input of a first comparator unit 143 which has supplied thereto the first set of digits $A_0$, $B_0$. Any output signal resulting from the comparator unit 143 is supplied to the second comparator unit 144 which has supplied thereto the second set of digits $A_1$, $B_1$, and performs the operation of comparing these two digits to determine that they are indeed equal. Any output signal resulting from the second comparator 144 is supplied to the third comparator 145 which receives the third set of digits $A_2$, $B_2$ and compares the two. In the event that all three sets of digits $A_0$, $B_0$, $A_1$, $B_1$, $A_2$, $B_2$ satisfy the condition that $A=B$, an output signal will be derived from the third comparator 145 which is supplied to the C terminal of the output terminal panel 127 to indicate that the condition $A=B$ is satisfied.

In the event the instruction provided to instruction panel 121 directs the computer to determine whether or not any one of the digits A is greater than its corresponding B the instruction panel will connect the source of summation current $I_s$ through a conductor 146 to the input of a first comparator 147 which also receives signals representing the value of $A_0$ and $B_0$. In the event the relationship of $A_0$ and $B_0$ is such as to satisfy the equation $A>B$, an output signal will be provided to the input of the second comparator 148 which also receives signals representative of the values $A_1$ and $B_1$. In the event that the relationship of $A_1$ and $B_1$ is such as to satisfy the equation $A>B$, an output signal current will be provided to the input of a third comparator 149 which also receives signals indicative of the values of $A_2$ and $B_2$. In the event that the relation of $A_2$ and $B_3$ is such as to satisfy the equation $A>B$, an output signal will be provided by the third comparator 149 which is connected over conductor 151 to the C terminal of the output terminal board 127 indicating that all of the sets of digits $A_0$, $B_0$, $A_1$, $B_1$, $A_2$, $B_2$ satisfy the relation $A>B$.

In the event that the instructions provided to the instruction panel 121 call for multiplication of the digits $A_0$, $A_1$, $A_2$ times $B_0$, $B_1$, $B_2$ respectively, the source of summation current $I_s$ is connected to the first stage input 153 of a multiplier unit. Multiplier 153 serves to multiply each of the digits $A_0$ times $B_0$ which are supplied thereto and supply an output current through conductor 154 to the $Q_0$ terminal of the output terminal panel 127. This output current represents the product of $A_0$ times $B_0$. The value of $B_0$ is also supplied to a second multiplier 155, along with a factor $A_1$ and 155 functions to multiply the value of $B_0$ times $A_1$ and to supply the partial product to a fourth multiplier-adder unit 157. $B_0$ is also supplied to a third multiplier 156 along with the factor $A_2$ and this multiplier functions to multiply these two values together and to supply the partial product to a multiplier-adder unit 158. The multiplier-adder unit 157 multiplies the values $A_0 \times B_1$ and adds the two partial products $A_1 \times B_0 + A_0 \times B_1$ to provide an output current representative of this sum. This connection conforms to the well known practice of obtaining partial products, and then adding the partial products to derive the product of the factors being multiplied. The output current derived from the multiplier-adder 157 is supplied through a conductor 159 to the $Q_1$ terminal of the output terminal panel 127. In addition to the current representative of the product of the multiplication of the factors supplied to the multiplier-adder there may be a carry output current $C_{01}$ developed by the operation which is coupled through a conductor 161 to the input of the next succeeding multiplier-adder 158. In multiplier-adder 158 the partial carry value $C_{01}$ is added to the partial product $A_1$ times $B_1$ plus the partial product $A_2$ times $B_0$ supplied from the multiplier 156. The output current which represents the sum of these factors is then supplied to a multiplier-adder 162 which adds them to the partial product of factors $A_0$ times $B_2$ to derive a total output current that is supplied over a conductor 163 to the $Q_2$ terminal of the output panel 127. Concurrently with performing their addition operation, the two multiplier units 158 and 162 may derive carry output currents indicating the existence of a carry value obtained in totaling the sum of the partial products, and this carry value is supplied over conductors 164 and 165, respectively, to error terminal E on the output terminal panel 127 to indicate the existence of such carry or error values. As a matter of fact, in the embodiment of the multiplier shown, which is for the purpose of illustrating the manner in which the modules are interconnected, it is fairly certain that there will be such an error carry signal produced, for as can be readily appreciated, the particular multiplier does not develop a sufficient number of output signals to represent the true value of the multiplier times the multiplicand. If in fact the numeral represented by the three factors $A_0$, $A_1$ and $A_2$ is large, and the numeral represented by the three factors $B_0$, $B_1$ and $B_2$ is large, a larger output panel having room for at least six digits would be required in order to indicate the larger number of digits provided in the answer. However, in the interest of simplicity only a three digit output terminal is provided so that the multiplier unit cannot provide the correct answer unless the values of the multiplier and multiplicand are relatively small. To be more particular, it would be necessary for the values of $A_1$ and $A_2$ to be zero or either $B_1$ and $B_2$ to be zero for the multiplier shown in FIGURE 14 to provide a correct answer at its output terminals. This shortcoming can be overcome by inserting a binary point shifting circuit, or by increasing the output terminal panel size, both of which arrangements have certain shortcomings. The multiplier shown however is adequate for the purpose of illustrating the manner in which the modules comprising a part of the present invention are interconnected to form a complete cryogenic multiplication network.

The details of construction of the cryogenic computer are shown in FIGURE 15 wherein the instruction panel 121 is shown in dotted outline form at the right hand side of the page, and includes a pair of first superconducting gate elements 171 and 172 connected in parallel circuit relationship to a source of summation current $I_s$. The first gate elements 171 and 172 are surrounded by a pair of superconducting field windings 173 and 174 which form a first digit coil pair that receives the first digit in the address $I_0$. Connected to the first gate element 171 is a second superconducting gate element 175 which is connected to the first gate element 171 at the output side of the binary one winding 173 of the first digit coil pair $I_0$. Connected to the first gate element 172 at the output side of the binary zero winding 174 of the first digit coil pair is a second superconducting gate element 176. The second gate element 176 is surrounded by a superconducting field winding 177 which represents a binary one, and the second gate element 175 is surrounded by a superconducting field winding 178 which represents a binary zero. The windings 177 and 178 form a second digit coil pair that receives the second digit in the address $I_1$. Connected to the first and second gate elements 171 and 176 are a pair of third superconducting gate elements 181 and 182 which are connected to first and second gate elements 171 and 176, respectively, at the output side of the binary one winding 177 of the second digit coil pair. The third gate elements 181 and 182 are surrounded by a superconducting field winding 183 which together with a superconducting field winding 184 forms a third digit coil pair. The winding 184 represents a binary one and the winding 183 represents a binary zero. Winding 184 surrounds extensions of both the first and second gate elements 171 and 176, and extensions of the first and second gate elements 172 and 175 with the latter two gate elements being displaced sufficiently towards the first two gate elements 171 and 176 to allow them to pass through the winding 184. Each of the gate elements 171, 172, 175, 176 and 181, 182 are connected to the input of a particular arithmetical stage so that upon a proper address being supplied to the address panel 121, a superconducting path is provided between the source of summation current $I_s$, and the input of a desired arithmetical stage in accordance with the truth table shown in FIGURE 14*a*. For example, the first superconducting gate element 171 is connected to the input of the adder 123 so that upon an address identified as 000 being supplied to the address panel 121, the source of summation current $I_s$ is connected to the input of the first stage adder 123. Similarly, different addresses provided to the address panel 121 by proper energization of the binary one or binary zero windings of the first, second and third digit coil pairs thereof will selectively energize any other one of the arithmetic units to be described more fully hereinafter.

In the cryogenic computer shown in FIGURE 15 of the drawings, all of the interconnecting conductors are formed from superconductors, and includes an addition network which is made up of a two stage adder 123, and two three stage adders 124 and 125, all of which are interconnected. The two stage adder 123 and the source of summation current $I_s$ connected thereto by means of the first superconducting gate element 171 interconnected through the instruction panel 121. The two stage adder 123 includes first and second superconducting gate elements 191 and 192 which are connected in parallel circuit relationship to the superconducting gate element 171, and then to the source of summation current $I_s$. The two first superconducting gate elements 191 and 192 are also connected in common to a single output terminal which represents a binary zero. The first and second gate elements 191 and 192 are surrounded by a superconducting field winding 193 which represents a binary one, and a superconducting field winding 194 which represets a binary zero, respectively, and which forms a first digit coil pair. The first gate element 191 has a second superconducting gate element 195 connected thereto at the output side of the binary one winding 193, and to an additional output terminal which represents a binary one. The first mentioned output terminal which represents a binary zero is also marked $T_2$, and the additional output terminal which represents a binary one is marked $T_1$ for the purpose of identifying the interconnections to the readout panel shown schematically in FIGURE 15*a* in the lower right hand portion of the drawing. This marking is adapted to facilitate showing of the circuit connections required to provide an operative computer unit. The first gate element 192 has a second superconducting gate element 196 connected thereto at the output side of the binary zero winding 194 which is also connected to the binary one output terminal. The second gate element 196 is surrounded by a superconducting field winding 197 which represents a binary one. A second superconducting gate element 195 is connected to first gate element 191 at the output side of the binary one winding 193, and is surrounded by a winding 198 which represents a binary zero. The windings 197 and 198 form a second digit coil pair, and function to read the factor $A_0$ into the multiplier.

Because certain combinations of the two digits to be resolved by the two stage adder 123 may provide a carry value, it is necessary to provide a carry unit to operate in conjunction with the adder. This carry unit is illustrated just below the adder, and is identical in construction thereto with the execption that the first superconducting gate element 192' which corresponds to the first gate element 192 in the multiplier is connected to the one output terminal, and the second gate element 195' which corresponds to the second gate element 195 in the multiplier is connected to the zero output terminal. The binary one winding 193' of the carry unit is connected directly with the binary one winding 193 of the adder unit, and the binary zero winding 194' of the carry unit is interconnected directly with its corresponding element 194 of the adder unit. As a consequence of this arrangement, the digit value read into the first digit coil pair of the multiplier proper is simultaneously read into the first digit coil pair of the carry unit. Similarly, winding 197' is connected directly to the binary one winding 197 of the adder, and the binary zero winding 198' is connected to its corresponding binary zero winding 198. By interconnecting the adder and the carry unit in this manner, digits read into the adder are simultaneously read into the carry unit. A source of summation current for the carry unit is applied to the terminals $T_6$, and may be derived from a point in the adder unit if desired.

The resultant output signal obtained from the two stage adder 123 is supplied to the output terminals $T_1$ and $T_2$ on the readout panel where the resultant output value obtained from the adder may be read off. The zero output terminal of the two stage adder 123 is also connected through a superconducting conductor 199 to two first gate elements of a succeeding three stage adder 124, and serves as the source of summation current $I_s$ therefor. The three stage adder 124 includes a carry unit and the combination adder and carry unit is identical in construction and operation to the three stage adder and carry unit shown and described in relation to FIGURE 2 of the drawings. For this reason, the interconnections of the components of the three stage adder 124 will not be described again in detail. It is desirable however, to point out the manner in which the carry units are interconnected from one mathematic stage to the next, to provide the carry sum $C_{n-1}$ to the next successive adder in the unit. As may be determined from an examination of FIGURE 15, the zero output terminal of the carry unit in the two stage adder 123 is connected through a superconductor to the binary zero winding 23' of the next succeeding carry unit, and to the binary zero winding 23 of the adder unit. The binary one output terminals of the carry unit of the two stage adder 123 is connected directly to the binary one winding 21' of the carry unit, and the binary one winding 22 of the adder unit 124. By interconnecting the stages in this manner the carry values developed in a preceding stage may be supplied directly to successive adder stages.

In addition to the factor $C_{n-1}$, which represents the carry value obtained from the preceding adder stage 123, the adder 124 has supplied thereto the factors $A_1$ and $B_1$ in the manner described in relation to the circuit shown in FIGURE of the drawings. The three stage adder 124 will then serve to develop at the output terminals $T_4$ and $T_3$, a resultant output signal representative of the sum of the three factors $A_1$, $B_1$ and $C_0$. It should be noted that the terminals $T_4$ and $T_3$ are connected across a superconducting readout field winding 201 which surrounds a readout gate element 202 in the readout panel 125. In the event that the output answer is a binary one, a current will flow through readout winding 201 of the readout panel and will cause the gate 202 to be returned to its resistive state. In the event that the answer supplied to the readout panel is zero, no current will flow through the readout winding 201, and hence the gate 202 will remain superconducting. In this manner, answers are derived from the readout panel which represents the sum of the values supplied to the three stage adder 124. The carry unit of the three stage adder 124 has its zero output terminal connected to the binary zero windings 23' and 23 of the $C_{n-1}$ or carry input stage of the next successive adder-carry unit 125 in a manner similar to that in which the carry stage of the 124 unit was connected to the adder unit 123. Similarly, the binary one output terminal of the carry unit of the combination adder-carry unit 124 is connected to the binary one windings 22' and 22 of the successive adder-carry unit 125. In this manner, the carry value from the second addition stage is supplied to the input of the third addition stage together with the two factors $A_2$ and $B_2$. The third addition stage 125 is identical in construction and operation to the adder-carry module illustrated in FIGURE 2 of the drawings and functions in precisely the same manner to develop at the output terminals thereof $T_5$, $T_6$ a resultant output signal representative of the sum of the values supplied thereto. To derive this output current, the first gate elements 11 and 12 of the third stage adder are connected in parallel circuit relationship through a superconductor 203 to the zero output terminal of the preceding addition stage 124 which serves as a source of summation current $I_s$. To derive an output indication of the combination value of the factors $A_2$, $B_2$ and $C_1$, $T_5$ and $T_6$ are connected across a superconducting readout field winding 204 which surrounds a readout gate element 205 shown in FIGURE 15*a*. In the event that the answer provided the output terminal is a binary one, a current will be induced through readout winding 204 which renders the superconducting gate element 205 no longer superconducting, and hence normally resistive. In the event that the answer is a binary zero, no current will flow through the readout coil 204, and the readout gate 205 will remain superconducting.

From a consideration of the above description, it can be appreciated that the sum of each set of factors supplied to each of the addition stages 123, 124 and 125 will be produced across the respective output terminals of each of the stages. These output terminals are in turn connected across the readout gate element 200, 202, and 205 so that the condition of the readout gate element provides the desired answer.

In the event that it is desired to subtract the various sets of digits supplied to the various input leads $A_0$, $B_0$, etc., the instructions to the instruction panel should be such as to connect the supply of summation current $I_s$ to the input of the first subtractor in the subtraction network. In the arrangement shown in FIGURE 15, these instructions would be 100 in which event the source of summation current $I_s$ will be connected through superconductor 206 to the superconducting gate elements 207 and 208 in the first subtractor unit 133. The gate elements 207 and 208 are connected in parallel circuit relationship to a common output terminal $T_{10}$ which represents a binary zero. The first gate element 207 is surrounded by a superconducting field winding 209 which represents a binary one, and the first gate element 208 is surrounded by a superconducting field winding 211 which represents a binary zero. The windings 209 and 211 form a first digit coil pair for the first digit to be resolved by the arithmetic unit, and hence the binary one winding 209 is connected directly to the binary one winding 193' in the carry unit of the first stage adder 123, and the binary zero winding 211 is connected to its corresponding binary zero winding 194' of the carry unit in the first stage adder 123. By this arrangement, it can be appreciated that the values $B_0$ supplied to the adder 123 are simultaneously supplied to the corresponding subtractor elements of the subtractor unit. A second superconducting gate element 212 is connected to the first gate element 207 of the output side of the binary one winding 209, and is connected to an additional output terminal $T_9$ which represents a binary one. A second gate element 213 is connected to the first gate element 208 on the output side of the binary zero winding 211 and is also connected to the additional gate element $T_9$ which represents a binary one. The second gate element 213 is surrounded by a superconducting field winding 214 which represents a binary one, and the second gate element 212 is surrounded by a superconducting field winding 215 which represents the binary zero. The two windings 214 and 215 form a coil pair for the second digit $A_0$ to be supplied to the subtractor unit. For this purpose, the binary one winding 214 is connected directly to the binary one winding 197' of the carry unit in the first stage adder 123, and the winding 215 is connected directly to the corresponding binary zero winding 198' in the carry unit of the first stage adder 123. Accordingly, as a result of these connections the value of the second digit $A_0$ to be resolved is simultaneously supplied to both the adder and subtractor for resolution as directed by the instruction supplied to the instruction panel 121. In operation, the two stage subtractor 123 functions in a manner similar to the subtractor illustrated and described in connection with FIGURE 5 of the drawings to develop a resultant output signal representative of the value of the difference of the factors supplied thereto, and supplies this output signal across the output terminals $T_9$ and $T_{10}$. The readout terminals $T_9$ and $T_{10}$ in turn are connected across a readout coil 216 which surrounds the readout gate element 200 of the readout panel, shown in FIGURE 15*a*.

Because for certain values of the factors supplied to the first stage subtractor 133, there will be a borrow value which will have to be subtracted from the next succeeding subtractor stage, a borrow unit is provided which is connected directly to the subtractor unit. The borrow unit is identical in construction and operation to the subtractor unit, and because of the similarity of construction and operation of the carry unit to subtractor unit, corresponding parts of the carry unit have been given the same reference character with a prime. As may be readily determined from an examination of FIGURE 15, corresponding windings of the coil pair of the two units are interconnected so that factors read into subtractor are simultaneously read into the carry unit. The source of summation current of the carry unit is provided from a terminal point $T_{14}$ of the last subtractor unit in the subtraction stage to be described hereinafter. In order to supply the borrow sum derived by the borrow unit to the next succeeding subtraction stage 135, the zero output terminal of the borrow unit is connected to the binary zero windings 46' and 46 of the next succeeding subtractor and borrow unit. Similarly, the binary one output terminal of the borrow unit of the first stage subtractor 133 is connected to the binary one winding 45' and 45 of the next succeeding subtractor 135 and its borrow unit, in order to supply thereto any borrow value that might result from the first stage subtraction process. The free or output ends of the windings 45 and 46 in the subtractor unit may be connected back to the first gate elements 35' and 36' of the borrow unit in the subtractor stage 135 to serve as a source of summation current $I_s$. The first stage gate elements 35 and 36 of the subtractor unit 135 itself is connected in parallel circuit relationship through a superconductor 217 to the zero output terminal of the subtractor 133 which serves as a source of summation current $I_s$ for the second subtractor 135. The second subtractor 135 and its interconnected borrow unit is identical in construction and operation to the subtractor module shown in FIGURE 5 of the drawings, and hence will not be described again in detail. It is believed sufficient to point out that the resultant output signal derived from the three stage subtractor 135 is supplied to the two output terminals $T_{12}$ and $T_{11}$. The output terminals $T_{11}$ and $T_{12}$ in turn are connected across a superconducting readout field winding 218 which surrounds the readout gate element 202 of panel 125 shown in FIGURE 15*a* for reading out the answer or difference value obtained from subtraction process involving the factors $A_1$, $B_1$ and $C_0$. Any carry value resulting from this subtraction process is supplied to the third subtractor by connecting the zero output terminal of the carry unit to the binary zero windings 46' and 46 of the third stage subtractor 137 and connecting the one output terminal of the carry unit of the second subtractor 135 to the binary one windings 45' and 45 of the third subtractor. For convenience, the free or output ends of the third digit coil pair formed by the coil windings 45 and 46 are connected together, and connected back to the carry unit to serve as a source of summation current $I_s$ for the carry unit of the third subtractor. A source of summation current $I_s$ is supplied to the parallel connected first gate elements 35 and 36 in the third subtractor unit through a superconductor 219 which is connected to the zero output terminal $T_{12}$ of the second subtractor 135. In operation, the third subtractor 137 is identical to the subtractor module illustrated and described with relation to FIGURE 5 of the drawings, and hence will not be described again in detail. The output signal derived by the third subtractor 137 is supplied to a pair of output terminals $T_{14}$ and $T_{13}$ representing a binary zero and a binary one, respectively. The output terminals $T_{13}$ and $T_{14}$ are connected across a superconducting readout field winding 221 which surrounds the readout gate element 205 of panel 125 shown in FIGURE 15*a*. In the event that the output answer from the third subtraction stage is a binary one, current will be produced through the readout winding 211 which will cause the readout gate 205 to be rendered normally resistive thereby providing an output indication of the difference value obtained from the third subtractor 127. Additionally, it might be noted that the zero output terminal $T_{14}$ is connected back to the first gate elements 207' and 208' of the borrow unit in the first subtractor 133 to serve as a source of summation current $I_s$ for the carry units of all of the subtractors. In the event that there is a borrow value resulting from the subtraction process carried out by the third subtractor 137, the output terminals $T_{15}$ and $T_{16}$ of the carry unit of the third subtractor 137 are connected across a readout winding 222 of a readout core 220 of panel 125 in FIGURE 15*a*. The readout gate element 220 provides an error indication to a user of the computer to indicate that there is an overflow or excess value in the answer being provided by the three stage subtraction network which is not being indicated in the answer since the answer unit can accommodate only three place binary numerals.

From a consideration of the above description, it can be appreciated that the three subtractor stages 133, 135, and 137 each receive digits to be resolved thereby representing the values of $A_0$ and $B_0$; $A_1$, $B_1$ and $C_0$; and $A_2$, $B_2$ and $C_1$, respectively, and operates to subtract these factors one from the other to provide an output answer which may be obtained from the output terminal gate element 200 which provides the answer $Q_0$, 202 which provides the answer $Q_1$, and 205 which provides the answer $Q_2$. If there is any error value or overflow value representing an excess or borrow, its value will be indicated across the error gate element 220 by the conduction of the electric current through the error readout winding 222 connected across the output terminals $T_{15}$ and $T_{16}$ of the carry unit of the third stage subtractor 137.

In the event that it is desired to obtain a comparison between the several digits being solved for the purpose of determining whether $A_0=B_0$, $A_1=B_1$, $A_2=B_2$, the control panel 121 may be instructed to connect the source of summation current $I_s$ through the conductor 142 to the first two gate elements 121 and 122 of the first comparator unit 143. The comparator unit 143 is identical in construction and operation to one stage of the comparison circuit shown in FIGURE 12 of the drawings, and is interconnected with a second comparator unit 144 and a third comparator unit 145 to make up three stage comparison circuit identical to that illustrated in FIGURE 12 of the drawings. Each of the comparators 143, 144 and 145 have one set of gate elements 121, 122 interconnected to one output terminal $T_{17}$ which represents a binary one, and have the remaining set of gate elements interconnected through a common conductor 225 to an additional output $T_{18}$ which represents a binary zero. Output terminals $T_{17}$ and $T_{18}$ are connected across a superconducting readout field winding 226 which surrounds a superconducting gate element 227 for deriving an output indication of the results of the comparison operation carried out by the comparison circuit. In the event that the equation $A=B$ is satisfied in all three comparator units 143, 144 and 145, an output current will be produced at the binary one output terminal $T_{17}$ which will result in the flow of electric current through the winding 226 thereby rendering the gate element 227 normally resistive, and producing an output indication that the equation is satisfied. In the event that the equation is not satisfied in all of the comparator units, no such current will be produced through the winding 226, and the gate element 227 will remain superconducting thereby indicating that in at least one of the comparators the equation $A=B$ is not satisfied. Because each of the comparator units 143, 144 and 145 is identical in construction and operation to one of the single stage comparator units described with relation to the comparison circuit of FIGURE 12 of the drawings, a further description of the construction and operation thereof is not deemed necessary.

In the event that it is desired to determine whether the relation A is greater than B is satisfied with regard to any of the factors $A_0$, $B_0$, $A_1$, $B_1$ or $A_2$, $B_2$ a comparison stage is provided which includes three comparator units 147, 148 and 149. For this purpose, instructions may be provided to the control panel 121 to connect the source of summation current $I_s$ through the conductor 146 to the input of a first stage comparator 147. It should be noted that for convenience, the order of the comparator units 147, 148 and 149 has been reversed in the diagram of FIGURE 15 from the order shown in the block diagram of the circuit shown in FIGURE 14. The first stage comparator unit 147 is identical in construction to one of the comparator units shown in the comparison circuit in FIGURE 13 of the drawings, and operates similarly so that it is believed unnecessary to describe the construction and operation of each of the comparators 147–149 in detail as they are all constructed in a similar fashion. It should be noted however that each of the comparator units 147, 148 and 149 are interconnected to an output terminal $T_{20}$ which represents a binary zero, and to an additional output terminal $T_{19}$ which represents a binary one. The output terminals $T_{19}$ and $T_{20}$ are connected across a superconducting readout field winding 228 which surrounds the readout gate element 227. By this arrangement, upon the equation $A$ greater than $B$ being satisfied in any one of the comparator units 147–149, an output current will occur across the output terminal $T_{19}$ and $T_{20}$ which is supplied to the winding 228, and causes the readout gate element 227 to assume a normal resistance condition thereby indicating that the equation $A$ greater than $B$ has been satisfied by at least one of the comparator stages.

In the event that it is desired to perform a multiplication operation with respect to the factors supplied to the computer unit, the instrucion panel 121 is instructed to connect the source of summation current $I_s$ through the conductor 231 to the input of a three place multiplication network shown in FIGURE 16 of the drawings. The three place multiplication network shown in FIGURE 16 includes three beta multiplier units, 153, 155 and 156 which are identical in construction and operation to the beta multiplier module shown and described with relation to FIGURE 8 of the drawings. As described with relation to FIGURE 8, the beta multiplier module is a two stage multiplier designed to multiply two factors A and B and to produce an output current which is indicative of the result of the product of the two factors. In the three beta multipliers 153, 155 and 156 the factor $B_0$ is supplied to the first digit coil pair of all three multipliers formed by the binary one winding 67 thereof and the binary zero winding 68 thereof. In addition to the factor $B_0$, the multiplier 153 has supplied thereto the factor $A_0$, and the multiplier 156 has supplied thereto the factor $A_2$. An output current is produced by the first beta multiplier 153 which is supplied over conductors 232 and 233 to the output terminals $T_{25}$ and $T_{24}$. This output current represents the product of the two factors $A_0$, $B_0$, and constitutes the first partial product of the three place multiplication process. The output terminals $T_{24}$ and $T_{25}$ are in turn connected across a winding 234 which surrounds the superconducting gate element 200 that serves as a readout element for the multiplier. Accordingly, if the partial product of the factors $A_0$, $B_0$ equals one an output current will be produced to the readout winding 234 that will render the gate 200 normally resistive thereby indicating that the partial product of these two factors is equal to one. Otherwise, the readout gate 200 will remain normally superconductive which indicates that partial product is a binary zero. The output current produced by the second beta multiplier 155 represents the product to the two factors $A_1$, $B_0$, and is supplied over the conductors 235 and 236 to the binary zero winding and the binary one winding respectively of the $S_{n-1}$ stage of a gamma multiplier 157. The gamma multiplier 157 is identical in construction and operation to the gamma multiplier described with relation to FIGURE 9 of the drawings, and hence will not be described again in detail. It is believed sufficient to point out that the gamma type multiplier 157 serves to multiply the factor $B_1$ which is supplied to the second digit coil pair comprised by the binary one winding 75 and the binary zero winding 78 thereof, times the factor $A_0$ which is supplied to the third digit coil pair formed by the windings 85 and 86, and to add this partial product to the partial product supplied to the windings 73 and 74 thereof of the first digit coil pair. The resultant partial product is supplied over the conductors 237 and 238 to the output terminals $T_{26}$ and $T_{27}$ which as best seen in FIGURE 15 of the drawings, are connected across a superconducting field winding 239 that surrounds the superconducting readout gate 202, and provides an output indication of the value of the second partial product of the three place multiplication network. The gamma multiplier unit 157 also includes a carry unit to which are supplied the three factors $A_0$, $B_1$ and the partial product resulting from the multiplication in the second beta multiplier 155. In the event that addition of these factors results in a carry value, this carry value is supplied to the first digit coil pair of an alpha multiplier 158. The first digit coil pair is formed by the binary one winding 93' of the carry unit and 93 of the multiplier, and the binary zero windings 94' of the carry unit and 94 of the multiplier. The alpha multiplier 158 is identical in construction and operation to the alpha multiplier described with relation to FIGURE 10 of the drawings, and hence will not be described again in detail. It is believed adequate to point out that in addition to the carry output current produced by the carry unit of the gamma multiplier 157, which represents the value $C_{n-1}$ and is supplied to the first digit coil pair formed by the windings 93 and 94 of the alpha multiplier, as well as to the first digit coil pair 93', 94' of the carry unit thereof, the second digit coil pair of the alpha multiplier and its carry unit, formed by the binary one windings 97, 97' and the binary zero windings 98, 98' has the value $S_{n-1}$ supplied thereto which is the partial product produced by the third beta multiplier 156 and represents the product of the two factors $A_2$, $B_0$. The third digit coil pair of the alpha multiplier formed by the binary one winding 104 and the binary zero winding 105, is connected to the second digit coil pair of the gamma multiplier 157, which in turn is connected to the input for the $B_1$ digit, and functions to insert the value of this factor into the multiplier as well as into the carry unit thereof. The fourth digit coil pair formed by the binary one winding 115 and the binary zero winding 116 has supplied thereto the $A_1$ digit which is also supplied to the corresponding fourth digit coil pair 115', 116' of the carry unit. Accordingly, the alpha multiplier 158 functions to multiply the two factors $A_1$, $B_1$, and to add this partial product to the partial product $S_{n-1}$ of the beta multiplier 156 which represents $A_2$ times $B_0$, and to add the resulting sum to the carry sum $C_{n-1}$ resulting from the operation of the gamma multiplier 157 to produce a second partial product. This second partial product is then supplied over the conductors 241 and 242 to the gamma multiplier 162. Any carry value that results as a consequence of the operation of the alpha multiplier 158 is developed by the carry unit thereof and is supplied over the conductors 243 and 245 to the output terminals $T_{28}$ and $T_{29}$. Output terminals $T_{28}$ and $T_{29}$ are connected across a superconducting field winding 246 which surrounds the readout gate element 220 of panel 127 in FIGURE 15*a*, and serves to develop an error output indication allowing an operator of the computer to determine that there is a carry-over or surplus value which will not be indicated in the answer appearing on the output quotient gate elements $Q_0$, $Q_1$ and $Q_2$. The gamma multiplier 162 is identical in construction and operation to the gamma multiplier shown in FIGURE 9 of the drawings, and hence it will not be described again in detail. It is believed sufficient to point out that the partial sum supplied over the conductors 241 and 242 from the alpha multiplier unit 158 is applied as the value $S_{n-1}$ to the first digit coil pair formed by the windings 73 and 74 of the multiplier, and the windings 73' and 74' of the carry unit thereof. The second digit coil pair of the gamma multiplier 162 is formed by the binary one winding 75 of the multiplier unit and 75' of the carry unit, and the binary zero winding 78 of the multiplier unit and 78' of the carry unit, and has the digit $B_2$ supplied thereto. The third digit coil pair formed by the windings 85 and 86 of the multiplier unit, and the windings 85' and 86' of the carry unit, has the digit $A_0$ supplied thereto. Multiplier 162 then serves to multiply the two factors $A_0$ times $B_2$, and to add thereto the second partial sum $S_{n-1}$ supplied thereto over the conductors 241 and 242 from the alpha multiplier 158. The resulting sum is the third partial sum $Q_2$ of the answer, and is supplied over the conductors 245 and 246 to the output terminals $T_{32}$ and $T_{33}$. Output terminals $T_{32}$ and $T_{33}$, as may be best seen in FIGURE 15*a* of the drawings, are connected across a superconducting field winding 247 surrounding the superconducting readout gate element 205 which serves to provide an output indication of the value of the third partial sum $Q_2$. In this manner, a three place answer $Q_0$, $Q_1$ and $Q_2$ is obtained from the three readout gate elements 200, 202 and 205 which is representative of the product of the three digits being multiplied. In the event that there is a carry sum produced in the carry unit of the gamma multiplier 162 as a result of its operation, this carry sum is supplied over the conductors 248 and 249 to the readout terminals 234 and 235. Readout terminals 234 and 235 as may best be seen in FIGURE 15 of the drawings are connected across a superconducting readout field coil 249 which surrounds the superconducting readout gate element 220, and serves to indicate an overflow or surplus value in the multiplication operation. From the above description of the construction and operation of the cryogenic computer, it can be appreciated that the three stage multiplier illustrated in FIGURE 16 will provide correct answers for only very low values or digits (that is, where $A_0$, $A_1$, $A_2$ and $B_0$, $B_1$, $B_2$ are low in value). The circuit illustrated in FIGURE 16, however, is illustrative of the manner in which a cryogenic computer is formed from the arithmetic modules.

The construction of several different types of modules for use in performing mathematical division operations are disclosed in FIGURES 17–23, and the truth tables for these modules are shown in FIGURE 24 of the drawings. The arithmetical module shown in FIGURE 17 of the drawings is designated as a delta divider unit and comprises a pair of first gate elements 301 and 302 connected in parallel circuit relationship to a source of summation current $I_s$. In this species of the divider the source of summation current $I_s$ comprises a direct connection to the output side of a coil pair comprised by a superconducting field winding 303 which surrounds the first superconducting gate element 301 and represents a binary one and a superconducting field winding 304 which surrounds the first superconducting gate element 302 and represents a binary zero. One of the digits to be resolved which shall be designed C is supplied to the windings 303, 304 comprising the first digit coil pair which serve to read that factor into the divider. The remaining ends of the first superconducting gate elements 301 and 302 are connected in common to a single output terminal which represents a binary zero. A second superconducting gate element 305 is connected to the first gate element 301 on the output side of the binary one winding 303 of the first digit coil pair, and is connected to an additional output terminal which represents a binary one. A second superconducting gate element 306 is connected to the first gate element 302 on the output side of the binary zero winding 304 of the first digit coil pair and is likewise connected to the additional output terminal representing a binary one. The second gate element 305 is surrounded by a superconducting field winding 307, and the second gate element 306 is surrounded by a superconducting field winding 308 which together with the winding 307 constitutes a second digit coil pair. Because the delta type divider shown in FIGURE 17 of the drawings is intended for use in a complete dividing network, it is not possible to obtain an output signal at the output terminals thereof which, standing by itself, would have any meaning for this output signal must be considered in conjunction with the output signals produced by other divider units of the dividing network in order to provide an output indication representative of the quotient of the values supplied to the network to be divided. Accordingly, in the following discussion of the operation of the delta divider, it should be remembered that the derived signals are not necessarily the quotient of the signals applied to the input of the divider.

The truth table for the delta divider unit is shown in FIGURES 24(*c*) and 24($c_2$) of the drawings wherein values for the factor R are listed in the vertical column below the letter R, the values for the factor Q are listed in the vertical column below the letter Q, and the determination of whether these factors are to be added or subtracted are listed below the symbol ±. In addition to this determination, the delta divider operates to develop a new resultant output signal which is labelled R', and the truth table for this operation is shown in FIGURE 24($c_2$). In this truth table, the values of R' for a given input value of R are listed in the two vertical columns below the letter R, and the values for the input C are listed in the two horizontal lines to the right of the letter C. The below table shows the possible new resultant output signals R' that can be obtained for all of the possible combinations of values of the R and C supplied to the delta divider:

| R' | $R_5$ | C |
|---|---|---|
| 0 | 0 | 0 |
| 1 | 0 | 1 |
| 1 | 1 | 0 |
| 0 | 1 | 1 |

In tracing through the operation of the delta divider, it is desirable to assume some values for the input signals, for example, allow $R_5$ to equal one, and C to equal zero. Considering the truth table shown in FIGURE 24(*c*), it will be appreciated that if the value of R is one, the output quotient Q will be zero, and the delta divider will provide a positive or plus control signal to the division network. Concurrently, the resultant output signal R′ will be developed which for an assumed value of $R=1$, $C=0$ will be one as depicted in the truth table shown in FIGURE 24($c_2$). Referring now to FIGURE 17 of the drawings, and assuming the above values to be applied to the divider, it can be seen that the source of summation current $I_s$ will be connected through the first part of the superconducting gate element 301, and through gate element 305 to the one output terminal thus confirming the results obtained from the truth table, and the table of values set forth above. The sign of the above operation will be determined automatically from the value of $R_5$ where the subscript 5 could be any numerical *n*. If $R_5$ is 1 the sign is positive. If $R_5$ is 0, the sign is negative as depicted in the truth table shown in FIGURE 24(*c*).

The construction of a theta divider unit is shown in FIGURE 18 of the drawings, and includes a pair of superconducting first gate elements 311 and 312 connected in parallel circuit relationship to a source of summation current $I_s$, and to a common output terminal which represents a binary zero. The first gate element 311 is surrounded by a superconducting field winding 313 which represents a binary one and the first gate element 312 is surrounded by a superconducting field winding 314 which represents a binary zero. Both windings 313 and 314 form a first digit coil pair for reading into the divider the first digit to be resolved. A second gate element 315 is connected to the first gate element 311 at the output side of the binary one winding 313 of the first digit coil pair, and is connected to the zero output terminal. This gate element 315 is surrounded by a superconducting field winding 316 which represents a binary zero. A second gate element 317 is connected to the first gate element 312 at the output side of the binary zero winding 314 of the first digit coil pair, and is connected to an additional output terminal which represents a binary one. The second gate element 317 is surrounded by a superconducting field winding 318 which represents a binary one, and together with the winding 316 forms the second digit coil pair.

The truth table for the theta divider is shown in FIGURE 24(*f*) of the drawings wherein the values for the factor B are listed in the two vertical columns below the letter B, and the values of the new resultant output signal R′ and new carry output signal C′ are listed in the two horizontal lines to the right of the two symbols + and −, depending upon the nature of the positive or negative control signal developed by the delta divider. The value of the new resultant output signal R′ is shown on the upper side of the diagonal line, and the value of the new carry output signal C′ is shown in the lower side of the diagonal line. The following table of values lists the value of the new resultant output signal and new carry output signal for all of the possible combinations of values of B, and the plus minus control signal that can be supplied to the theta divider.

| R′ | B | ± | C′ |
|---|---|---|---|
| 0 | 0 | + | 0 |
| 0 | 0 | − | 0 |
| 1 | 1 | + | 0 |
| 1 | 1 | − | 1 |

Considering the theta divider shown in FIGURE 18, and assuming a value of $B=1$ and a negative control signal, for these values, electric current will flow through the superconducting field windings 313 and 316 thus rendering the gate elements surrounded by these windings resistive. For this combination of values, a superconducting path will be established from the source of summation current $I_s$ through the first part of the gate element 312, and through gate element 317 to the one output terminal, thus confirming the results indicated by the truth table shown in FIGURE 24(*f*), and the table of values shown above. Also from an examination of FIGURE 18, it will be seen that the value R′ is obtained from the same terminals as B, hence the two will be the same irrespective of the sign of the operation. The partial carry however will be determined by the sign and value of B as may be ascertained by tracing through FIGURE 18.

A lambda divider unit is illustrated in FIGURE 19 of the drawings and comprises a first superconducting gate element 321 which is surrounded by a superconducting field winding 322 that represents a binary one. A superconductor 323 is physically disposed parallel to the gate element 321 and is interconnected thereto through a second superconducting gate element 324 which is surrounded by a superconducting field winding 325 that represents a binary zero. The two windings 322 and 325 form an output digit coil pair, and allow electric current supplied through the superconducting gate element 321 to be either supplied to the end of the superconducting gate element 321 which represents a binary zero output terminal, or to be diverted through the second gate element 324 to the conductor 323. The superconductor 323 is connected to an output terminal which represents a binary one.

The truth table for the lambda divider is shown in FIGURE 24(*g*) of the drawings wherein the values for the factor R are listed in the vertical column below the letter R and the values of the output error indication E are listed below the letter E. Since the lambda divider unit is a single stage cryogenic unit, the values of the error indication E are directly related to the value of input signal R. These results may be confirmed by an examination of the lambda divider wherein it can be assumed that the superconductor 321 is connected to a source of summation current, not shown, and depending upon the value of the factor R, the output error indication E will be either a zero or a one. Assuming $R=0$ then the superconducting path will exist through gate element 321 to the zero output terminal, and in the event the value of $R=1$, a superconducting path will exist through superconductor 323, and through the part of gate 321, gate 324 and conductor 323 to the zero output terminal. In the latter eventuality, there will be no error current derived from the lambda divider since the source of summation current will be short circuited to conductor 323.

A beta divider module is shown in FIGURE 20 of the drawings, and includes a carry unit. The beta divider comprises a pair of first gate elements 331 and 332 each having one end connected to a source of summation current $I_s$, and the remaining end connected to a common output terminal which represents a binary zero. The first gate element 331 is surrounded by a superconducting field winding 333 which represents a binary one and the first gate element 332 is surrounded by a superconducting field winding 334 which represents a binary zero. The windings 333 and 334 constitute a first digit coil pair for reading a first digit $A_2$ into the beta divider. A second gate element 335 is connected to the first gate element 331 at the output side of the binary one winding 333 of the first digit coil pair, and is connected to an additional output terminal which represents a binary one. A second superconducting gate element 336 is connected to the first gate element 332 at the output side of the binary zero winding 334 of the first digit coil pair, and is connected to the additional output terminal representing a binary one. The second gate element 335 is surrounded by a superconducting field winding 337 which represents a binary zero, and the second gate element 336 is surrounded by a superconducting winding 338.

The windings 337 and 338 form a second digit coil pair for reading a second digit $B_0$ into the beta divider.

Because for certain values of factors that may be supplied to the coil pairs of the beta divider shown in FIGURE 20, a carry value might be developed, a carry unit is provided which is substantially identical in construction to the construction of the divider unit proper. The carry unit is illustrated in a position on top of the divider unit proper merely as a matter of convenience, and could be placed under it as were previously described modules. The carry unit and divider proper are interconnected by having the binary one windings of each of the coil pairs thereof directly connected to the binary one windings 333 and 338 of the coil pairs on the beta divider, and having the binary zero windings 334' and 337' connected directly to the binary zero windings 334 and 337 of the divider. There is some difference in construction between the borrow unit and the divider, however, and this difference is that the second gate element 336' is connected to the binary zero output terminal in contrast to the divider unit wherein the second gate element 336 is connected to the binary one output terminal. In all other respects, the two units are constructed identically, and operate in a similar fashion to derive output signals at the output terminals thereof which when combined with the output signals derived by the other divider units in a division network incorporating such units, will provide an output electric signal representative of the quotient of the factors supplied thereto.

The truth table for the beta divider unit is shown in FIGURE 24($a$) of the drawings, wherein the values for the dividend A are listed in the two narrow columns to the right of the letter $A_2$, and the values for the divisor $B_0$ are listed below in the two lines to the right of $B_0$ with the upper line provided the quotient $R_2$ or remainder value which represents the output answer derived by the divider unit proper, and the lower line C represents the partial carry value derived by the operation. The below table lists all of the possible combinations of input quantities that may be supplied to the beta divider, and the quotient or remainder output values derived:

| R' | A | B | C' |
|---|---|---|---|
| 0 | 0 | 0 | 0 |
| 1 | 0 | 1 | 1 |
| 1 | 1 | 0 | 0 |
| 0 | 1 | 1 | 0 |

From an examination of the truth table shown in FIGURE 24($a$) which is derived from the design of the beta divider, or from inspection of the above table, it is possible to derive the output quotients or remainders R' produced at the output terminals of the beta divider and its corresponding carry value C' for different value inputs of the two quantities supplied thereto. For example, assume that the quantity $A_2$ is equal to 1, and $B_0$ is equal to 0, then from the upper line of the truth table in FIGURE 24, it can be seen that an output remainder current R' should be produced at the binary one output terminal of the beta type divider and the partial carry will be zero. Tracing through the operation of the circuit, it can be appreciated that when $A_2=1$, current will flow in the binary one winding 333' of the beta divider thereby rendering the gate element 331 normally resistive, and leaving a superconducting path through the gate element 332. With the quantity $B_0=0$, current will flow through the binary zero winding 337 rendering the two gate elements 332 and 335 surrounded by that winding resistive and leaving a superconducting path through the portion of the gate element 332 not surrounded by winding 337, and through the second gate element 336 to the binary one output terminal, which is the answer provided in the above table and in the truth table shown in FIGURE 24($a$). The operation of the circuit for other values of $A_2$, $B_0$ can be similarly traced through. In a similar fashion, it is possible to trace through the operation of the carry unit comprising a part of the beta divider to appreciate the manner in which it provides at its output terminal an output electric current representative of the partial carry value derived from the arithmetic operation carried out by the beta divider.

FIGURE 21 of the drawings shows the construction of a gamma divider module which includes a pair of first superconducting gate elements 441 and 442 which are normally superconducting, and are connected to a source of summation current $I_r$ and to a single output terminal which represents a binary zero. The first gate element 442 is surrounded by a superconducting field winding 443 which represents a binary zero, and the first gate element 441 is surrounded by a superconducting field winding 444 which represents a binary one. The two windings 443 and 444 form a first digit coil pair for reading the first digit to be resolved by the divider into the unit. A second superconducting gate element 445 is connected to the first gate element 441 at the output side of the binary one winding 444, and is connected to an additional output terminal which represents a binary one. A second gate element 446 is connected to the first gate element 442 at the output side of the binary zero winding 443, and is similarly connected to the additional output terminal representing a binary one in parallel with the second gate element 445. The second gate element 445 is surrounded by a superconducting field winding 447 which represents a binary zero, and the second gate element 446 is surrounded by a superconducting field winding 448 which represents a binary one. The two windings 447 and 448 form a second digit coil pair to which is supplied the second digit $B_2$ to be resolved by the gamma divider. Because for certain operations and combinations of the two quantities $B_2$ and C supplied to the gamma divider there may be a carry sum, a carry unit is provided which is substantially identical in construction to the gamma divider, and is interconnected therewith by having the binary zero windings 443' and 447' thereof connected directly to the binary zero windings 443 and 447, respectively, of the gamma divider proper. Binary one windings of the carry unit 444' and 448 are interconnected directly with the binary one windings 444 and 448 respectively of the gamma divider. Additionally, the output sides of the first digit coil pair formed by the windings 443 and 444 are interconnected back to the first gate elements 441' and 442' of the carry unit to serve as a source of summation current $I_c$. In all other respects, the carry unit is identical to the construction and operation of the gamma type divider network with the exception that the first superconducting gate element 442' of the carry unit is connected to the binary one output in contrast to the corresponding part in the gamma divider proper 442 which is connected to the binary zero output terminal.

The gamma divider shown in FIGURE 21 of the drawings functions to develop at itso utput terminals an electric current representative of a value which, when combined with the electric currents developed by other types of divider units disclosed herein in a division network, will produce an output current representative from the quotient of the quantities supplied to the networks. The truth table for the gamma divider module is shown in FIGURE 24($b$) of the drawings and has been derived from the design of the gamma divider. In using the truth table shown in FIGURE 24($b$) of the drawings, the values of the quantity C which is a partial carry value from a preceding operation are shown in the two vertical columns to the right of that reference character, and the value of the factors B to be added to the partial carry value C are shown in the two horizontal lines to the right of reference character B. The value of the new remainder output current R' produced by the summation of C and B at the output terminals of the gamma divider proper are shown in the upper two horizontal lines and the values of a new partial carry C' resulting from the operation are shown in the lower two horizontal lines. The values for the output current R′ and the carry current C′ produced by the carry unit are also listed in the below table for the various possible combinations of quantities supplied to the gamma divider unit.

| R′ | B | C | C′ |
|---|---|---|---|
| 0 | 0 | 0 | 0 |
| 1 | 0 | 1 | 1 |
| 1 | 1 | 0 | 1 |
| 0 | 1 | 1 | 1 |

From a cursory examination of the above table, or the truth table shown in FIGURE 24(*b*) of the drawings, it can be appreciated that for a given value of input quantities, output currents will be produced at output terminals of the gamma divider which when combined with the output currents produced by the other divider units in a division network will result in the production of an output current representative of the quotient of the quantities supplied thereto. For example, assume the following quantities to be supplied to the gamma divider that the value $C=1$ and $B=0$. Then from the truth table it can be determined that the R should equal 1 and C should equal 1 also. Examining FIGURE 21 of the drawings, it can be seen that when $C=1$ and $B=0$, electric current will flow in the windings 444 and 447 of the divider, and 444′ and 447′ of the carry unit. Setting up the divider in this fashion will form a superconducting path between the source of summation current $I_r$ through the first superconducting gate element 442, and second superconducting gate element 446 to the one output terminal in the gamma divider proper, and will form a superconducting path between the source of summation current $I_c$ through the first superconducting gate element 442′, and the second superconducting gate element 446′ to the one output terminal thereby confirming the values derived from the truth table.

An epsilon divider network is shown in FIGURE 22 of the drawings that includes a pair of first superconducting gate elements 451 and 452 which are connected in parallel circuit relationship to a source of summation current $I_s$, and are connected to a single output terminal which represents a binary zero. The first superconducting gate element 451 is surrounded by a superconducting field winding 453 which represents a binary one and the first gate element 452 is surrounded by a superconducting field winding 454 which represents a binary zero. The two windings 453 and 454 form a first digit coil pair for receiving one of the digits C–1 to be resolved by the divider. A second superconducting gate element 455 is connected to the first gate element 451 at the output side of the binary one field winding 453. A second superconducting gate element 456 is connected to the first gate element 452 at the output side of the binary zero field winding 454 of the first digit coil pair. The second gate element 455 is surrounded by a superconducting field winding 457 which represents a binary zero, and the second gate element 456 is surrounded by a superconducting field winding 458 which represents a binary one. The two field windings 457 and 458 form a second digit coil pair for reading a second digit which is designated $R_5$. The third superconducting gate element 459 is connected to the first gate element 452 at the output side of a binary zero winding 457 of the second digit coil pair and is connected to the one output terminal. A third superconducting gate element 461 is likewise connected to the second gate element 455 at the output side of the binary zero winding 457 of the second digit coil pair, and is connected to the zero output terminal. A fourth superconducting gate element 462 has one end thereof connected to the first gate element 451 at the output side of the binary one winding 458 of the second digit coil pair and the remaining end thereof connected to the one output terminal. The third superconducting gate element 463 has one of its ends connected to the second superconducting gate element 456 at the output side of the binary one winding 458 of the second digit coil pair and has the other end thereof connected to the zero output terminal. The two third gate elements 459 and 461 are surrounded by a superconducting field winding 465 which represents a binary one, and the two third gate elements 462 and 463 are surrounded by a superconducting field winding 464 which represents a binary zero. The two field windings 464 and 465 form a third digit coil pair for reading a third digit R–1 into the epsilon type divider.

Because in certain applications, there will be a carry value produced for certain values of the quantities R, S and C set into the epsilon divider, a carry unit is provided which is substantially identical in construction and operation with the epsilon divider, and accordingly similar parts in the carry unit have been given the same reference character primed as the corresponding part in the epsilon divider. The carry unit is interconnected with the divider proper by having the binary zero windings of 454′, 457′ and 464′ connected directly to the corresponding binary zero winding of the divider unit proper 454, 457, and 464, respectively. Likewise, the binary one windings of the carry unit 453′, 458′ and 465′, are connected directly to the corresponding binary one windings on the divider proper 453, 458, and 465. A source of summation current $I_c$ is supplied to the two first gate elements 451′ and 452′ of the carry unit by connecting the two output ends of the third digit coil pair 464 and 465 together and connecting them back to the first gate elements in parallel circuit relationship. To all intents and purposes the carry unit of the epsilon divider is identical in construction and operation to the epsilon type divider proper; however, there are certain exceptions to this. To be particular, the second superconducting gate element 452′ is connected to the one output terminal, the second gate element 455′ is connected to the zero output terminal, the third gate element 459′ is connected to the zero output terminal, and the third gate element 462′ is connected to the zero output terminal in contrast to the corresponding elements in the epsilon divider proper which are connected to the opposite terminal from that enumerated with respect to the carry unit element.

In operation, the epsilon divider functions to develop an output electric signal which may be utilized with similar output electric signals developed by other divider modules in a dividing network to provide an output electric signal that is representative of the quotient of the quantities supplied thereto. The truth table for the epsilon divider is illustrated in FIGURE 24(*d*) of the drawings and has been derived from the design of the epsilon divider. The following table is reproduced to illustrate the various combinations of values of the quantities that may be supplied to the epsilon divider.

| R′ | R–1 | ± | C–1 | C′ |
|---|---|---|---|---|
| 0 | 0 | + | 0 | 0 |
| 0 | 0 | − | 0 | 0 |
| 1 | 0 | + | 1 | 0 |
| 1 | 0 | − | 1 | 1 |
| 1 | 1 | + | 0 | 0 |
| 1 | 1 | − | 0 | 0 |
| 0 | 1 | + | 1 | 1 |
| 0 | 1 | − | 1 | 0 |

Referring to the truth table of the epsilon divider shown in FIGURE 24(*d*) of the drawings, the values for the quantity R which is the resultant or partial quotient obtained from a previous divider stage are listed in two vertical columns below that letter, and the values for the quantity C which is a partial carry from a previous divider stage are listed in the two horizontal lines to the right of the letter C. The upper two lines of blocks show the value of the new resultant output signal R′ produced by the summation of R and C in the epsilon divider proper and the lower two lines of blocks give the values of the new partial carry signal C′ produced by summation of R and C by the carry unit. It will be noted that each of the blocks in the lines contains two figures. The upper of the figures represents the value obtained for quantities R′ and C′ when the second digit coil pair has supplied thereto a positive signal which is of course as indicated in the drawings applied to the binary one or positive windings 458 and 458′. The numeral on the lower side of the diagonal line in each box represents the values for R′ and C′ where the second digit coil pair has a negative signal applied to the binary zero windings 457 and 457′. The manner in which these plus and minus signals affects the delta output quotient signal developed by the division network incorporating an epsilon type divider will be appreciated more fully after the discussion of a complete division network to follow hereinafter. It is believed adequate for present purposes to merely set out the manner in which the epsilon divider develops an output signal for a given set of values. For example, assume that the value $R=1$ and $C=0$ and that the middle or second digit coil pair has a position signal applied thereto. From an examination of the above table, and the truth table shown in FIGURE 24(*d*), it can be determined that the new resultant output signal R′ from the epsilon divider proper should be one, and the carry output signal C developed at the carry unit output terminal should be zero. An examination of the epsilon divider circuit will corroborate these figures. Referring to FIGURE 22, and assuming the quantities to have the above values, then energization current will flow in the binary zero winding 454 of the first digit coil pair, the plus winding 458 of the second digit coil pair, and the binary one winding 465 of the third digit coil pair. With the windings of the circuit thus energized, a superconducting path will remain between the source of summation current $I_s$ through that portion of the first gate element 451 surrounded by winding 453, and through second gate element 455 to the one output terminal thus confirming the result obtained from the truth table and the above listed values. Considering the carry unit now for the same set of values for the quantities R, C and S, the corresponding coils 454′, 458′ and 465′ of the carry unit will be energized thus setting up a superconducting path between the source of summation current $I_c$ through first gate element 451′, and second gate element 455′ to the zero output terminal. This result also is verified by the answers obtained from the truth table and the above chart. Similar results may be derived for any other combination of quantities supplied to the epsilon divider network in the above manner. An eta divider module is shown in FIGURE 23 of the drawings, and includes a pair of first gate elements 471 and 472 connected in parallel circuit relationship to a source of summation current $I_s$ with the first gate element 471 being connected to a zero output terminal, and the first gate element 472 being connected to a one output terminal. The first gate element 471 is surrounded by a superconducting field winding 473 which represents a binary one, and the gate element 472 is surrounded by a superconducting field winding 474 which represents a binary zero. The superconducting field windings 473 and 474 form a first digit coil pair and provide a means for reading a first digit to be resolved by the divider C into the divider network. A second superconducting gate element 475 is connected to the first gate element 471 at the output side of the binary one field winding 473, and is connected to the zero output terminal. A second superconducting gate element 476 has one end thereof connected to the first gate element 472 at the output side of the binary zero winding 474, and has the remaining end thereof connected to the binary one output terminal. The second gate element 475 is surrounded by a superconducting field winding 477 which represents a minus or negative signal, and the second gate element 476 is surrounded by a superconducting field winding 478 which represents a plus or positive signal. The purpose of this plus or positive and negative signal in the eta type divider can be appreciated more readily in the following discussion of the function of the divider. A set of third superconducting gate elements are provided formed by a superconducting gate element 479 connected to the second gate element 476 at the output side of the plus or positive field winding 478, and also connected to the binary one output terminal. A third superconducting gate element 481 is connected to the first gate element 471 at the output side of the plus or positive field winding 478 and is also connected to the zero output terminal. A third superconducting gate element 482 is connected to the second gate element 475 at the output side of the minus or negative field winding 477, and is connected to the zero output terminal. A third gate element 483 has one terminal connected to the first gate element 472 at the output side of the minus or negative field winding 477, and has the remaining end thereof connected to the binary one output terminal. The two third gate elements 479 and 481 are surrounded by a superconducting field winding 484 which represents a binary zero, and the two third gate elements 482 and 483 are surrounded by a superconducting field winding 485 which represents a binary one. The two superconducting field windings 484 and 485 form a third digit coil pair for reading a third digit R into the eta divider. A fourth set of superconducting gate elements is connected intermediate the third gate element coil pair and the output terminal, and include a fourth gate element 486 having one end connected to the third gate element 479 at the output side of the binary zero winding 484 of the third digit coil pair, and having the remaining terminal connected to the zero output terminal. A fourth gate element 487 has one end connected to the third gate element 481 on the output side of the binary zero winding 484 of the third digit coil pair, and the remaining end thereof connected to the one output terminal. A fourth gate element 488 is connected to the second gate element 475 at the output side of the binary zero winding 484 of the third digit coil pair, and the remaining end thereof is connected to the binary one output terminal. A fourth gate element 489 is connected with one end thereof to the first gate element 472 at the output side of the binary zero winding 484 of the third digit coil pair, and with the remaining end thereof connected to the zero output terminal of the unit. Another set of fourth gate elements is provided with a fourth gate element 491 having one end thereof connected to the third gate element 482 at the output side of the binary one winding 485 of the third digit coil pair, and with the remaining end thereof connected to the binary one output terminal. A fourth gate element 492 has one end thereof connected to the third gate element 483 at the output side of the binary one winding 485 of the third digit coil pair and the remaining end thereof connected to the binary zero output terminal. A fourth gate element 493 has one end thereof connected to the second gate element 476 at the output side of the binary one winding 485 of the third digit coil pair, and has the remaining end thereof connected to the zero output terminal of the circuit. A fourth gate element 494 has one end thereof connected to the first gate element 471 at the output side of the binary one winding 485 of the third digit coil pair, and has the remaining end thereof connected to the binary one output terminal of the circuit. It should be noted in the case of the third and fourth gate elements, each set is exactly double the number of preceding gate elements. For example, in the third gate element there are two additional gate elements, one for each of the first and second gate elements, and in the fourth gate element, there are again four elements of each of the preceding previous gate elements. The set of four gate elements formed by 491, 492, 493 and 494 are surrounded by a superconducting field winding 495 which represents a binary zero, and the set of fourth gate elements represented by gate elements 486, 487, 488 and 489 are surrounded by a superconducting field winding 496 which represents a binary one. The two superconducting field windings 495 and 496 form a fourth digit coil pair for reading the fourth digit to be resolved by the eta divider into the unit.

Because in operation, the eta divider may very well be supplied quantities which develop a carry output signal, it is necessary to provide a carry unit for use with the divider proper. The carry unit is in all essentials identical in construction and operation to the divider proper, and accordingly, the elements of the carry unit have been identified with the same reference character primed as is used with the corresponding element in the divider unit proper. The carry unit is interconnected with the divider unit proper by having the binary zero or negative windings of the coil pairs thereon, 474′, 477′, 484′ and 495′ directly connected to the corresponding windings of the divider unit 474, 477, 484 and 495, respectively. Similarly, the binary one windings 473′, 478′, 485′ and 496′ of the carry unit are connected directly to the corresponding binary one windings of divider 473, 478, 485 and 496, respectively. The output ends of the third digit coil pair formed by the windings 484 and 485 of the divider unit proper are interconnected, and connected back to the two first gate elements 471′ and 472′ of the carry unit to serve as a source of summation current $I_c$ for the carry unit. Additionally, the gate elements of the carry unit are connected in a fashion similar to the gate elements of the divider with the exception that the second gate element 475′ is connected to the one output terminal, the third gate element 483′ is connected to the zero output terminal, the fourth gate element 486′ is connected to the one output terminal, the fourth gate element 488′ is connected to the zero output terminal, the fourth gate element 489′ is connected to the one output terminal, the fourth gate element 491′ is connected to the zero output terminal, and the fourth gate element 492′ is connected to the one output terminal, and the fourth gate element 493′ is connected to the one output terminal in contrast to the corresponding gate elements in the eta divider proper which are connected to the opposite terminal from that listed above.

The truth table for the eta divider shown in FIGURE 23 is illustrated in FIGURE 24(*e*) of the drawings and has been derived from the design of the eta divider unit. In reading the truth table, the values for the quantity R which is the resultant or partial quotient of a previous divider unit are listed in the two broader vertical columns to the right of the letter R, the values for the quantity B which is one of the digits to be divided are listed in the four narrow vertical columns to the right of the letter B, the values for the quantity C which is a partial carry from a previous divider unit are listed in the two broad lines to the right of the letter C with the top line being the value plus C, and the lower line being the value minus C. The below set forth chart of possible combinations of quantities that can be supplied to the eta divider list the output current values for these quantities in readily readable form.

| R′ | R | B | ± | C | C′ |
|---|---|---|---|---|---|
| 0 | 0 | 0 | + | 0 | 0 |
| 0 | 0 | 0 | − | 0 | 0 |
| 1 | 0 | 0 | + | 1 | 0 |
| 1 | 0 | 0 | − | 1 | 1 |
| 1 | 0 | 1 | + | 0 | 0 |
| 1 | 0 | 1 | − | 0 | 0 |
| 0 | 0 | 1 | + | 1 | 1 |
| 0 | 0 | 1 | − | 1 | 0 |
| 1 | 1 | 0 | + | 0 | 0 |
| 1 | 1 | 0 | − | 0 | 1 |
| 0 | 1 | 0 | + | 1 | 1 |
| 0 | 1 | 0 | − | 1 | 1 |
| 0 | 1 | 1 | + | 0 | 1 |
| 0 | 1 | 1 | − | 0 | 0 |
| 1 | 1 | 1 | + | 1 | 1 |
| 1 | 1 | 1 | − | 1 | 1 |

From an examination of the above set forth table, or of the truth table shown in FIGURE 24(*e*) of the drawings, the proper output current value R′ may be obtained for the eta divider of FIGURE 23. For example, assume that the quantity R is equal to 1, the quantity B is equal to zero, C is equal to one, and a negative input is applied to the second digit coil pair. Assuming the values set forth above, from an examination of the truth table of FIGURE 24(*e*), it can be determined that the output R from the eta type divider should be zero for the number in the upper left hand side of the box which corresponds to the cordinates for $R=1$, $B=0$ and $C=-1$ is a zero, and the numerals on the opposite side of the diagonally extending line is zero so the carry value for this example is also zero. These values can be confirmed from a cursory inspection of the table set forth above. Also, an examination of the eta divider shown in FIGURE 23 also reveals that for the values given the output current will indeed be zero, and the carry output current will also be zero. Referring to the FIGURE 3, it can be appreciated that for the values assumed, electric current will flow in the first digit coil pair binary one windings 473′ and 473, the second digit coil pair negative windings 477′ and 477, the third digit binary one windings 485′ and 485, and the fourth digit binary zero windings 495′ and 495. When thus energized, a superconducting path will be formed in an eta divider proper by the first gate element 472, the second gate element 476, the third gate element 479, and the fourth gate element 486, and end up at the zero output terminal thus confirming the results obtained from tthe truth table shown in FIGURE 24(*e*). Similarly, for the values cited, a superconducting path will be set up between the source of summation current $I_c$ and the output terminals of the carry unit through the gate elements 472′, the second gate element 476′, the third gate element 479′, and the fourth gate element 486′ and will terminate at the zero output terminal. It can be seen that the output terminal connected to the source of summation current $I_c$ is the zero output terminal thereby providing the answer indicated by the truth table to be the correct one.

FIGURE 25 of the drawings shows the functional block diagram of the division network utilizing the divider modules illustrated and described with relation to FIGURES 17–23 of the drawings. The division network, shown in FIGURE 25 of the drawings, operates in accordance with the philosophy described more fully in an article entitled "Proceedings of a Second Symposium on Large Scale Digital Calculating Machines," which is a French publication. The philosophy is also described in the textbook entitled "Automatic Digital Computers," by Wilkes, published by John Wiley and Sons; see page 238 for an outline of the method. Briefly, the method operates as follows: To determine the quotient of Q of A divided by B, (1) place the lowest order position of the numeral B under the highest order of numeral A and subtract to get a partial resultant R. If the partial resultant R is zero or positive, then (2A) write a 1 for the *n*th quotient order to the left of the first partial resultant R; then shift the value of B one place to the right, and subtract from the resultant R to get a new partial resultant R′. In the event that the first resultant R is negative in value, then (2*b*) write a zero for the *n*th quotient order to the left of the first partial resultant 2*b*, shift the value of B one place to the right, and add to the first partial resultant R to get a new partial resultant R′. Steps 2 and 3 above are repeated as many times as is required to obtain the desired quotient to as many binary point places as is desired.

In order to illustrate the method more completely, several examples will be worked out as follows. For example, consider the quotient of the binary numerals 110 divided by 011 which, in the decimal numeral system, is the value 6 divided by the value 3.

```
         110                    A=110
         011                    B=011
        ----
0 - 111010—This is a negative remainder R so a zero (0) is written
            for the Q₃ quotient.
```

+011 —B shifted one place to right and added.

1 - 000000—The new remainder R′ is zero so a one (1) is written for the $Q_1$ quotient.

—011—B shifted one place to the right and subtract.

0 - 111101—This is a negative remainder so a zero (0) is written for the $Q_0$.

The resulting answer is a binary two (010) which, in the decimal system, is the correct answer for the quotient of 6/3=2. In tracing through the above division in accordance with the instructions set forth above, the lowest value B where $B_2=0$, $B_1=1$ and $B_0=1$ is placed in order under the highest value of A where $A_2=1$, $A_1=1$ and $A_0=0$. B is then directly subtracted from the value A to give the resultant R and, as can be appreciated since the value of B is much higher when placed in this order, it produces a negative number thereby resulting in a value of zero for the $n$th quotient order $Q_2$. Because the resultant R is negative, a zero is written for the $n$th or $Q_2$ quotient order, and the value of B is shifted one place to the right and added to the resultant R to produce a new resultant R′. This addition results in the answer zero which in accordance with the instruction gives us a one for the $n$th minus one or $Q_1$ quotient order and accordingly, a one is written to the left of this resultant R′. In accordance with the instructions then, the value of B is again shifted one place to the right but this time is subtracted from the resultant R′ to give us a new resultant R″. This results in a negative number so that the $n$th minus 2 or $Q_0$ quotient order is zero. Further steps of the division operation can be carried out but it can be appreciated that it will only result in further negative members thereby indicating that there is no carryover value and that the value B went into the value A an even number of times. An examination of the quotient resulting from the division indicates that this is true since 010=2 in the decimal system. This is confirmed by the decimal division of 6 divided by 3 which is equal to 2 an even number of times with no remainder.

To further illustrate the method consider a second example where $A=110$ and $B=010$, this is the equivalent decimal notation of the value 6 divided by 2.

```
              110
              010
$Q_2$=0 - 111110 —R
             +010
$Q_1$=1 - 000010 —R′
             —010
$Q_0$=1 - 000000 —R″
```

From a consideration of the above problem it can be seen that in accordance with the instructions, the value of B which is 010 is placed in its highest order under the value A which is 110. Subtraction of B from A then results in the value 111110 which is negative in character. Hence, in accordance with the instruction a zero is written for the $n$th quotient order $Q_2$ to the left of the first resultant value R. In accordance with the instructions the value of B is shifted one place to the right and is added to R to produce a new resultant R′. The new resultant R′ is 000010 which is positive in character. Hence, a one is written for the $n$th minus one or $Q_1$ quotient order to the left of the resultant R′. Then in accordance with the instructions since the new resultant R′ is positive in character, B is again shifted one place to the right but this time is subtracted from the resultant R′ to get still another new resultant R″. These steps result in the answer 00000 which is zero and hence, provides us with an answer of one for the $n$th minus two quotient order $Q_0$. Further steps of the operation will continue to produce negative answers hence indicating that there is no carryover value, and that the divisor went into the dividend an even number of times. The decimal notation the value 110 is equal to 6 and the decimal value 010 is equal to 2. Hence, the answer should be 3. An examination of the quotient obtained reveals that the answer obtained was 011 which is the binary equivalent of the decimal numeral 3.

Referring now to FIGURE 25 of the drawings, and comparing this functional block diagram to one of the examples worked out above the function of each of the blocks or divider modules, and the manner in which they function to develop an output quotient, can be appreciated. For example, in the first line of blocks it can be seen that the two alpha units 501 and 502 merely receive two factors $A_0$ and $A_1$ and translate them into the form of $R_0$ and $R_1$, which are equal to $A_0$ and $A_1$ respectively. The beta divider unit 503 functions to subtract the value $B_0$ from $A_2$ and to produce an output resultant signal $R_2$, and a borrow value C which is supplied to the next succeeding gamma unit 504. The gamma unit 504 performs the function of subtracting the value $B_1+C$ from zero and provides an output resultant signal $R_3$, and a carry signal to the next succeeding gamma unit 505. The gamma unit 505 performs the function of subtracting the value $B_2+C$ from zero, and to produce a resultant output signal $R_4$ and a carry signal C which is supplied to an alpha unit 506. The alpha units are nothing more than straight conductors which translate the signal C to $R_5$ where $R_5=C$ and transmits the signal to a delta unit 507. The resultant output signal $R_5$ provides an indication whether the partial sum obtained from the arithmetic in the first line of modules is negative or positive, and supplies this negative or positive control signal through the delta unit 507 back to the second line of divider modules in the division network. This signal since its polarity determines whether the $n$th quotient order $Q_2$ will be a one or zero is also used to provide an indication of the value of the $n$th quotient $Q_2$.

In addition to the delta unit 507, the second line of divider modules in the division network includes an alpha unit 508 which merely serves to translate the value $R_0=A_0$ into the new resultant value $R_0'$ where $$R_0'=R_0=A$$

and supply $R_0'$ to the first divider unit 515 in the third line of dividers in the network. The second divider module 509 in the second line of dividers comprises an eta type divider for receiving the resultant signal $R_1$ and performing the operation $R_1$ minus $A_0$ to provide a new resultant output signal $R_1'$, and a borrow or carry signal C to the next succeeding divider module 511. The divider module 511 also comprises an eta divider unit for performing the function $R_2$ minus or plus $B_1$ minus $C$ to produce a new resultant output signal $R_2'$ and a borrow or carry signal. This borrow or carry signal is supplied to a third eta divider 512 which receives the resultant signal $R_3$ from the divider 504 in the first line of dividers, a signal representative of the value $B_2$, the carry signal C, and either an add or subtract control signal to perform the function $R_3$ plus or minus $B_2$ minus $C$ and thereby develop a new resultant signal $R_3'$, as well as a borrow or carry signal C. This borrow or carry signal is supplied to an epsilon unit 513 which performs the function $R_4$ plus or minus $C$ to develop a new resultant output signal $R_4'$, and a carry signal C which is supplied to the delta unit 507 in conjunction with the resultant output signal $R_5$ from the first line of dividers. The delta unit 507 then develops a new resultant output signal $R_5'$ which represents the total borrow or carry value developed by the second line of divider units, and hence can be used to derive a value of the $(n-1)^{th}$ quotient $Q_1$. Additionally, this $R_5'$ signal is supplied back to the third line of divider units as either a subtract or add control signal through a second delta unit 514 situated at the end of the third line of divider units.

In addition to the delta unit 514, the third line of divider units includes a first eta type divider 515 which receives two input signals $R_0'$ which is equal to $A_0$, and $B_0$, and functions to perform the operation $R_0'-B_0$ and to develop an output signal indicative of the resultant of the subtraction $R_0''$, as well as a carry or borrow signal C. This carry or borrow signal is supplied to an eta divider 516 which also receives the resultant signal $R_1'$ from the eta divider 509 in the second line, and the value $B_1$ and functions to develop a new resultant output signal $R_1''$ as well as a carry signal. This carry signal is supplied to still a third eta divider 517 which also receives the resultant signal $R_2'$, and the input signal $B_2$, and functions to perform the operation $R_2'$ plus or minus $B_2$ minus $C$ to develop new resultant output signal $R_2''$, and a carry signal. This carry signal is supplied to an epsilon divider 518 which also receives the resultant output signal $R_3'$ from the eta divider 512 in the second line of dividers, and operates to develop a new resultant output signal $R_3''$, as well as a carry signal, by performing the operation $R_3'$ plus or minus $C$. The carry signal from epsilon unit 518 is supplied to a second epsilon unit 519 which also receives the resultant output signal $R_4'$ from the epsilon unit 513 in the second line of dividers, and functions to perform the operation $R_4'$ plus or minus $C$ to develop a new resultant output signal $R_4''$, as well as a carry signal. This last carry signal is supplied to the delta unit 514 as the total carry or borrow value $R_5''$ resulting from the third summation process, and hence can be used to derive the value of the $(n-2)^{th}$ quotient $Q_0$ as well as to determine whether a positive or negative control current will be supplied to the fourth line of divider units through a delta unit 521 to which the resultant output signal $R_5''$ is supplied.

Only three digits were available in each of the quantities applied to the division network, the network being designed only as a three place division network, the three quotients $Q_2$, $Q_1$ and $Q_0$ would be adequate as an answer if it were not desired to determine whether a carryover value results from the division, hence indicating that the answer obtained was not entirely correct since it is carried to only three places. For this purpose, the fourth line of divider units is provided and includes a theta divider 522 which receives the values $B_0$ and the negative or positive control signal supplied through the delta unit 521 to develop a resultant output signal $R'''-1$ which indicates that the answer is now going into the binary fraction region, and hence should be to the right of the binary point, and supplies this resultant $R'''-1$ signal to a lambda unit 503. The theta unit 522 also develops a carry or borrow signal which is supplied to an eta divider 524 which also receives the values $B_1$, and the resultant output signal $R_0''$ from the eta divider 515 in the third line of dividers. The eta divider 524 performs the operation $R_0''$ plus or minus $B_1$ minus $C$ to develop a resultant output signal $R_0'''$ which is supplied to a lambda unit 525. The eta divider 524 also develops a carry or borrow signal C which is supplied to another eta divider 526 which receives also the plus or minus summation signal, the value $B_2$ and the resultant signal $R_1''$ developed by the eta divider 516 in the third line of dividers. The eta divider 526 then develops a new resultant output signal $R_1'''$ which is supplied to a lambda unit 527, and develops a carry or borrow signal as well. This carry signal is supplied to an epsilon unit 528 which performs the function of $R_2''$ plus or minus $C$ to develop a new resultant output signal $R_2'''$ that is supplied to a lambda unit 529. Epsilon unit 528 also develops a carry signal which is supplied to a second epsilon unit 531 which also receives the resultant output signal $R_3''$ from the epsilon unit 518 in the third line of dividers. Epsilon unit 531 then operates to perform the function $R_3''$ plus or minus $C$ to develop a new resultant output signal $R_3'''$ which is supplied to a lambda unit 532, and to develop also a carry signal. This carry signal is supplied to a third epsilon unit 533 which also receives resultant output signal $R_4''$ from the epsilon unit 519 in the third line of dividers. Epsilon unit 533 then functions to perform the operation $R_4''$ plus or minus $C$ to develop a new resultant output signal $R_4'''$ that is supplied to a lambda unit 534. Epsilon unit 533 also develops a carry signal which, together with the resultant signal $R_5''$, is supplied to the delta unit 521. Delta unit 521 then develops a new resultant output signal $R_5'''$ which is supplied to a lambda unit 535. The lambda units 525, 524, 529, 532, 534 and 535 then function to couple the output of the fourth line of dividers to an error indicator which may of course comprise a superconducting gate element having a superconducting field winding surrounding it. The details of construction and further description of operation of the division network shown in FIGURE 25 will be more readily apparent after the following description of the detailed circuit diagram of the division network shown in FIGURES 26 to 29 of the drawings.

Figure 26:
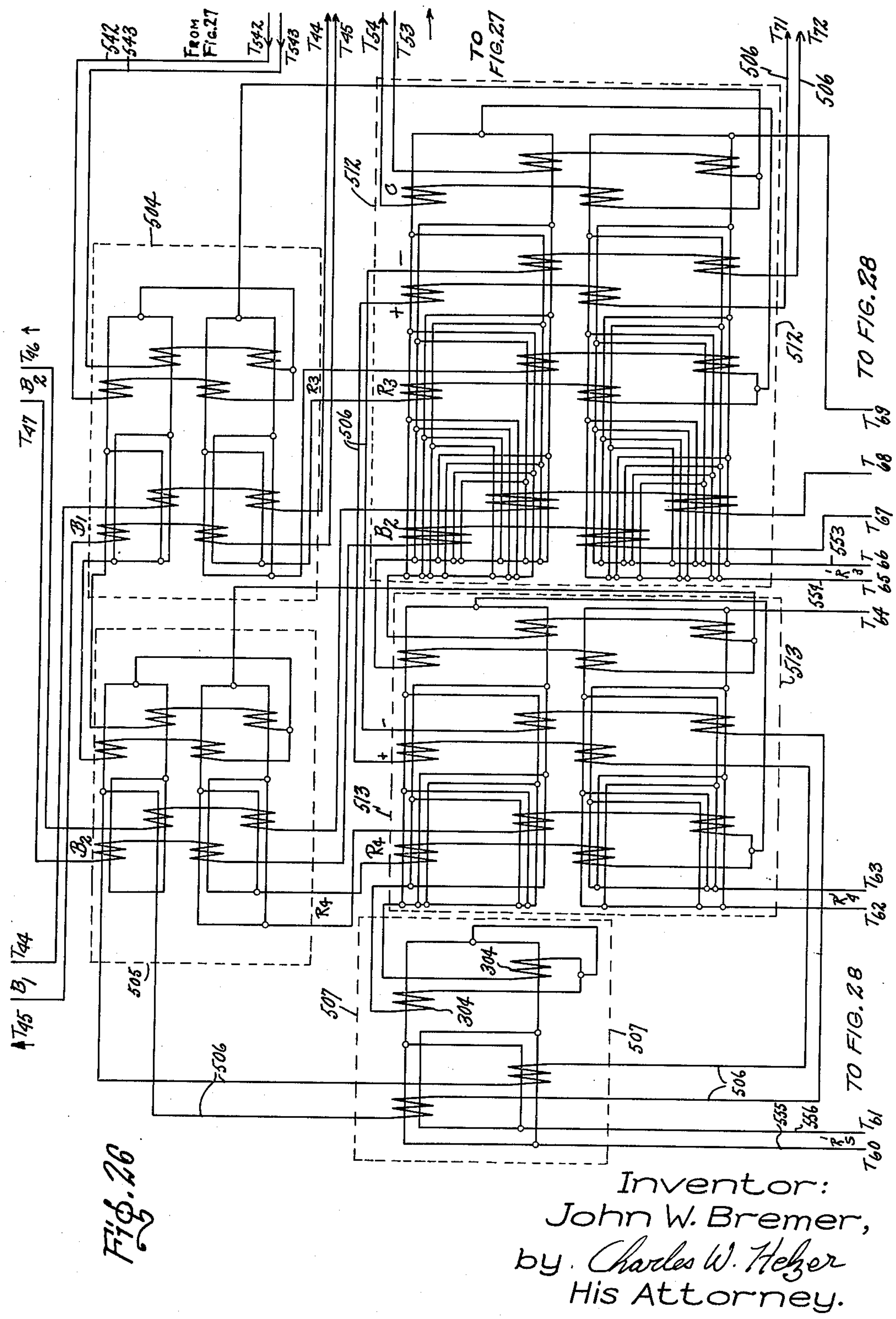
Figure 27:
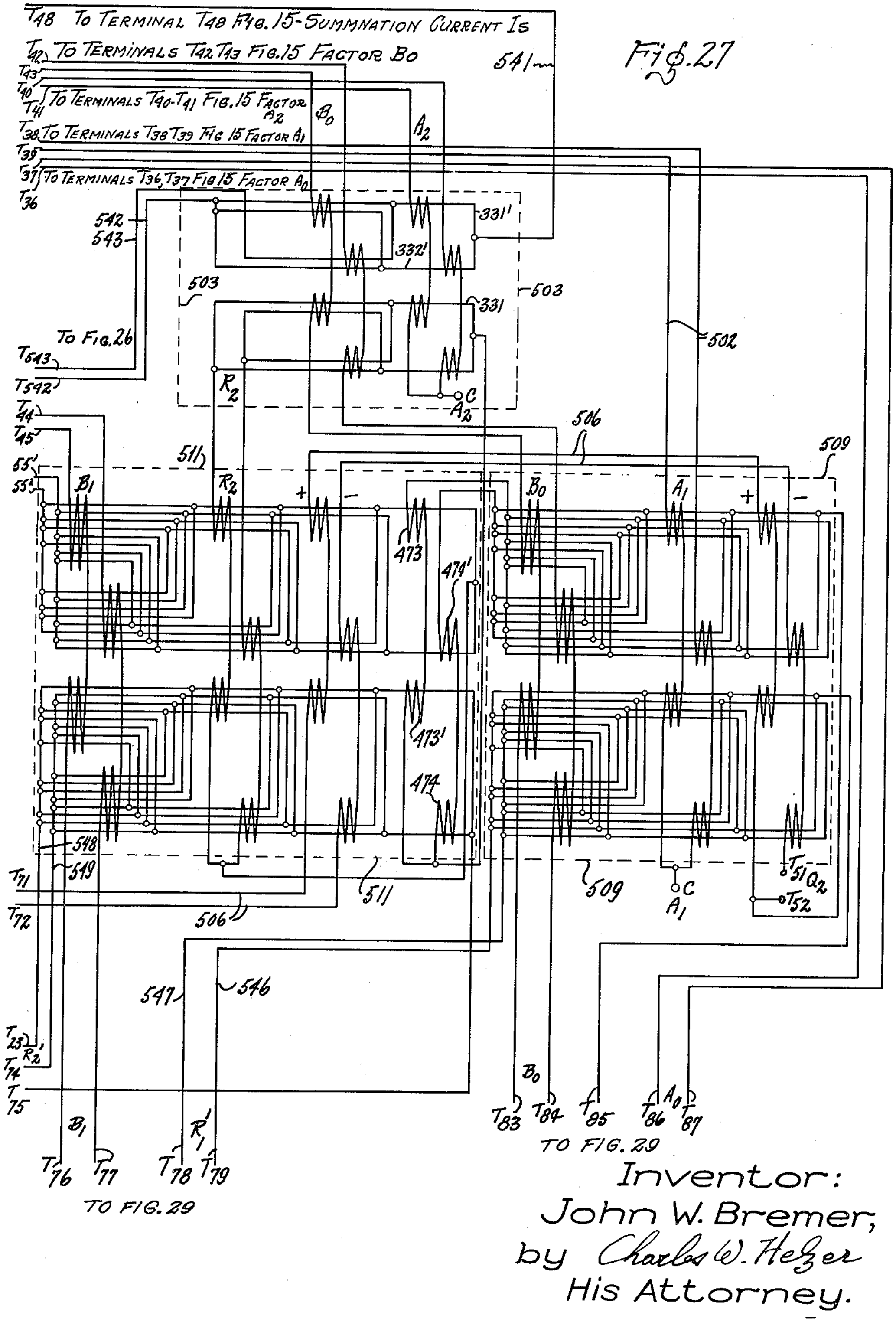
Figure 28:
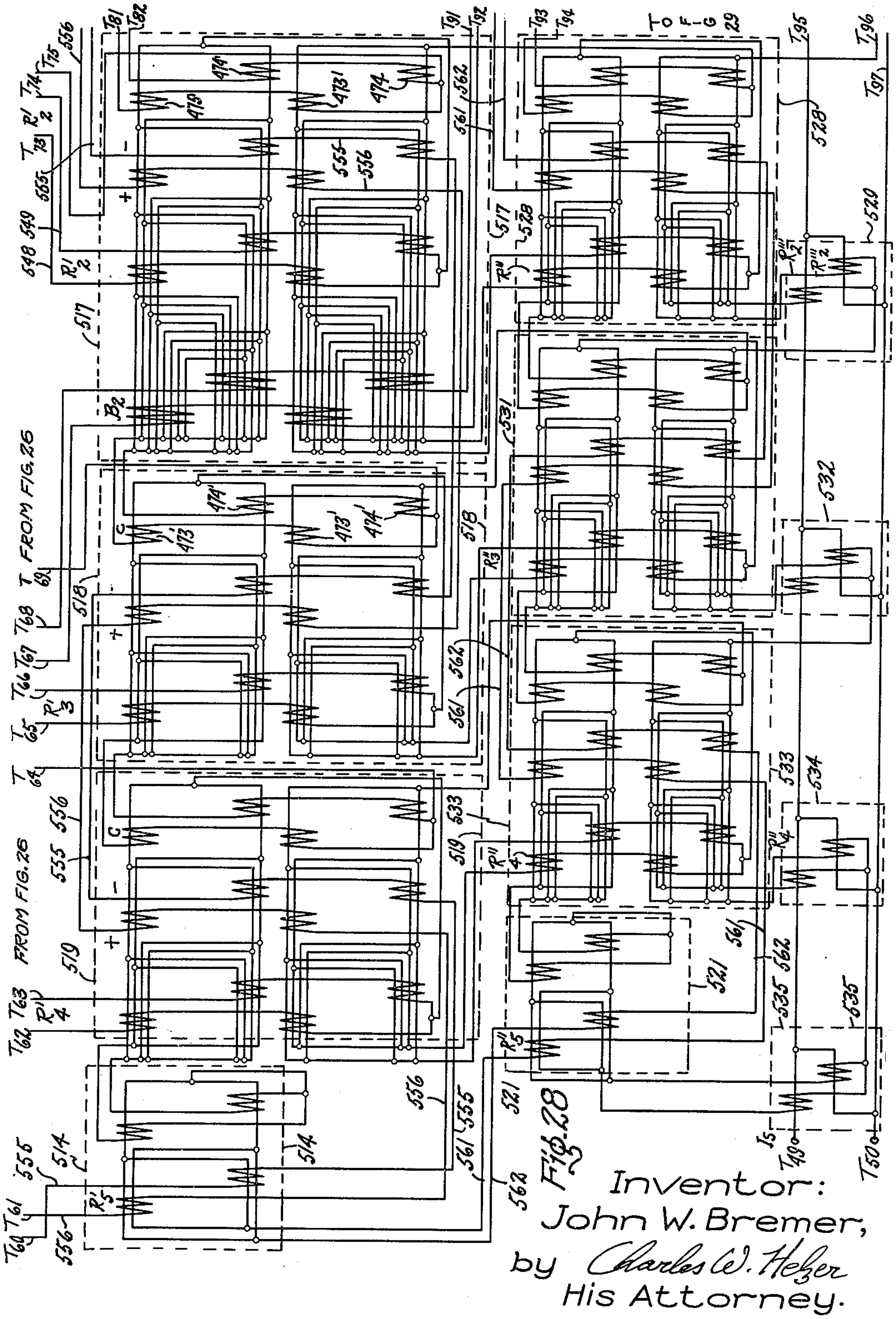

Referring now to FIGURES 26 and 27 of the drawings, and to FIGURE 27 in particular, instructions from the control instruction panel 121 shown in FIGURE 15 of the drawings are supplied to the divider unit through the conductor 541 to the beta unit 503. These instructions are in the form of connecting the source of summation current $I_s$ to the first two gate elements 331' and 332'. As the entire division network constitutes a large direct current series circuit, this is the only exterior source of excitation summation current required exclusive of the signals representing the quantities to be divided, and it is fed to the carry unit of the first beta divider 503. The beta divider 503 is identical in construction and operation to the beta divider described with relation to FIGURE 20 of the drawings, and hence will not be again described in detail. It is believed sufficient to point out that the beta divider 503 has the two quantities $A_2$ and $B_0$ supplied thereto, and functions to subtract the quantity $B_0$ from the quantity $A_2$. The resultant signal $R_2$ obtained from this operation is then supplied to the third digit coil pair of an eta divider 511 in the second line of dividers of the division network. Simultaneously, a carry signal developed by the carry unit of the beta divider 503 is supplied across the conductors 542 and 543 to the first digit coil pair of a second beta divider 504 shown in FIGURE 26 of the drawings. The divider 504 is a gamma divider which is similar in construction and operation to the gamma divider shown in FIGURE 21 of the drawings, and hence will not be again described in detail. The gamma divider 504 also has supplied to the second digit coil pair the quantity $B_1$, and functions to perform the operation 0 minus $B_1$ minus $C$ since the signal C merely constitutes a borrow signal and must be subtracted from this stage. The gamma divider 504 develops a resultant output signal $R_3$ which is supplied to the third digit coil of a divider 512 in the next or second line of dividers, and also develops a carry signal which is supplied to a gamma divider unit 505 in the first line. The gamma divider 505 is similar to that illustrated and described with relation to FIGURE 21 of the drawings, and hence will not be described again in detail. It is sufficient to point out that this divider receives the quantity $B_2$ and the borrow signal C developed by the divider 504, and operates to develop a resultant output signal $R_4=(0-B-C)$ which is supplied to a third digit coil pair of a divider 513 in the second line of dividers. The divider 505 also develops a carry output signal which is supplied through the superconductors 506 which constitute an alpha divider unit to a delta divider unit 507. It should be noted that the conductors 506 correspond to the alpha unit 506 of the block diagram shown on FIGURE 25, and serve no other purpose than to conduct the carry output signal developed by the gamma divider 505 to the delta unit 507. It should also be noted that the electric signal applied to the superconductors 506 constitutes the total carry or borrow signal $R_5$ developed in the first line of dividers 505, 504, 503, and can be used to derive the *n*th quotient value which in this case is the $Q_2$ value. As described earlier, the polarity of this value determines whether the quantities in the next or second line of dividers are to be added or subtracted, and also of course determines the value of the *n*th quotient order $Q_2$. In the event this borrow value is negative in character, then the *n*th quotient order $Q_2$ will be a zero (0), and it will be so indicated on the readout panel 125 shown in FIGURE 15*a* of the drawings. In the event that the carry signal $R_5$ supplied to the conductors 506 is zero or positive in character, then the *n*th quotient order $Q_2$ will be a one (1), and it will be so indicated on the readout panel 125 of FIGURE 15*a*. This is accomplished by supplying the carry signal $R_5$ through the superconductors 506 to the second digit coil pairs of each of the dividers 513, 512, 511, and 509 of the second line of divider units, and finally to the readout terminals $T_{51}$ and $T_{52}$. The readout terminals $T_{51}$ and $T_{52}$, as best seen in FIGURE 15*a* of the drawings, are connected to a superconducting field winding 545 which surrounds the readout gate element 205 to provide an output indication of the value of the *n*th quotient order $Q_2$.

Concurrently with the above described action, the second line of divider units of the division network formed by dividers 509, 511, 512 and 513 function to develop the second partial sum in the answer. The divider unit 509 is a modified eta divider unit similar to that described and illustrated in FIGURE 23 of the drawings with the exception that there is no first carry stage since the divider 509 is the first divider in the line, and accordingly the carry input would be zero in all instances. In all other respects the divider unit 509 is identical to the eta divider shown in FIGURE 23, and a further description of the construction and operation of the divider is believed unnecessary. It should be noted however that the eta divider 509 is supplied with the quantity $B_0$ to the fourth digit coil pair thereof, the quantity $A_1$ to the third digit coil pair thereof, and the positive and negative control signal to the second digit coil pair thereof. The eta divider 509 then operates to perform the function $R_1 \pm B_0$ to develop a new remainder output signal $R_1'$ which is supplied through the conductors 546 and 547 to the second divider unit 516 in the third line of dividers shown in FIGURE 29 of the drawings. Additionally, the eta type divider 509 develops a carry output signal C which is supplied to the first digit coil pair 473, 473' and 474, 474' of a divider 511. In addition to the carry value from the divider unit 509, the divider 511 receives the positive or negative control signal across the conductors 506 developed by the first line of dividers, the quantity $R_2$ which the remainder value developed by the divider 503 in the first line of dividers, and the quantity $B_1$. Divider 511 then functions to perform the operation $R_2$ plus or minus $B_1$ minus $C$ to develop a new remainder $R_2'$ which is supplied through the conductors 548, 549 to a divider unit in the third line of dividers. Additionally, the eta divider 511 also develops a carry output signal C which is supplied through conductors 551 and 552 to the next divider 512 in the second line. The next divider in the line 512 is shown in FIGURE 26 of the drawings, and comprises an eta divider. The eta divider 512 is identical to the eta divider shown in FIGURE 23 of the drawings, and hence will not be again described in detail. In addition to the carry value, the eta divider 512 receives the positive or negative control signal supplied over the conductors 506 to the second digit coil pair thereof, the remainder $R_3$ developed by the divider 504 in the first line of dividers, and the quantity $B_2$ and operates to perform the operation $R_3$ plus or minus $B_2$ minus $C$ to develop a new remainder $R_3'$. This new remainder $R_3'$ is supplied through the conductors 553 and 554 to a divider unit in the third line of dividers. The eta divider 512 also develops a carry signal C which is supplied to the first digit coil pair of an epsilon divider 513. The epsilon type divider 513 is identical in construction and operation to the epsilon divider shown in FIGURE 22 of the drawings, and hence will not be described in detail. It is believed sufficient to point out that the epsilon divider 513 receives the carry value signal from the eta divider 512, the positive and negative control signal developed by the first line of dividers supplied through delta unit 507 and conductors 506 and the remainder signal $R_4$ developed by the last divider 505 in the first line of dividers. The epsilon divider 513 then functions to develop a new remainder signal $R_4'$ which is equal to the value $R_4$ plus or minus $C$. The epsilon divider 513 also develops a carry output signal which is supplied to the first coil pair 303, 304 of the delta divider unit 507. It should be noted that the delta divider unit 507 also has supplied to the second digit coil pair thereof the carry value $R_5$ developed by the first line of dividers. As a consequence, the delta unit 507 operates to develop a new carry value $R_5'$ which represents the carry value obtained by the partial sum of the first two lines of dividers. This carry value signal $R_5'$ is supplied through the conductors 555 and 556 to the second digit coil pair of the delta unit 514 of the third line of dividers shown in FIGURE 28 of the drawings.

The new resultant carry current $R_5'$ is supplied through conductors 555 and 556 to the second digit coil pair of the delta divider 514 in the third line of dividers, and contains the information as to whether or not the resultant partial sum obtained from the second line of dividers is either positive or negative, and hence whether the quantities supplied to the third line of dividers is to be subtracted or added. For this purpose the conductors 556 and 555 are connected back to the binary one and the binary zero windings respectively of each of the second digit coil pairs of the dividers 519, 518, 517, 516 and 515 in the third line of divider units. At the output end of the second digit coil pair of the divider 515, the conductors 555 and 556 are connected to output terminals $T_{54}$ and $T_{53}$. As best shown in FIGURE 15*a* of the drawings, the output terminals $T_{53}$ and $T_{54}$ are connected across a superconducting readout field winding 558 which surrounds the superconducting readout gate element 202 to provide an output indication of the value of the $(n-l)^{th}$ quotient order $Q_1$. In addition to the plus or minus control signal, the divider unit 515 has supplied thereto the two quantities $A_0$ and $B_0$. The divider unit 515 constitutes an eta divider such as that shown in FIGURE 23 of the drawings with the exception that since it is the first divider in the line, there can be no carry value to be supplied thereto, and hence it does not include a first digit coil pair. The divider unit 515 otherwise functions in precisely the same manner as the eta divider described with relation to FIGURE 23 of the drawings, and hence will not again be described in detail. It is believed sufficient to point out that the divider 515 performs the function $A_0$ plus or minus $B_0$ to develop a remainder output $R_0''$ which is supplied to the first divider unit 523 in the fourth line of dividers. Additionally, the divider unit 515 develops a carry value output signal C which is supplied to the first digit coil pair 473, 474 of the divider 516. The divider 516 is an eta divider identical to that shown in FIGURE 23 of the drawings, and it functions in precisely the same manner so that the further description thereof is believed unnecessary. In addition to the carry values supplied to the first digit coil pair, the positive and negative control signal are supplied to the second digit coil pair, the resultant output signal $R_1'$ developed by the first eta divider 509 in the second line of dividers is supplied to the third digit coil pair, and the quantity $B_1$ is supplied to the fourth digit coil pair. Divider 516 then functions to perform the operation $R_1'$ plus or minus $B_1$ minus $C$ to develop a new resultant output signal $R_1''$ that is supplied to the third digit coil pair of a divider unit 526 in the fourth line of dividers. The divider 516 also serves to develop a carry output signal C which is supplied through the conductors $T_{81}$ and $T_{82}$ to the first digit coil pair 473 and 474 of a third eta divider unit 517. The divider unit 517 is identical in construction and operation to the eta divider shown in FIGURE 23, and hence will not be described in further detail. In addition to the carry value supplied to the first digit coil pair, and the positive and negative control signal supplied through conductors 555 and 556 to second digit coil pair, the divider unit 517 receives resultant output current value $R_2'$ developed by the eta divider 511 in the second line of dividers, and the quantity $B_2$. The divider unit 517 performs the operation $R_2'$ plus or minus $B_2$ minus $C$ to develop a new resultant value output current $R_2''$ which is supplied to the divider unit 528 in the fourth line of dividers, and also develops a carry output current C which is supplied to the first digit coil pair 473, 474 of a succeeding divider 518 in the third line of dividers. The divider unit 518 is similar in construction to an epsilon divider unit such as shown in FIGURE 22 of the drawings, and functions in an identical manner, so it will not be described again in detail. The epsilon divider 518 in addition to the carry value signal C, receives the plus or minus control signal supplied thereto through conductors 555 and 556, and the resultant output signal $R_3'$ developed by the eta type divider 512 in the second line of dividers. The divider unit 518 operates to perform the function $R_3'$ plus or minus $C$ to develop a new resultant output signal $R_3''$ that is supplied to a divider unit 531 in the fourth line of dividers, and to develop to carry output signal C which is supplied to the first digit coil pair of the next succeeding divider unit 519. The divider unit 519 also constitutes an epsilon type divider unit such as described in FIGURE 22 of the drawings, and hence will not be described in detail. In addition to the carry value applied thereto from the preceding epsilon unit 518 in the third line of dividers, epsilon unit 519 receives a remainder output signal $R_4'$ developed by the epsilon unit 513 in the second line of dividers. The epsilon divider unit 519 functions to perform the operation $R_4'$ plus or minus $C$ to develop a new remainder output signal $R_4''$ that is supplied to a divider 533 in the fourth line of dividers. Epsilon divider 519 also develops a carry output signal C which is supplied to the first digit coil pair of the delta unit 514. The second digit coil pair of the delta unit 514 also has the remainder or carry output current $R_5'$ supplied thereto which is developed by the second line of divider units, and functions to develop a new carry value output current $R_5'''$ for the third line of divider units.

Figure 29:
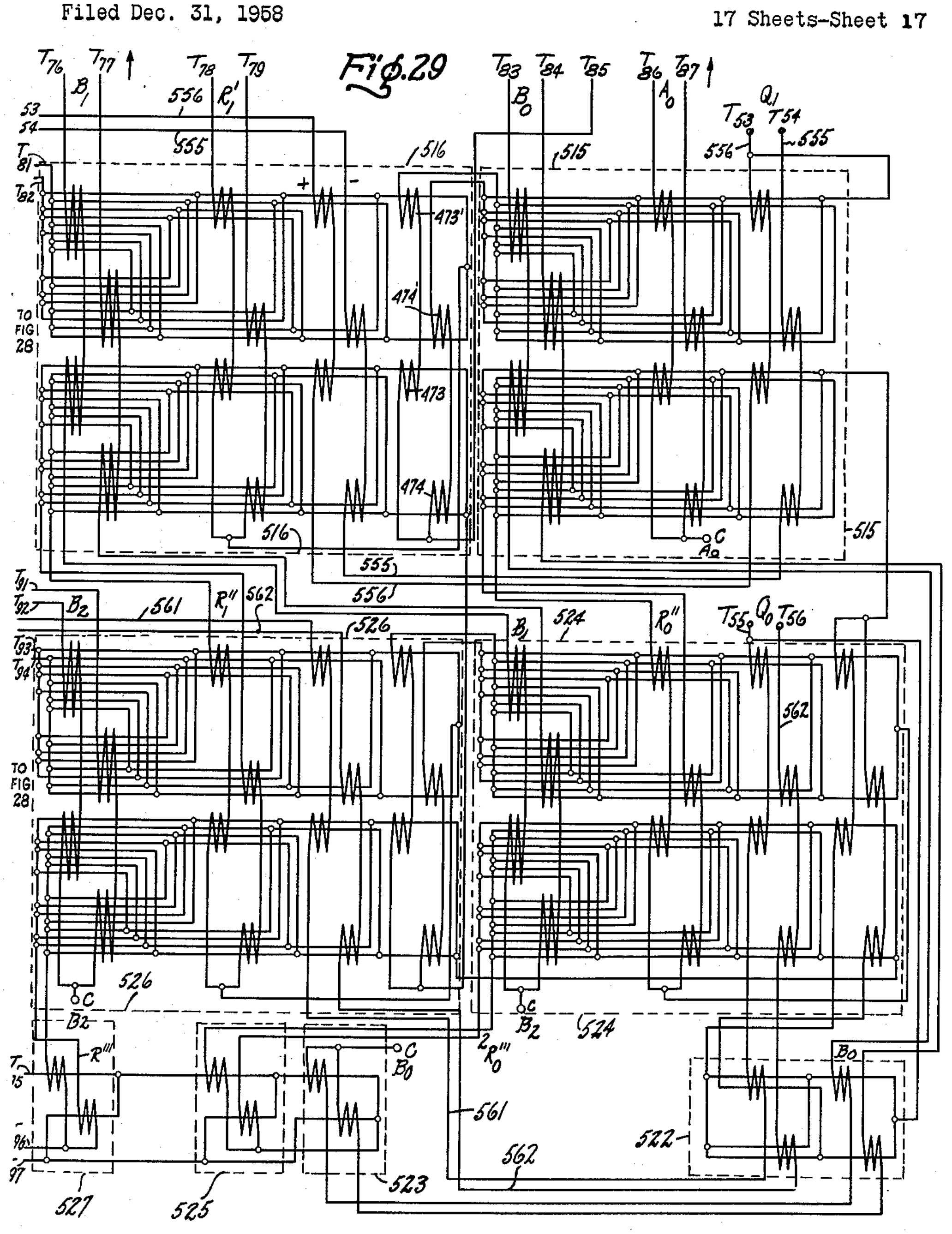

The new resultant carry output signal $R_5''$ represents the partial sum obtained from the third subtraction or addition as carried out by the third line of dividers, and hence can be used to determine the $(n-2)^{th}$ quotient order $Q_0$. Additionally, whether this value is positive or negative in character determines whether or not the additional quantities supplied to the fourth line of dividers are to be added or subtracted. Hence the conductors 561 and 562 are connected to supply this output signal to the second digit coil pairs of each of the divider units 523, 531, 528, 526, 524, and 522 in the fourth line of dividers. The two conductors 561 and 562 at the output side of the second digit coil pair of the last divider unit 523 shown in FIGURE 29, are connected to a pair of output terminals $T_{55}$ and $T_{56}$. As best shown in FIGURE 15*a* of the drawings, the output terminals $T_{55}$ and $T_{56}$ are connected across a superconducting field winding 563 which surrounds the superconducting gate element 200 for providing an output indication of the value of the $(n-2)^{th}$ quotient $Q_0$. It can therefore be appreciated that the three quotients $Q_2$, $Q_1$ and $Q_0$ have now been obtained by the divider unit, and since this provides an answer to three places from the binary point, it is adequate for a three place division network. However, it is also desirable to determine whether there is any carryover value in the quantities being divided in order to determine whether one factor went into the other evenly, or it may sometimes be desirable to carry out the division process to further places beyond the binary points into the fraction region. For this purpose, the fourth line of dividers is provided.

The fourth line of dividers is formed by a theta divider 522 which in addition to the positive and negative control signal supplied thereto over the conductors 561 and 562, has the quantity $B_0$ supplied thereto. The theta divider 522 is identical in construction and operation to the theta divider shown in FIGURE 18 of the drawings, and hence will not be described further in detail other than to point out that it functions to develop an output carry signal $C=\pm B_0$ representative of the value plus or minus $B_0$, and to apply this value to the first digit coil pair of an eta divider. In addition, the theta divider 522 supplies the quantity $B_0$ to a lambda unit 523. The eta type divider 523 receives the remainder output value $R_0''$ developed by the first divider 515 in the third line of dividers, and the quantity $B_1$ in addition to the carry signal developed by theta unit 522, and functions to perform the operation $R_0''$ plus or minus $B_1$ minus $C$ to derive a remainder output signal $R_0'''$ which is applied to the single coil pair of a readout lambda unit 525. Additionally, the eta divider 523 develops a carry output signal C which is supplied to the first digit coil pair of a second eta divider 526. Divider 526 is also identical in construction and operation to the eta type divider shown in FIGURE 23 of the drawings, and in addition to the carry value supplied therefrom from divider 523, and the plus or minus control signal supplied over conductors 561 and 562, it receives a remainder value current $R_1''$ from divider 516 in the third line of dividers, and the quantity $B_2$. The eta divider 526 then functions to perform the operation $R_1''$ plus or minus $B_2$ minus $C$ to develop a new remainder output signal $R_1'''$ which is supplied to the lambda output circuit 527 for indicating overflow values. The eta type divider 526 also develops a carry output signal C which is supplied across conductors $T_{93}$ and $T_{94}$ to the first digit coil pair of an epsilon type divider unit 528 shown in FIGURE 28. Epsilon divider 528 also receives the plus or minus control signal through the conductors 561 and 562, and has a remainder output current $R_2''$ supplied to the third digit coil pair thereof from the divider unit 517 in the third line of dividers. Epsilon unit 528 is identical in construction and operation to the epsilon unit shown in FIGURE 22, and performs the operation $R_2''$ plus or minus $C$ to develop a new remainder output current $R_2'''$ which is applied to the single digit coil pair of a readout lambda unit 529. Additionally, the epsilon divider 528 develops a carry output signal C which is supplied to the first digit coil pair of a second epsilon divider unit 531. The epsilon divider unit 531 is identical in construction and operation to the epsilon divider shown in FIGURE 22 of the drawings, and hence will not be described further. Epsilon unit 531 in addition to the carry output signal C supplied thereto from epsilon divider 528, receives a plus or minus control signal over the conductors 561 and 562 which is supplied to the second digit coil pair thereof, and develops a remainder output current $R_3''$ supplied to the third digit coil pair thereof from divider 518. The epsilon divider 531 then functions to perform the operation $R_3''$ plus or minus $C$ to develop a new output remainder current $R_3'''$ which is applied to the single digit coil pair of a readout lambda unit 532. Additionally, the epsilon unit 531 develops a carry output signal which is supplied to the first digit coil pair of still a third epsilon unit 533. The epsilon divider unit 533 is likewise identical in construction and operation to the epsilon divider described and illustrated with respect to FIGURE 22 of the drawings and hence it will not be described in greater detail. It is believed sufficient to point out that in addition to the carry value supplied to the first digit coil pair thereof, epsilon unit 533 has the positive or negative control signal applied to the second digit coil pair thereof by the conductors 561 and 562, and has a remainder output current $R_4''$ supplied thereto from the divider unit 519 in the third line of dividers. Epsilon divider 533 then functions to perform the operation $R_4''$ plus or minus $C$ to develop the new output remainder $R_4'''$ which is applied to the single digit coil pair of the readout lambda unit 534. Additionally, epsilon divider unit 533 develops an output carry signal C which is applied to the first digit coil pair of the delta unit 521 in conjunction with the remainder value current $R_5''$ that is supplied to the second digit coil pair thereof. The output terminals of the delta unit 521 are connected to the single digit coil pair of the readout lambda unit 535. All of the readout lambda units 526, 527, 525, 529, 532, 534, and 535 are interconnected to two long superconducting gate elements one of which represents a binary zero and the other of which represents a binary one. As can be appreciated if any of the divider units in the fourth line of dividers has a carry remainder, this fact will be registered at the output terminals $T_{49}$ and $T_{50}$ of the interconnected lambda units. To indicate this value, as best shown in FIGURE 15*a* of the drawings, the terminals $T_{49}$ and $T_{50}$ are connected across a readout winding 570 that surrounds the error readout gate 220 to provide an output indication of the overflow obtained from the division operation.

From the foregoing description, it can be appreciated that the present invention does provide a new and improved cryogenic computer which does utilize cryotrons as logic elements. Further, the invention makes available a number of different arithmetic modules fabricated from cryotrons for performing different arithmetic operations such as addition, subtraction, multiplication, division and comparison. In addition, this invention makes available a new and improved division network formed by arithmetic modules which may comprise a part of a complete cryogenic computer, and which is particularly well suited to the use of cryotrons as the logic elements.

Obviously, other modificaitons and variations of the present invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. A digital arithmetic unit comprising a plurality of superconducting gate elements, there being at least two respective gate elements for each digit to be resolved by the arithmetic unit with all the gate elements being interconnected at the input end thereof to a source of electric current and to either one of two output terminals representing either a binary one or a binary zero, said gate elements forming at least two parallel current carrying paths for each digit to be resolved, and at least one pair of superconductivity modifying means for each digit to be resolved by the arithmetic unit with respective superconductivity modifying means representing a binary zero or a binary one and modifying a respective current carrying path, said modifying means being constructed from superconducting material having a critical magnetic field strength higher than said gate elements.

2. The combination set forth in claim 1 further characterized by a carry unit similar in construction to said arithmetic unit with the binary one superconductivity modifying means of corresponding coil pairs on the arithmetic unit and the carry unit being interconnected and the binary zero superconductivity modifying means of corresponding coil pairs in each unit being similarly interconnected.

3. A digital arithmetic unit comprising a plurality of pairs of superconducting gate elements, there being at least two gate elements for each digit to be resolved by the unit, with the pair of superconducting gate elements for the first digit to be resolved being connected in parallel circuit relationship to a source of electric current and to respective output terminals representing either a binary one or a binary zero, a pair of superconductivity modifying means operatively coupled to the superconducting gate elements for the first digit to be resolved with respective superconductivity modifying means representing a binary zero or a binary one, and operatively coupled to a respective gate element, the remaining pairs of superconducting gate elements for the remainder of the digits to be resolved being connected in parallel electric circuit relationship with said first mentioned pair of gate elements to said source of electric current and to either one of said respective output terminals, and a pair of superconductivity modifying means for each of the remaining digit to be resolved physically arranged on the respective associated gate elements thereof adjacent one another, with respective superconductivity modifying means of the additional pairs representing either a binary zero or a binary one, and surrounding at least an associated additional gate element, said additional pairs of superconductivity modifying means being constructed from superconducting material having a critical magnetic field strength higher than said gate elements.

4. The combination set forth in claim 3 further characterized by a carry unit similar in construction to said arithmetic unit with the binary one superconductivity modifying means of corresponding pairs on the arithmetic unit and the carry unit being interconnected and the binary zero superconductivity modifying means of corresponding pairs in each unit being similarly interconnected.

5. The combination set forth in claim 3 further characterized by a carry unit similar in construction to said arithmetic unit with the binary one superconductivity modifying means of corresponding pairs on the arithmetic unit and the carry unit being simultaneously energized and the binary zero superconductivity modifying means of corresponding coil pairs in each unit being simultaneously energized, there being a plurality of such combination arithmetic and carry units with the output of preceding carry units being connected to a pair of superconductivity modifying means of the next succeeding carry unit adapted to receive a partial carry signal developed by the carry unit.

6. A digital arithmetic unit comprising a plurality of superconducting gate elements, there being at least two gate elements for each digit to be resolved by the unit with the pair of superconducting gate elements for one of the digits to be resolved being connected at the input end in parallel circuit relationship to a source of electric current and to respective output terminals representing either a binary one or a binary zero, a pair of superconductivity modifying means for the first digit to be resolved arranged on said gate elements with the one thereof representing binary one surrounding the gate element connected to the zero output terminal, a second pair of single gate elements connected to said first gate elements, and a second pair of superconductivity modifying means arranged on at least said second gate elements with the superconductivity modifying means thereof representing a binary one surrounding the second gate element connected to the one output terminal, said pairs of superconductivity modifying means being constructed from superconducting material having a critical magnetic field strength higher than said gate elements.

7. The combination set forth in claim 6 further characterized by a carry unit similar in construction to said arithmetic unit with the binary one superconductivity modifying means of corresponding pairs on the arithmetic unit and the carry unit being interconnected and the binary zero superconductivity modifying means of corresponding pairs in each unit being similarly interconnected.

8. The combination set forth in claim 6 further characterized by a carry unit similar in construction to said arithmetic unit with the binary one superconductivity modifying means of corresponding pairs on the arithmetic unit and the carry unit being interconnected and the binary zero superconductivity modifying means of corresponding pairs in each unit being similarly interconnected, there being a plurality of such combination arithmetic and carry units with the output of preceding carry units being connected to a pair of superconductivity modifying means of the next succeeding carry unit adapted to receive a partial carry signal developed by the carry unit.

9. A digital arithmetic unit comprising a plurality of superconducting gate elements, there being at least two gate elements for each digit to be resolved by the unit with the superconducting gate elements for one of the digits to be resolved being connected in parallel circuit relationship to a source of electric current and separately to respective output terminals representing either a binary one or a binary zero, and with the remaining sets of superconducting gate elements for the remainder of the digits to be resolved being connected in parallel electric circuit relationship with said first mentioned gate elements to said source of electric current and to either one of said respective output terminals, and a pair of superconductivity modifying means for each digit to be resolved physically arranged on the respective associated gate elements thereof adjacent one another with the superconductivity modifying means of the first pair representing a binary one surrounding the respective gate element thereof connected to the zero output terminal, the superconductivity modifying means of the second pair representing a binary one surrounding the respective gate element thereof connected to the output terminal, with the binary one superconductivity modifying means of succeeding pairs adjacent gate elements that are connected to both output terminals, and the respective superconductivity modifying means of each pair representing a binary zero adjacent the remaining respective associated gate elements, said coil pairs being constructed from superconducting material having a critical magnetic field strength higher than said gate elements.

10. A digital arithmetic unit comprising a plurality of superconducting gate elements, there being at least two gate elements for each digit to be resolved by the unit with the superconducting gate elements for one of the digits to be resolved being connected in parallel circuit relationship to a common source of electric current and separately to respective output terminals representing either a binary one or a binary zero, a first digit coil pair for the first digit to be resolved arranged on said gate elements with the winding thereof representing binary one surrounding the gate element connected to the zero output terminal, and the winding thereof representing binary zero surrounding the gate element connected to the one output terminal, a second pair of single gate elements connected to said first gate elements at a point intermediate the first digit coil pair thereon and the output terminals, and a second digit coil pair arranged with the winding thereof representing a binary one surrounding the second gate element connected to the one output terminal and to the first gate element that is surrounded by the binary zero winding of the first digit coil pair at the output side, and with the winding thereof representing a binary zero surrounding the second gate element connected to the zero output terminal and to the first gate element surrounded by the binary one winding of the first digit coil pair at the output side thereof, all of said coil pairs being constructed from superconducting material having a critical magnetic field strength higher than said gate elements.

11. The combination set forth in claim 10 further characterized by a carry unit similar in construction to said arithmetic unit with the binary one windings of corresponding coil pairs on the arithmetic unit and the carry unit being interconnected and the binary zero windings of corresponding coil pairs in each unit being similarly interconnected.

12. The combination set forth in claim 10 further characterized by a carry unit similar in construction to said arithmetic unit with the binary one windings of corresponding coil pairs on the arithmetic unit and the carry unit being interconnected and the binary zero windings of corresponding coil pairs in each unit being similarly interconnected, there being a plurality of such combination arithmetic and carry units with the output of preceding carry units being connected to a coil pair of the succeeding arithmetic unit and to a coil pair of its corresponding carry unit adapted to receive a partial carry signal from the preceding carry unit.

13. A digital arithmetic unit comprising a plurality of superconducting gate elements, there being at least two gate elements for each digit to be resolved by the unit with the superconducting gate elements for one of the digits to be resolved being connected in parallel circuit relationship to a source of electric current and separately to respective output terminals representing either a binary one or a binary zero, a first digit pair of superconductivity modifying means for the first digit to be resolved arranged on said gate elements with the superconductivity modifying means thereof representing binary one surrounding the gate element connected to the zero output terminal and the superconductivity modifying means representing binary zero surrounding the gate element connected to the one output terminal, a second pair of single gate elements connected to said first gate elements at a point intermediate the first digit superconductivity modifying means thereon and the output terminals, a second digit pair of superconductivity modifying means arranged with the superconductivity modifying means thereof representing a binary one adjacent the second date element connected to the one output terminal and to the first gate element that is modified by the binary zero superconductivity modifying means of the first digit pair at the output side, and with the superconductivity modifying means thereof representing a binary zero adjacent the second gate element connected to the zero output terminal and to the first gate element modified by the binary one superconductivity modifying means of the first digit pair at the output side thereof, and an additional set of superconducting gate elements for each additional digit to be resolved by the arithmetic unit, the number of gate elements in each succeeding set being double the number of gate elements in the preceding set and being connected to the preceding gate elements at a point following the superconductivity modifying means thereof and to both output terminals, and an additional pair of superconductivity modifying means for each additional digit to be resolved with the superconductivity modifying means thereof representing a binary one adjacent the additional gate elements connected to the preceding gate elements modified by the binary zero superconductivity modifying means of the preceding digit coil pair and with the superconductivity modifying means thereof representing a binary zero adjacent the additional gate elements connected to the preceding gate elements surrounded by the binary one superconductivity modifying means of the preceding digit pair, all of said pairs of superconductivity being constructed from superconducting material having a critical magnetic field strength higher than said gate elements.

14. A digital arithmetic unit comprising a plurality of superconducting gate elements, there being at least two gate elements for each digit to be resolved by the unit with the superconducting gate elements for one of the digits to be resolved being connected in parallel circuit relationship to a source of electric current and separately to respective output terminals representing either a binary one or a binary zero, a first digit coil pair for the first digit to be resolved arranged on said gate elements with the winding thereof representing binary one surrounding the gate element connected to the zero output terminal, and the winding thereof representing binary zero surrounding the gate element connected to the one output terminal, a second pair of single gate elements connected to said first gate elements at a point intermediate the first digit coil pair thereon and the output terminals, a second digit coil pair arranged with the winding thereof representing a binary one surrounding the second gate element connected to the one output terminal and to the first gate element that is surrounded by the binary zero winding of the first digit coil pair at the output side, and with the winding thereof representing a binary zero surrounding the second gate element connected to the zero output terminal and to the first gate element surrounded by the binary one winding of the first digit coil pair at the output side thereof, and a third pair of double superconducting gate elements for a third digit to be resolved by the arithmetic unit connected to the first and second gate elements at a point intermediate the second coil pair and the output terminals, and a third coil pair having the winding thereof representing a binary one surrounding the two gate elements connected to the first and second gate elements on the output side of the second digit coil pair binary zero winding and to respective ones of the two output terminals, and the winding thereof representing a binary zero surrounding the gate elements connected to the first and second gate elements on the output side of the second digit coil pair binary one winding and to respective ones of the two output terminals, all of said coil pairs being fabricated from superconducting materials having critical magnetic field strengths greater than superconducting gate elements.

15. The combination set forth in claim 14 further characterized by a carry unit similar in construction to said arithmetic unit with the binary one windings of corresponding coil pairs on the arithmetic unit and the carry unit being interconnected and the binary zero windings of corresponding coil pairs in each unit being similarly interconnected.

16. The combination set forth in claim 14 further characterized by a carry unit similar in construction to said arithmetic unit with the binary one windings of corresponding coil pairs on the arithmetic unit and the carry unit being interconnected and the binary zero windings of corresponding coil pairs in each unit being similarly interconnected, there being a plurality of such combination arithmetic and carry units with the output of preceding carry units being connected to a coil pair of the succeeding a partial carry unit adapted to receive carry signal from the preceding carry unit.

17. A digital arithmetic unit comprising a plurality of superconducting gate elements, there being at least two gate elements for each digit to be resolved by the unit with the superconducting gate elements for one of the digits to be resolved being connected in parallel circuit relationship to a source of electric current and to an output terminal representing either a binary one or a binary zero, a coil pair for the first digit to be resolved arranged on said gate elements with the windings thereof surrounding respective one of each of the gate elements connected to the output terminal, a second pair of single gate elements connected to said first gate elements at a point intermediate the coil pair thereon and the output terminal with both the additional gate elements being connected to a second output terminal, a second coil pair arranged with the winding thereof representing a binary zero surrounding the second gate element connected to the second output terminal and to the first gate element surrounded by the binary one winding at the output side and with the winding thereof representing binary one surrounding the second gate element also connected to the second output terminal and to the first gate element surrounded by the binary zero winding of the first digit coil pair at the output side thereof, all of said coil pairs being fabricated from superconducting materials having a higher critical magnetic field strength than said superconducting gate elements.

18. A digital arithmetic unit comprising a plurality of superconducting gate elements, there being at least two gate elements for each digit to be resolved by the unit with the superconducting gate elements for one of the digits to be resolved being connected in parallel circuit relationship to a common source of electric current and to an output terminal representing either a binary one or a binary zero, a coil pair for the first digit to be resolved arranged on said gate elements with the windings thereof surrounding a respective one of the gate elements connected to the output terminal, a second pair of single gate elements connected to said first gate elements at a point intermediate the coil pair thereon and the output terminal with one of the second gate elements being connected to said output terminal and the remaining second gate element being connected to a second output terminal, a second output terminal, a second coil pair arranged with the winding thereof representing a binary zero surrounding the second gate element connected to the first mentioned output terminal and to the first gate element surrounded by the binary one winding at the output side and with the winding thereof representing binary one surrounding the second gate element connected to the additional output terminal and to the first gate element surrounded by the binary zero winding of the first digit coil pair at the output side thereof, all of said coil pairs being fabricated from superconducting materials having a higher critical magnetic field strength than said superconducting gate elements.

19. A digital arithmetic unit comprising a plurality of superconducting gate elements, there being at least two gate elements of reach digit to be resolved by the unit, with the superconducting gate elements for one of the digits to be resolved being connected in parallel circuit relationship to a source of electric current and separately to respective output terminals representing either a binary one or a binary zero, and with the remaining sets of superconducting gate elements for the remainder of the digits to be resolved being connected in parallel electric circuit relationship with said first mentioned gate elements in common to said source of electric current and to either one of said respective output terminals, and a coil pair for each digit to be resolved physically arranged on the respective associated gate elements thereof adjacent one another with the winding of the first coil pair representing a binary one surrounding the respective gate element thereof connected to the zero output terminal, the winding of the second coil pair representing a binary one surrounding the respective gate element thereof connected to the zero output terminal with the binary one winding of any succeeding coil pairs being connected to both output terminals, and the respective windings of each coil pair representing a binary zero surrounding the remaining respective associated gate element thereof connected to the zero output terminal, said coil pairs being constructed from superconducting material having a critical magnetic field strength higher than said gate elements.

20. A digital arithmetic unit comprising a plurality of superconducting gate elements, there being at least two gate elements for each digit to be resolved by the unit with the superconducting gate elements for one of the digits to be resolved being connected in parallel circuit relationship to a source of electric current and separately to respective output terminals representing either a binary one or a binary zero, a coil pair for the first digit to be resolved arranged on said gate elements with the winding thereof representing a binary one surrounding the gate element connected to the zero output terminal, and the winding thereof representing a binary zero surrounding the gate element connected to the one output terminal, a second pair of single gate elements connected to said first gate elements at a point intermediate the coil pair thereon, and the output terminals and a second coil pair arranged with the winding thereof representing a binary zero surrounding the second gate element connected to the zero output terminal and the first gate element surrounded by the binary one winding at the output side and with the winding thereof representing binary one surrounding the second gate element connected to the zero output terminal and to the first gate element surrounded by the binary zero winding of the first digit coil pair at the output side thereof, said coil pairs being fabricated from a superconducting material having a critical magnetic field strength higher than said gate elements.

21. A digital arithmetic unit comprising a plurality of superconducting gate elements, there being at least two gate elements for each digit to be resolved by the unit with the superconducting gate elements for one of the digits to be resolved being connected in parallel circuit relationship to a common source of electric current and separately to respective output terminals representing either a binary one or a binary zero, a first digit coil pair for the first digit to be resolved arranged on said gate elements with the winding thereof representing binary one surrounding a gate element connected to the zero output terminal, and the winding thereof representing binary zero surrounding a gate element also connected to the zero output terminal, a second pair of single gate elements connected to said first gate elements at a point intermediate the first digit coil pair thereon and the output terminals, a second digit coil pair arranged with the winding thereof representing a binary one surrounding the second gate element connected to the one output terminal and to the first gate element that is surrounded by the binary zero winding of the first digit coil pair at the output side, and with the winding thereof representing a binary zero surrounding the second gate element connected to the one output terminal and to the first gate element surrounded by the binary one winding of the first digit coil pair at the output side thereof, and a third pair of double superconducting gate elements for a third digit to be resolved by the arithmetic unit connected to the first and second gate elements at a point intermediate the second coil pair and the output terminals, and a third coil pair having the winding thereof representing a binary one surrounding the two gate elements connected to the first and second gate elements on the output side of the second digit coil pair binary zero winding and to respective ones of the two output terminals, and the winding thereof representing a binary zero surrounding the gate elements connected to the first and second gate elements on the output side of the second digit coil pair binary one winding and to respective ones of the two output terminals, all of said coil pairs being fabricated from superconducting materials having critical magnetic field strengths greater than superconducting gate elements.

22. A digital arithmetic unit comprising a plurality of superconducting gate elements, there being at least two gate elements for each digit to be resolved by the unit with the superconducting gate elements for one of the digits to be resolved being connected in parallel circuit relationship to a source of electric current and separately to respective output terminals representing either a binary one or a binary zero, a first digit coil pair for the first digit to be resolved arranged on said gate elements with the winding thereof representing binary one surrounding a gate element connected to the zero output terminal and the winding thereof representing binary zero surrounding a gate element connected to the one output terminal, a second pair of single gate elements connected to said first gate elements at a point intermediate the first digit coil pair thereon and the output terminals, a second digit coil pair arranged with the winding thereof representing a binary one surrounding the second gate element connected to the one output terminal and to the first gate element that is surrounded by the binary zero winding of the first digit coil pair at the output side, and with the winding thereof representing a binary zero surrounding the second gate element connected to the zero output terminal and to the first gate element surrounded by the binary one winding of the first digit coil pair at the output side thereof, a third set of double superconducting gate elements for a third digit to be resolved by the arithmetic unit connected to both output terminals and to the first and second gate elements at a point intermediate the second coil pair and the output terminals, and a third coil pair for the third digit to be resolved with the winding thereof representing a binary one surrounding the third double gate elements connected to the first and second gate elements at the output side of the binary zero winding of the second digit coil pair and with the winding thereof representing a binary zero surrounding the third gate elements connected to the first and second gate elements at the output side of the binary one winding of the second digit coil pair, and a fourth set of superconducting gate elements for a fourth digit to be resolved by the arithmetic unit with the number of gate elements in the fourth set being double the number of gate elements in the previous sets and being connected to the sets at a point intermediate the third coil pair and the output terminals, and a fourth coil pair for said fourth gate elements with winding thereof representing a binary one surrounding two of the fourth gate elements connected to the zero output terminal and two of the gate elements connected to the one output terminals and to the first, second and third gate elements at the output side of the third digit coil pair binary zero winding, and with the winding of the fourth coil pair representing a binary zero surrounding two of the fourth gate elements connected to the zero output terminal and two of the fourth gate elements connected to the one output terminal and to the first, second and third gate elements at the output side of the fourth coil pair binary one winding, all of said coil pairs being constructed from superconducting material having a critical magnetic field higher than said gate elements.

23. The combination set forth in claim 22 further characterized by a carry unit similar in construction to said arithmetic unit with the exception that the second gate element surrounded by the binary one winding of the second digit coil pair is connected to the zero output terminal and the binary zero winding of the second digit coil pair is connected to the one output terminal, and the binary one and binary zero windings of the fourth digit coil pair each surround three fourth gate elements connected to the zero output terminal and one fourth gate element connected to the one output terminal, and with the binary one windings of corresponding coil pairs on the arithmetic unit and the carry unit being interconnected and the binary zero windings of corresponding coil pairs in each unit being similarly interconnected.

24. A digital arithmetic unit comprising a plurality of superconducting gate elements, there being at least two gate elements for each digit to be resolved by the unit with the superconducting gate elements for one of the digits to be resolved being connected in parallel circuit relationship to a source of electric current and to an output terminal representing a binary zero, a first digit coil pair for the first digit to be resolved arranged on said gate elements with the winding thereof representing binary one surrounding one of the first gate elements and the winding thereof representing binary zero surrounding the remaining first gate element, a second pair of single gate elements connected to said first gate elements at a point intermediate the first digit coil pair thereon and the output terminal, and a second digit coil pair arranged with the winding thereof representing a binary one surrounding the second gate element connected to an additional output terminal representing a binary one and to the first gate element that is surrounded by the binary zero winding of the first digit coil pair at the output side, and with the winding thereof representing a binary zero surrounding a second gate element also connected to the binary one output terminal and to the first gate element surrounded by the binary one winding of the first digit coil pair at the output side thereof, all of said coil pairs being constructed from superconducting material having a critical magnetic field strength higher than said gate elements.

25. A digital arithmetic unit comprising a plurality of superconducting gate elements, there being at least two gate elements for each digit to be resolved by the unit with the superconducting gate elements for one of the digits to be resolved being connected in parallel circuit relationship to a source of electric current and to an output terminal representing a binary zero, a first digit coil pair for the first digit to be resolved arranged on said gate elements with the winding thereof representing binary one surrounding one of the first gate elements and the winding thereof representing binary zero surrounding the remaining first gate element, a second pair of single gate elements connected to said first gate elements at a point intermediate the first digit coil pair thereon and the output terminal, and a second digit coil pair arranged with the winding thereof representing a binary one surrounding the second gate element connected to an additional output terminal representing a binary one and to the first gate element that is surrounded by the binary zero winding of the first digit coil pair at the output side, and with the winding thereof representing a binary zero surrounding the second gate element also connected to the zero output terminal and to the first gate element surrounded by the binary one winding of the first digit coil pair at the output side thereof, all of said coil pairs being constructed from superconducting material having a critical magnetic field strength higher than said gate elements.

26. A digital arithmetic unit comprising a plurality of superconducting gate elements, there being at least two gate elements for each digit to be resolved by the unit with the first superconducting gate elements for one of the digits to be resolved being connected in parallel circuit relationship to a source of electric current and to an output terminal representing a binary zero, a first digit coil pair for the first digit to be resolved arranged on said gate elements with the winding thereof representing binary one surrounding one of the first gate elements and the winding thereof representing binary zero surrounding the remaining gate element, a second pair of single gate elements connected to said first gate element at a point intermediate the first digit coil pair thereon and the output terminal, and a second digit coil pair arranged with the winding thereof representing a binary one surrounding a second gate element connected to an additional output terminal representing a binary one and to the first gate element that is surrounded by the binary zero winding of the first digit coil pair at the output side, and with the winding thereof representing a binary zero surrounding a second gate element also connected to the additional output terminal representing a binary one and to the first gate element surrounded by the binary one winding of the first digit coil pair at the output side thereof, all of said coil pairs being constructed from superconducting material having a critical magnetic field strength higher than said gate elements.

27. The combination set forth in claim 26 further characterized by a carry unit similar in construction to said arithmetic unit with the exception that the binary one winding of the second digit coil pair surrounds a second gate element connected to the zero output terminal, and with the binary one windings of corresponding coil pairs on the arithmetic unit and the carry unit being interconnected and the binary zero windings of corresponding coil pairs in each unit being similarly interconnected.

28. A digital arithmetic unit comprising a plurality of superconducting gate elements, there being at least two gate elements for each digit to be resolved by the unit with the first superconducting gate elements for the first digit to be resolved being connected in parallel circuit relationship to a source of electric current and to a single output terminal representing a binary zero, a first digit coil pair for the first digit to be resolved arranged on said gate elements with the winding thereof representing binary one surrounding one of the gate elements connected to the zero output terminal and the winding thereof representing a binary zero surrounding the remaining gate element also connected to the zero output terminal, a second pair of single gate elements connected to said first gate elements at a point intermediate the first digit coil pair thereon and the output terminal, and a second digit coil pair arranged with the winding thereof representing a binary one surrounding a second gate element connected to an additional output terminal representing a binary one and to the first gate element that is surrounded by the binary zero winding of the first digit coil pair at the output side, and with the winding thereof representing a binary zero surrounding a second gate element also connected to the one output terminal and to the first gate element surrounded by the binary one winding of the first digit coil pair at the output side thereof, all of said coil pairs being constructed from superconducting material having a critical magnetic field strength higher than said gate elements.

29. The combination set forth in claim 28 further characterized by a carry unit similar in construction to said arithmetic unit with the exception that the first gate elements are connected to separate output terminals representing a binary one and a binary zero, respectively, and with the binary one windings of corresponding coil pairs on the arithmetic unit and the carry unit being interconnected and the binary zero windings of corresponding coil pairs in each unit being similarly interconnected.

30. A digital arithmetic unit comprising a plurality of superconducting gate elements, there being at least two gate elements for each digit to be resolved by the unit with the first superconducting gate elements for the first digit to be resolved being connected in parallel circuit relationship to a source of electric current and to an output terminal representing a binary zero, a first digit coil pair for the first digit to be resolved arranged on said gate elements with the winding thereof representing binary one surrounding one of the first gate elements connected to the zero output terminal, and the winding thereof representing binary zero surrounding the remaining first gate element connected to the zero output terminal, a second pair of single gate elements connected to said first gate elements at a point intermediate the first digit coil pair thereon and the output terminal, a second digit coil pair arranged with the winding thereof representing a binary one surrounding the second gate element connected to an additional output terminal representing a binary one and to the first gate element that is surrounded by the binary zero winding of the first digit coil pair at the output side, and with the winding thereof representing a binary zero surrounding a second gate element also connected to the one output terminal and to the first gate element surrounded by the binary one winding of the first digit coil pair at the output side thereof, and a third pair of double superconducting gate elements for a third digit to be resolved by the arithmetic unit connected to the first and second gate elements at a point intermediate the second coil pair and the output terminals, and a third coil pair having the winding thereof representing a binary one surrounding two third gate elements connected to the first and second gate elements on the output side of the second digit coil pair binary zero winding and to respective ones of both output terminal and the winding of the third coil pair representing a binary zero surrounding the third double gate elements connected to the first and second gate elements on the output side of the second digit coil pair binary one winding and to respective ones of both output terminals, all of said coil pairs being fabricated from superconducting materials having critical magnetic field strengths greater than the superconducting gate elements.

31. The combination set forth in claim 30 further characterized by a carry unit similar in construction to said arithmetic unit with the exception that the first single gate elements are connected to separate output terminals representing either a binary one or a binary zero, the binary zero winding of the second digit coil surrounds a second gate element connected to the binary zero output terminal, the two third gate elements surrounded by the binary one winding of the third digit coil pair are connected the zero output terminal and the two third gate elements surrounded by the binary zero winding of the third digit coil pair are also connected to the zero output terminal and with the binary one winding of corresponding coil pairs on the arithmetic unit and the carry unit being interconnected and the binary zero windings of corresponding coil pairs in each unit being similarly interconnected.

32. A digital arithmetic unit comprising a plurality of superconducting gate elements, there being at least two gate elements for each digit to be resolved by the unit with the superconducting gate elements for one of the digits to be resolved being connected in parallel circuit relationship to a source of electric current and separately to respective output terminals representing either a binary one or a binary zero, a first digit coil pair for the first digit to be resolved arranged on said gate elements with the winding thereof representing binary one surrounding the gate element connected to the zero output terminal and the winding thereof representing binary zero surrounding the gate element connected to the one output terminal, a second pair of single gate elements connected to said first gate elements at a point intermediate the first digit coil pair thereon and the output terminals, a second digit coil pair arranged with the winding thereof representing a binary one surrounding a second gate element connected to the one output terminal and to the first gate element that is surrounded by the binary zero winding of the first digit coil pair at the output side, and with the winding thereof representing a binary zero surrounding a second gate element connected also to the one output terminal and to the first gate element surrounded by the binary one winding of the first digit coil pair at the output side thereof, a third set of double superconducting gate elements for a third digit to be resolved by the arithmetic unit connected to the first and second sets of gate elements at a point intermediate the second digit pair and the output terminals, a third coil pair surrounding the third gate elements with the winding thereof representing a binary one surrounding two third gate elements each connected to one of the output terminals and to the preceding gate elements surrounded by the binary zero winding of the second digit coil pair, and with the winding thereof representing a binary zero surrounding two third gate elements each connected to one of the output terminals and to the second gate elements surrounded by the binary one winding of the second digit coil pair, and a fourth set of superconducting gate elements for a fourth digit to be resolved by the arithmetic unit with the number of gate elements in the fourth set being double the number of gate elements in the previous sets, and being connected to the previous sets at a point intermediate the third coil pair and the output terminals, and a fourth coil pair for said fourth gate elements with the winding thereof representing a binary one surrounding two fourth gate elements connected to the one output terminal and two fourth gate elements connected to the zero output terminal and to the third gate elements surrounded by the binary zero winding of the third digit coil pair at the output side thereof, and with the winding thereof of representing a binary zero surrounding two fourth gate elements connected to the zero output terminal and two fourth gate elements connected to the one output terminal, and connected to the third gate elements surrounded by the binary one winding of the third coil pair at the output side thereof, all of said coil pairs being constructed from superconducting material having a critical magnetic field strength higher than said gate elements.

33. The combination set forth in claim 1 further characterized by a carry unit similar in construction to said arithmetic unit with the exception that the binary zero winding of the second digit coil pair surrounds a second gate element connected to the one output terminal, the binary one winding of the third digit coil pair surrounds two third gate elements connected to the zero output terminal, the binary one winding of the fourth digit coil surrounds one fourth gate element connected to the zero output terminal and three fourth gate elements connected to the one output terminal, and the binary zero winding of the fourth digit coil pair surrounds one fourth gate element connected to the one output terminal and three pairs of single gate elements connected to said first gate elements at a point intermediate the first digit coil pair thereon and the output terminals, a second digit coil pair arranged with the winding thereof representing a binary one surrounding a second gate element connected to the one output terminal and to the first gate element that is surrounded by the binary zero winding of the first digit coil pair at the output side, and with the winding thereof representing a binary zero surrounding a second gate element connected also to the one output terminal and to the first gate element surrounded by the binary one winding of the first digit coil pair at the output side thereof, a third set of double superconducting gate elements for a third digit to be resolved by the arithmetic unit connected to the first and second sets of gate elements at a point intermediate the second digit coil pair and the output terminals, a third coil pair surrounding the third gate elements with the winding thereof representing a binary one surrounding two third gate elements each connected to one of the output terminal and to the preceding gate elements surrounded by the binary zero winding of the second digit coil pair, and with the winding thereof representing a binary zero surrounding two third gate elements each connected to one of the output terminals and to the second gate elements surrounded by the binary one winding of the second digit coil pair, and a fourth set of superconducting gate elements for a fourth digit to be resolved by the arithmetic unit with the number of gate elements in the fourth set being double the number of gate elements in the previous sets and being connected to the previous sets at a point intermediate the fourth gate elements connected to the zero output terminal, and with the binary one windings of corresponding coil pairs on the arithmetic unit and the carry unit being interconnected and the binary zero windings of corresponding coil pairs in each unit being similarly interconnected.

34. A division network comprising a first set of interconnected cryogenic arithmetic modules adapted to receive two quantities whose quotient is desired, and to subtract the divisor in its highest order from the dividend and to obtain the *n*th quotient order *qn* from the sign of the resultant partial sum R produced by this subtraction, and at least a second set of interconnected cryogenic arithmetic modules connected to said first set of modules for receiving the resultant partial sum R and depending upon the sign of R, either subtracting or adding the next highest order of the divisor therefrom to obtain the $n-1$ quotient order $q_{n-1}$ from the sign of the new resultant partial sum R′ produced by this operation.

35. A division network comprising a first set of interconnected cryogenic arithmetic modules adapted to receive two quantities whose quotient is desired, and to obtain the *n*th quotient order $Q_n$ from the sign of the resultant partial sum R produced by this subtraction, a second set of interconnected cryogenic arithmetic modules connected to said first set of modules for receiving the resultant partial sum R and depending upon the sign of R either subtracting or adding the next highest order of the divisor therefrom to obtain the $n-1$ quotient order $Q_{n-1}$ from the sign of the new resultant partial sum R′ produced by this operation, and a plurality of additional sets of interconnected cryogenic arithmetic modules connected to said second set of modules, there being a total of as many sets of modules as there are desired places in the quotient.

References Cited in the file of this patent

Buck: "The Cryotron—A Superconductive Computer Component," Proceedings of the IRE, vol. 44, No. 4 (Apr. 1956), pp. 482–493.

Slade: "A Review of Superconductive Switching Circuits," National Electronics Conference, vol. XIII (Oct. 7 to 9, 1957), pp. 574–582.